(12) United States Patent
Kawamura

(10) Patent No.: US 9,690,157 B2
(45) Date of Patent: Jun. 27, 2017

(54) DISPLAY DEVICE

(71) Applicant: Panasonic Liquid Crystal Display Co., Ltd., Hyogo (JP)

(72) Inventor: Tetsuya Kawamura, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 14/878,061

(22) Filed: Oct. 8, 2015

(65) Prior Publication Data

US 2016/0026053 A1   Jan. 28, 2016

Related U.S. Application Data

(63) Continuation of application No. PCT/JP2014/000314, filed on Jan. 22, 2014.

(30) Foreign Application Priority Data

Apr. 8, 2013   (JP) ................................ 2013-080611

(51) Int. Cl.
*G02F 1/1362*   (2006.01)
*G09G 3/00*   (2006.01)
*G09G 3/36*   (2006.01)
*G02F 1/13*   (2006.01)
*G02F 1/1345*   (2006.01)

(52) U.S. Cl.
CPC ...... *G02F 1/136286* (2013.01); *G02F 1/1309* (2013.01); *G02F 1/13458* (2013.01); *G09G 3/006* (2013.01); *G09G 3/3614* (2013.01); *G02F 2001/136254* (2013.01); *G09G 3/3685* (2013.01); *G09G 2300/0426* (2013.01)

(58) Field of Classification Search
CPC .............. G02F 1/1309; G02F 1/13458; G02F 1/136286; G02F 2001/136254; G09G 3/3614; G09G 3/006; G09G 3/3685; G09G 2300/0426; H01L 22/14; H01L 22/32; H01L 22/10
See application file for complete search history.

(56) References Cited

U.S. PATENT DOCUMENTS

| | | | |
|---|---|---|---|
| 8,629,965 B2* | 1/2014 | Yanagisawa | G02F 1/1345 349/149 |
| 2006/0170447 A1 | 8/2006 | Maeda et al. | |
| 2011/0141426 A1* | 6/2011 | Okada | G02F 1/1362 349/150 |

FOREIGN PATENT DOCUMENTS

| | | |
|---|---|---|
| JP | 2006-243706 | 9/2006 |
| JP | 2008-015372 | 1/2008 |
| JP | 2011-123162 | 6/2011 |

OTHER PUBLICATIONS

International Search Report issued Mar. 25, 2014 in corresponding International Application No. PCT/JP2014/000314.

* cited by examiner

*Primary Examiner* — Nikolay Yushin
(74) *Attorney, Agent, or Firm* — Wenderoth, Lind & Ponack, L.L.P.

(57) ABSTRACT

A display surface where a plurality of source lines are arrayed thereon and each receives a video signal; and an inspection wiring portion that transmits an inspection signal to the source lines. The inspection wiring portion includes a first conductive layer connected to a part of the source lines, a second conductive layer connected to another part of the source lines, and an insulating portion that insulates the first conductive layer and the second conductive layer, and the second conductive layer is laminated on the first conductive layer.

18 Claims, 30 Drawing Sheets

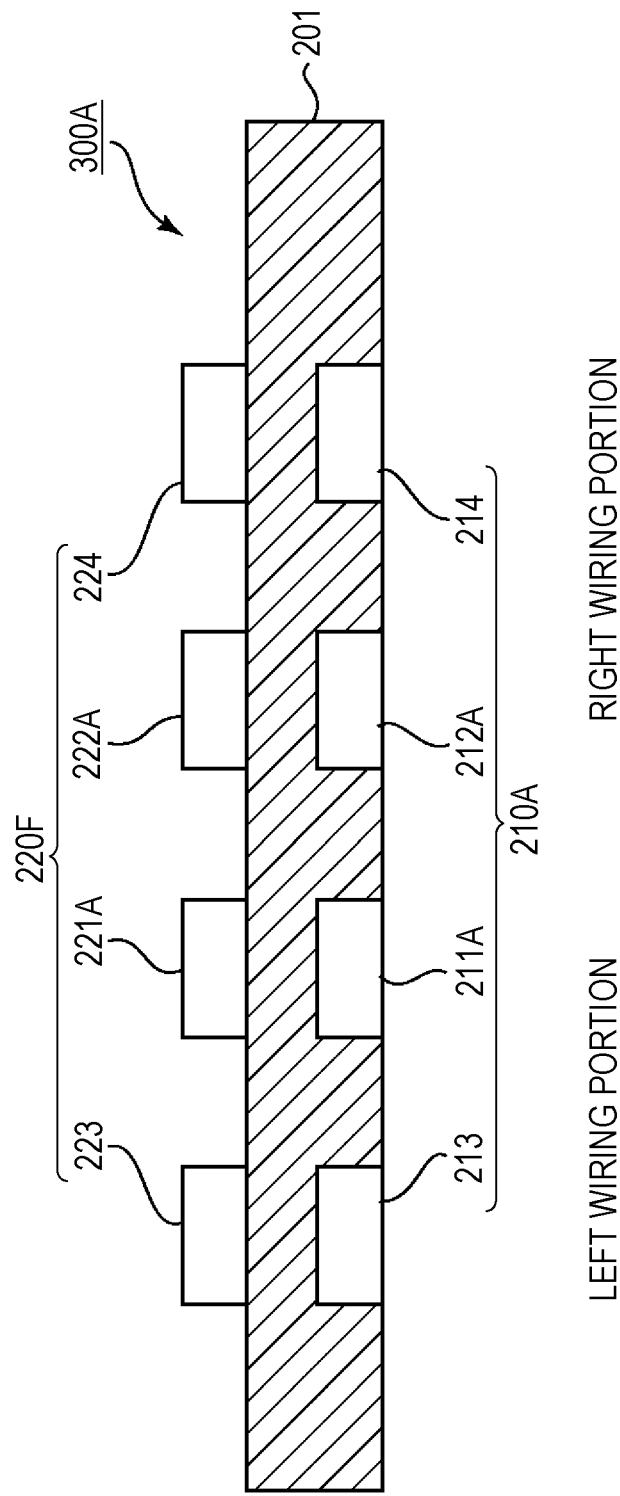

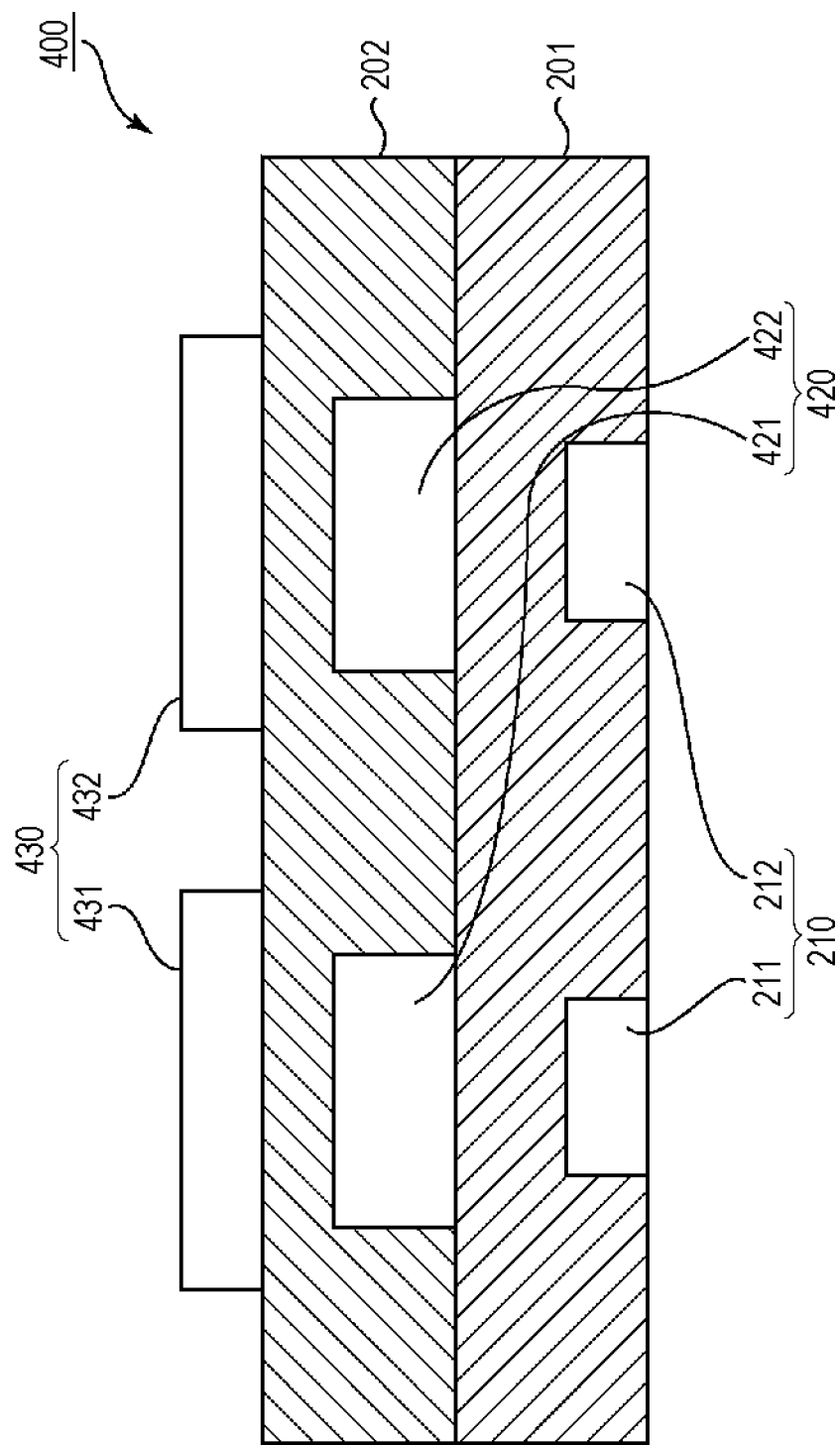

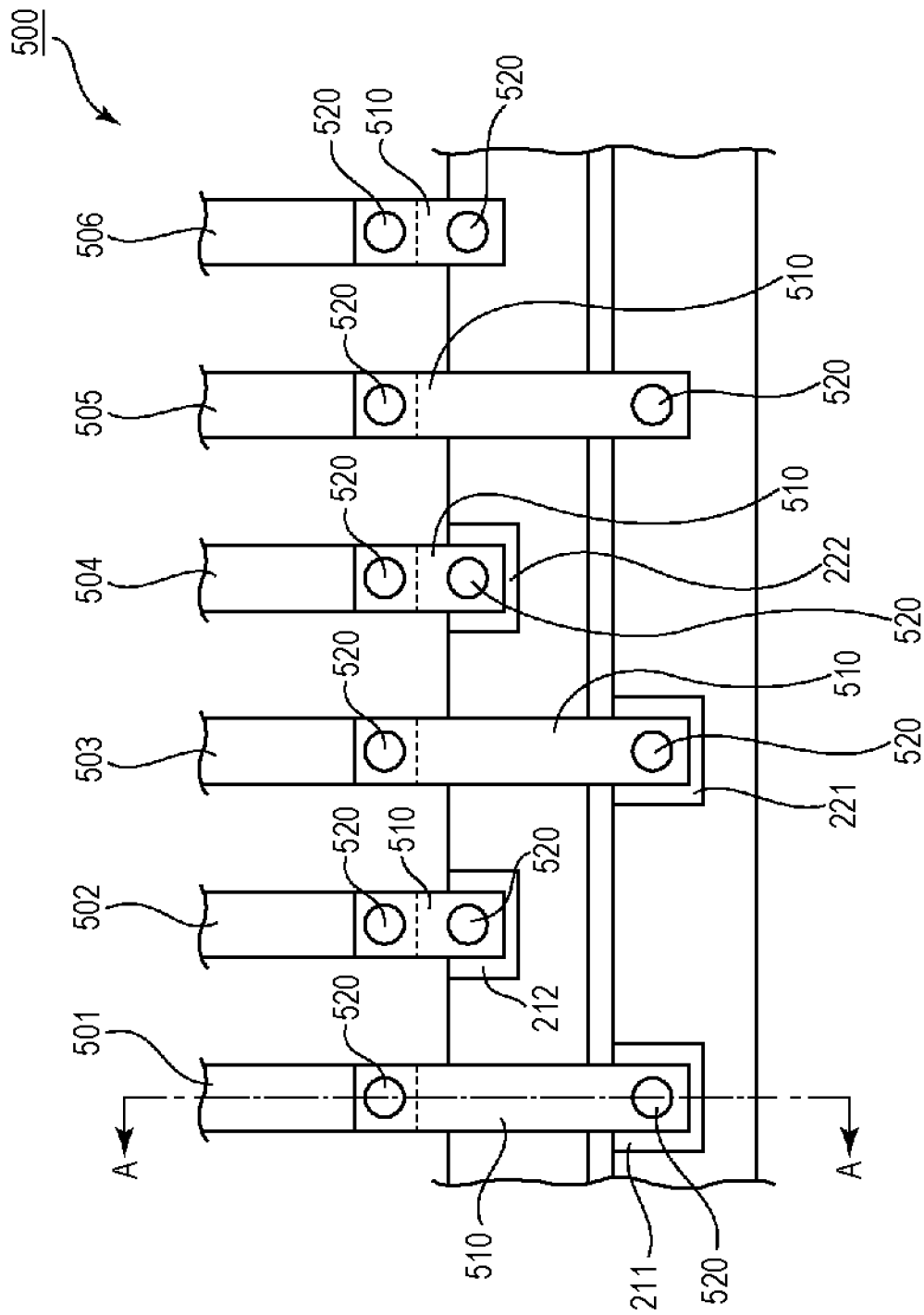

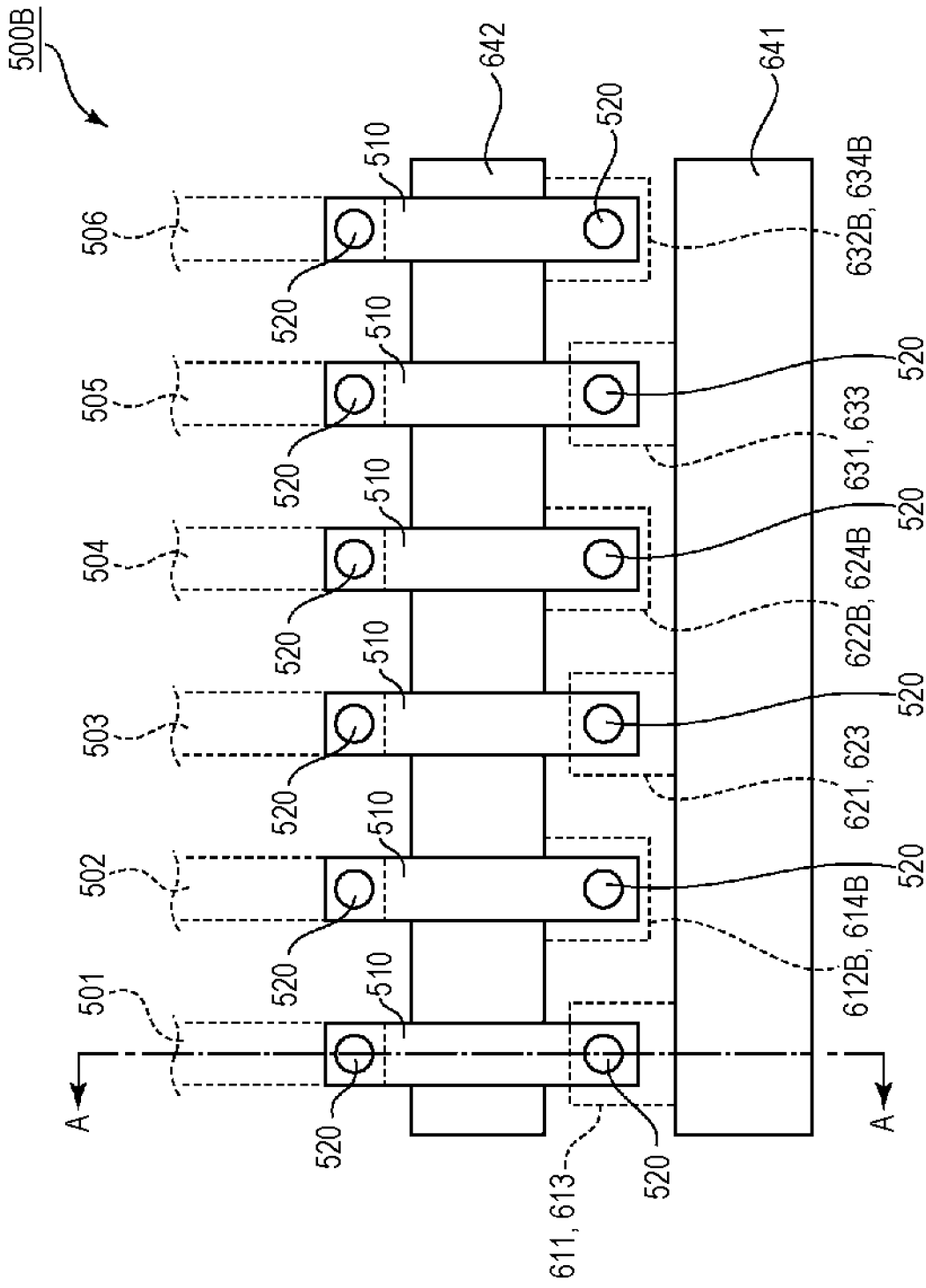

EXTENDING DIRECTION
OF CONNECTION LAYER

DISPLAY DEVICE

CROSS-REFERENCE TO RELATED APPLICATION

This application is Bypass Continuation of international patent application PCT/JP2014/000314, filed: Jan. 22, 2014 designating the United States of America, the entire disclosure of which is incorporated herein by reference. Priority is claimed based on Japanese patent application JP2013-080611, filed: Apr. 8, 2013. The entire disclosure of Japanese patent application JP2013-080611 is incorporated herein by reference in its entirety.

BACKGROUND

1. Technical Field

The present disclosure relates to a display device displaying pictures.

2. Description of the Related Art

A display device displays pictures, utilizing voltages applied between gate lines and source lines. Defects in source lines, gate lines or color filter remarkably deteriorate the displayed pictures.

In order to inspect the source lines or the gate lines, an inspection signal is transmitted to the source lines and the gate lines. In accordance with the transmission of the inspection signal, a white image or a monochromatic (red, green, or blue) image is displayed on a display surface where the gate lines and the source lines intersect with each other. For example, an inspector can observe an image projected on the display surface to detect a fault of the display device.

For example, the inspector can observe the white image to detect a defect of the source lines or the gate lines. Moreover, the inspector can observe a red, green, or blue image to detect a defect of the color filter. The above-described inspection is preferably performed under a condition close to actual use. Accordingly, preferably, in an inspection process as well, the inspection signal of a high frequency is input to the source lines or the gate lines similarly to a video signal to actually display pictures.

From the viewpoint of observation of the pictures, the display device preferably has a wide display surface. On the other hand, from the viewpoint of portability of the display device, the display device is desirably small. In many cases, the display device is designed to narrow a frame portion surrounding the display surface in accordance with the planned use of the device.

The prior art discloses three conductive bands to transmit the inspection signal to the source lines. The three conductive bands are arrayed along a surface of a substrate. In order to satisfy the above-described needs, the three conductive bands used for the inspection are preferably cut off from the display surface after the inspection of the display device. However, the removal of the conductive bands increases manufacturing processes of the display device. Accordingly, the conductive bands used for the inspection may be incorporated into the display device (See Japanese Unexamined Patent Application Publication No. JP 2006-243706).

In many cases, the conductive bands used for the inspection are formed on sides of the display surface where the source lines and the gate lines intersect with each other. The conductive bands incorporated in the display device are contained in the frame portion surrounding the display surface.

Design of the narrow frame portion requires narrow conductive bands. As a result, resistance values of the conductive bands will be increased. The high resistance values of the conductive bands make it difficult to input the inspection signal of a high frequency to the source lines or the gate lines. As a result, accuracy of the inspection of the display device will decrease.

SUMMARY

An object of the present disclosure is to provide a display device having a structure enabling a high inspection accuracy to be achieved.

In one general aspect, the instant application describes a display device includes a display surface where a plurality of source lines are arrayed thereon and each receives a video signal; and an inspection wiring portion that transmits an inspection signal to the source lines. The inspection wiring portion includes a first conductive layer connected to a part of the source lines, a second conductive layer connected to another part of the source lines, and an insulating portion that insulates the first conductive layer and the second conductive layer. The second conductive layer is laminated on the first conductive layer.

The aforementioned display device may be inspected with a high accuracy.

Objects, features, and advantages of the present disclosure will become more apparent from the following detailed description and the appended drawings.

BRIEF DESCRIPTION OF THE DRAWINGS

FIG. 14 is a schematic cross-sectional view of an inspection wiring portion formed in the horizontal wiring region of a liquid crystal panel illustrated in FIG. 10.

FIG. 15 is a schematic cross-sectional view of an inspection wiring portion formed in a horizontal wiring region.

FIG. 16A is a schematic plan view of a connection structure.

FIG. 20A is a schematic plan view of a connection structure.

DETAILED DESCRIPTION

Figure 1:
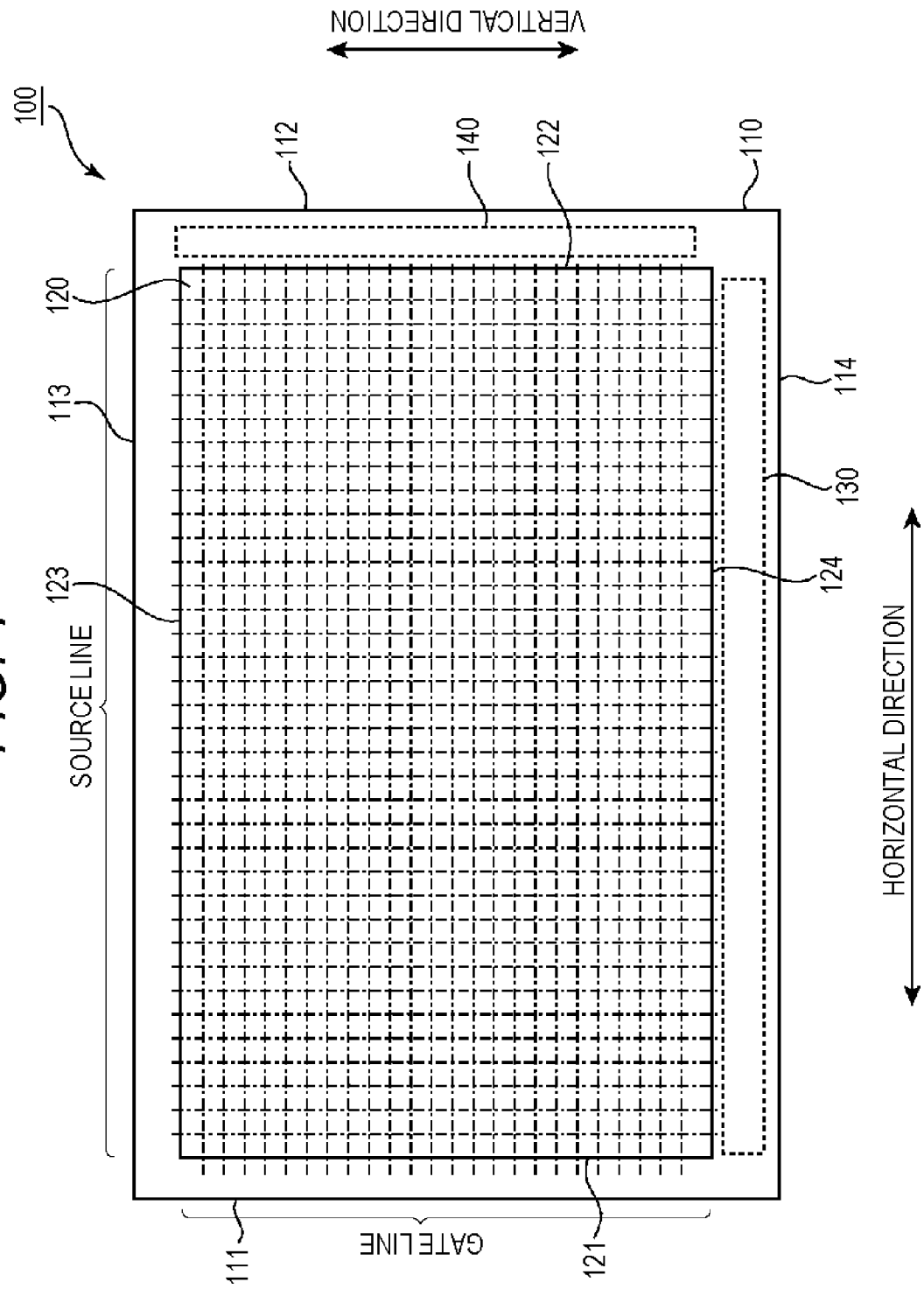
FIG. 1 is a schematic view of a liquid crystal panel illustrated as a display device of a first embodiment.

Exemplary display devices are described below with reference to the drawings. In the following embodiments, similar constituent elements are assigned with similar reference numerals. Redundant explanation is omitted as appropriate to clarify the description. Configurations, arrangements and shapes shown in the drawings and description relating to the drawings aim to make principles of the embodiments easily understood. Therefore, the principles of the present embodiments are not limited thereto.

Exemplary display devices are described below with reference to the drawings. In the following embodiments, similar constituent elements are assigned with similar reference numerals. Redundant explanation is omitted as appropriate to clarify the description. Configurations, arrangements and shapes shown in the drawings and description relating to the drawings aim to make principles of the embodiments easily understood. Therefore, the principles of the present embodiments are not limited thereto.

It is to be understood that the following disclosure provides many different embodiments, or examples, for implementing different features of the present subject matter. Specific embodiments or examples of components and arrangements are described below to simplify the present disclosure. These are, of course, merely examples and are not intended to be limiting. For example, dimensions of elements are not limited to the disclosed range or values, but may depend upon process conditions and/or desired properties of the device. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Various features may be arbitrarily drawn in different scales for simplicity and clarity.

Further, spatially relative terms, such as "beneath," "below," "bottom," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. In addition, the term "made of" may mean either "comprising" or "consisting of."

First Embodiment (Display Device)

FIG. 1 is a schematic view of a liquid crystal panel 100 illustrated as a display device of a first embodiment. Referring to FIG. 1, the liquid crystal panel 100 will be described.

The liquid crystal panel 100 includes a case 110 containing various devices used to display pictures, and a display surface 120 supported by the case 110. The display surface 120 is exposed from the case 110. An observer can observe pictures projected to the display surface 120.

The substantially rectangular case 110 includes a left edge 111 extending vertically, a right edge 112 opposite to the left edge 111, an upper edge 113 extending horizontally between the left edge 111 and the right edge 112, and a lower edge 114 opposite to the upper edge 113.

Similar to the case 110, the display surface 120 is substantially rectangular. The display surface 120 includes a left edge 121 extending vertically, a right edge 122 opposite to the left edge 121, an upper edge 123 extending horizontally between the left edge 121 and the right edge 122, and a lower edge 124 opposite to the upper edge 123.

The liquid crystal panel 100 includes many source lines extending in a vertical direction and many gate lines extending in a horizontal direction. When a video signal is input to the source lines and the gate lines arrayed on the display surface 120, pictures are displayed on the display surface 120.

The liquid crystal panel 100 includes a horizontal wiring region 130 extending horizontally between the lower edges 114 and 124, and a vertical wiring region 140 extending vertically between the right edges 112 and 122. In the horizontal wiring region 130, inspection lines used for the inspection of the source lines are arranged. In the vertical wiring region 140, inspection lines used for the inspection of the gate lines are arranged.

In the present embodiment, the horizontal wiring region 130 is arranged between the lower edges 114, 124. Alternatively, the horizontal wiring region may be formed between the upper edge of the case and the upper edge of the display surface.

In the present embodiment, the vertical wiring region 140 is arranged between the right edges 112, 122. Alternatively, the vertical wiring region may be formed between the left edge of the case and the left edge of the display surface.

Generally, the number of the inspection lines used for the inspection of the source lines is larger than that of the inspection lines used for the inspection of the gate lines. Therefore, according to the related art, a dimension in the vertical direction of the horizontal wiring region is set larger. A structure of the horizontal wiring region 130 described below allows the smaller vertical dimension. Accordingly, the display surface 120 can occupy a larger portion of a surface of the case 110.

Figure 2:
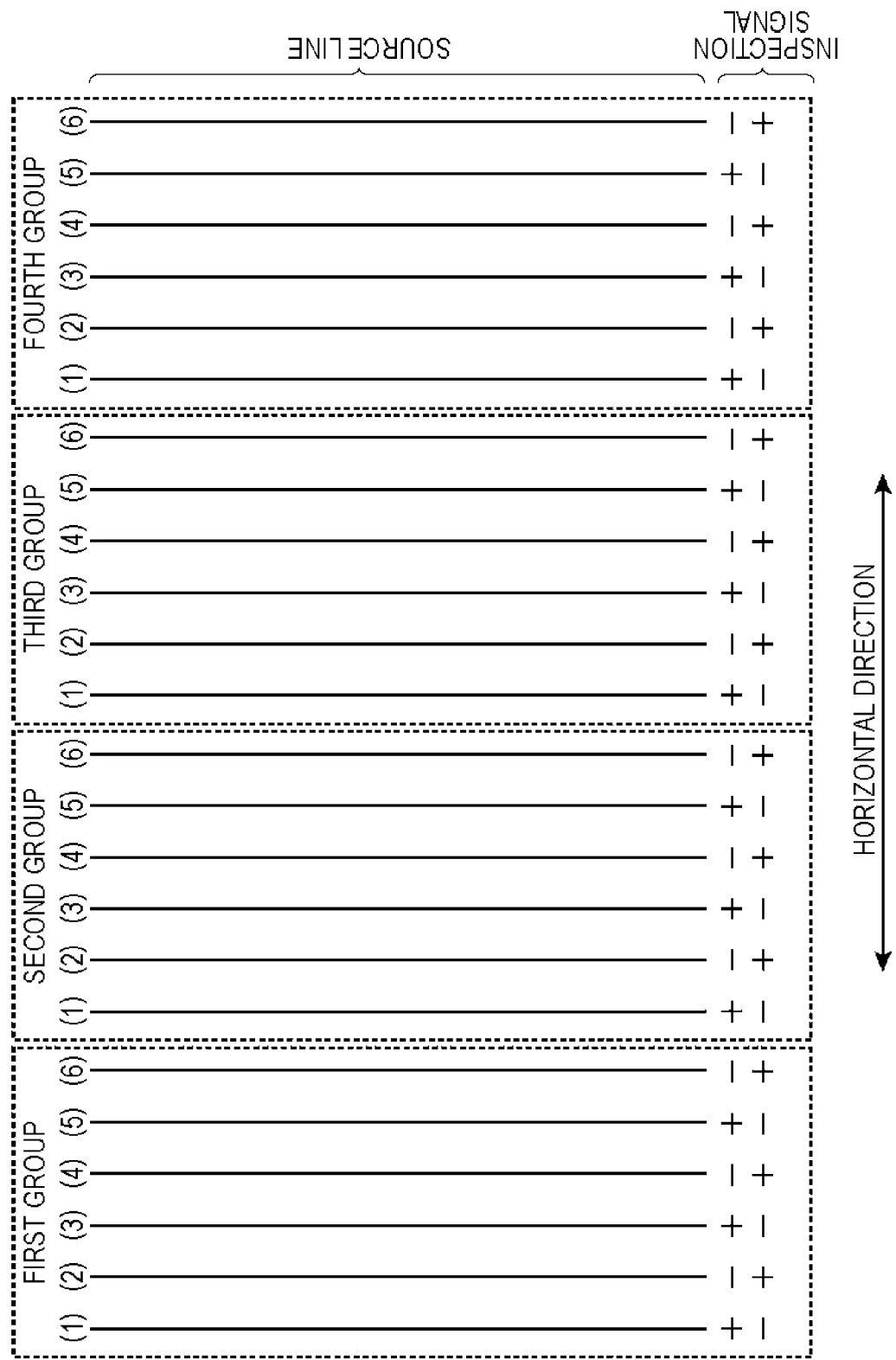
FIG. 2 is a schematic view of the source lines of a liquid crystal panel illustrated in FIG. 1.

FIG. 2 is a schematic view of the source lines. Referring to FIGS. 1 and 2, the source lines will be described.

In FIG. 2, the many source lines are grouped so that each group includes six source lines provided continuously in the horizontal direction. FIG. 2 shows a first group, a second group, a third group, and a fourth group. FIG. 2 shows a part of the many source lines shown in FIG. 1.

In each of the groups, numbers of "1" to "6" are attached to the source lines. In each of the groups, the number "1" is attached to the leftmost source line. In the following description, the source line with the number "1" attached is referred to as a "first source line".

The number "2" is attached to the source line arranged to the right of the first source line. In the following description, the source line with the number "2" attached is referred to as a "second source line".

The number "3" is attached to the source line arranged to the right of the second source line. In the following description, the source line with the number "3" attached is referred to as a "third source line".

The number "4" is attached to the source line arranged to the right of the third source line. In the following description, the source line with the number "4" attached is referred to as a "fourth source line".

The number "5" is attached to the source line arranged to the right of the fourth source line. In the following description, the source line with the number "5" attached is referred to as a "fifth source line".

The number "6" is attached to the source line arranged to the right of the fifth source line. In the following description, the source line with the number "6" attached is referred to as a "sixth source line".

In the following description, a part or all of the source line with the odd number attached (that is, the first source line, third source line, and fifth source line) is referred to as an "odd source line". A part or all of the source line with the even number attached (that is, the second source line, fourth source line, and sixth source line) is referred to as an "even source line".

In the present embodiment, the display surface 120 displays pictures, using red, green, and blue hues. Along the first source line and the fourth source line, a plurality of pixels that emit light in one hue selected from these hues (i.e., red, green, and blue hues) are arrayed. Along the second source line and the fifth source line, a plurality of pixels that emit light in another hue selected from these hues are arrayed. Along the third source line and the sixth source line, a plurality of pixels that emit light in the other hue selected from these hues are arrayed. In the present embodiment, the pixels arrayed along the first source line and the fourth source line are illustrated as a first pixel group. Each of the pixels arrayed along the first source line and the fourth source line are illustrated as a first pixel. A luminescent color of the pixels arrayed along the first source line and the fourth source line is illustrated as a first hue. The pixels arrayed along the second source line and the fifth source line are illustrated as a second pixel group. Each of the pixels arrayed along the second source line and the fifth source line are illustrated as a second pixel. A luminescent color of the pixels arrayed along the second source line and the fifth source line is illustrated as a second hue. The pixels arrayed along the third source line and the sixth source line are illustrated as a third pixel group. Each of the pixels arrayed along the third source line and the sixth source line are illustrated as a third pixel. A luminescent color of the pixels arrayed along the third source line and the sixth source line is illustrated as a third hue.

In FIG. 2, signs of "+" and "−" are shown, corresponding to the respective source lines. The relevant signs represent polarity of the inspection signal input through the horizontal wiring region 130. The inspection signal may be a high-frequency signal. In this case, the display surface 120 emits light in a white and/or black hue as a whole. An inspector conducting the inspection can observe the display surface 120 to find out a defect of the source lines.

As illustrated in FIG. 2, when the signal having the polarity of "+" is input to the odd source lines, the signal having the polarity of "−" is input to the even source lines. When the signal having the polarity of "−" is input to the odd source lines, the signal having the polarity of "+" is input to the even source lines.

(Inspection Wiring Portion)

Hereinafter, inspection wiring portions having various lamination patterns formed in the horizontal wiring region 130 will be described.

(First Lamination Pattern)

Figure 3:
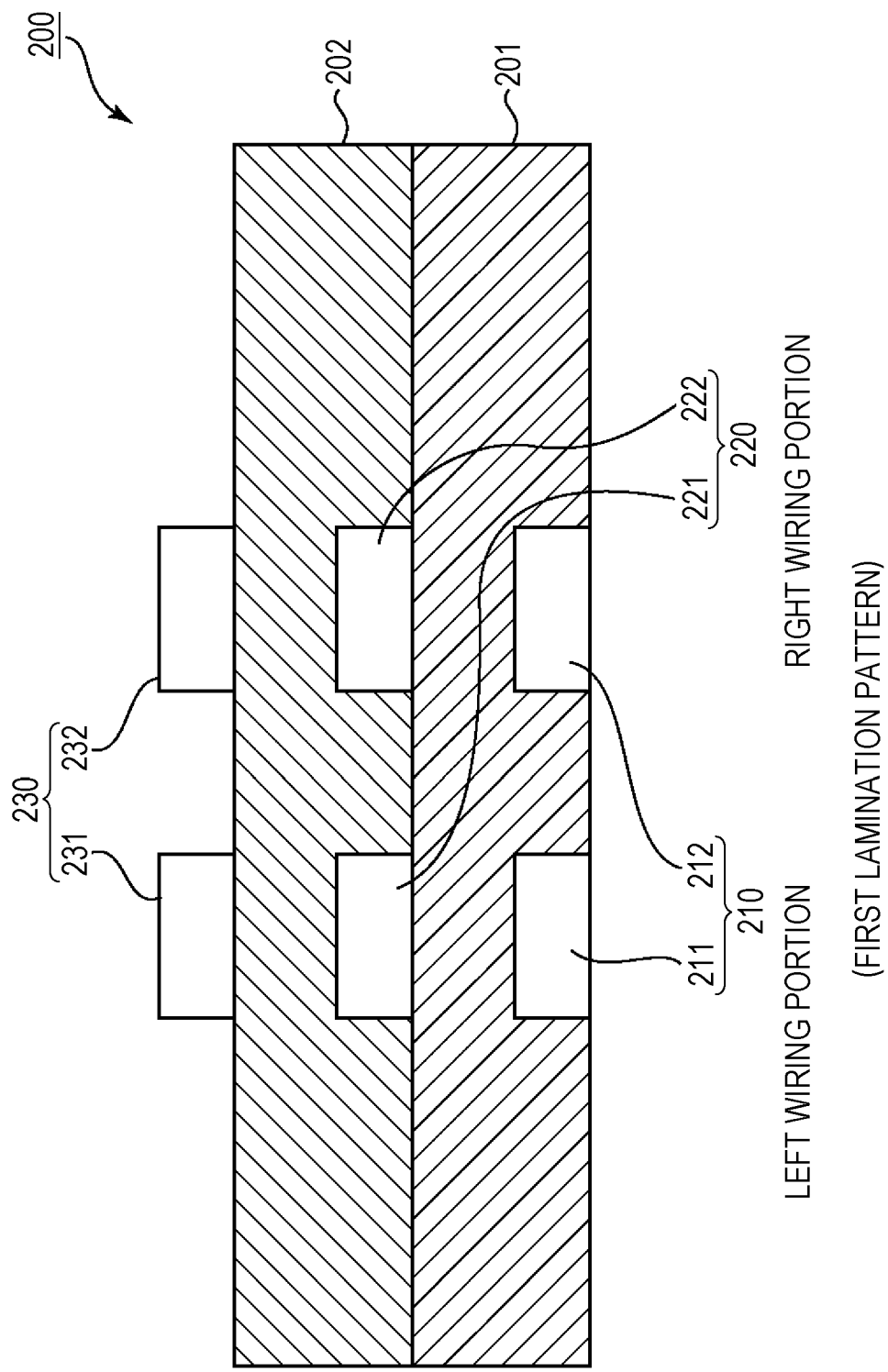
FIG. 3 is a schematic cross-sectional view of an inspection wiring portion having a first lamination pattern.

FIG. 3 is a schematic cross-sectional view of an inspection wiring portion 200 having a first lamination pattern. Referring to FIGS. 1 to 3, the inspection wiring portion 200 will be described.

The inspection wiring portion 200 includes a first conductive layer 210, a first insulating layer 201, a second conductive layer 220, a second insulating layer 202, and a third conductive layer 230. The first conductive layer 210 is connected to a part of the many source lines described with reference to FIG. 1. The second conductive layer 220 is connected to another part of the many source lines described with reference to FIG. 1. The third conductive layer 230 is connected to other part of the many source lines described with reference to FIG. 1. The inspection signal described with reference to FIG. 2 is transmitted to the respective source lines described with reference to FIG. 1 through the first conductive layer 210, the second conductive layer 220, and the third conductive layer 230.

The first insulating layer 201 covers the first conductive layer 210. Accordingly, the first insulating layer 201 properly insulates the first conductive layer 210 and the second conductive layer 220 laminated on the first conductive layer 210. The second insulating layer 202 covers the second conductive layer 220. Accordingly, the second insulating layer 202 properly insulates the second conductive layer 220 and the third conductive layer 230 laminated on the second conductive layer 220. In the present embodiment, the first insulating layer 201 and the second insulating layer 202 are illustrated as an insulating portion.

The first conductive layer 210 includes a left inspection line 211 and a right inspection line 212. The left inspection line 211 is connected to one odd source line of the first source line and the third source line between the second source line and the fourth source line. The right inspection line 212 is connected to one even source line of the second source line between the first source line and the third source line, and the fourth source line between the third source line and the fifth source line. In the present embodiment, the left inspection line 211 is illustrated as a first inspection line. The right inspection line 212 is illustrated as a second inspection line.

The second conductive layer 220 includes a left inspection line 221 and a right inspection line 222. The left inspection line 221 is connected to the other odd source line of the first source line and the third source line. The right inspection line 222 is connected to the other even source line of the second source line and the fourth source line. In the present embodiment, the left inspection line 221 is illustrated as a third inspection line. The right inspection line 222 is illustrated as a fourth inspection line.

The third conductive layer 230 includes a left inspection line 231 and a right inspection line 232. The left inspection line 231 is connected to the fifth source line between the fourth source line and the sixth source line. The right inspection line 232 is connected to the sixth source line. In the present embodiment, the left inspection line 231 is illustrated as a fifth inspection line. The right inspection line 232 is illustrated as a sixth inspection line.

The left inspection line 221 of the second conductive layer 220 is laminated closer to the left inspection line 211 of the first conductive layer 210 than the right inspection line 212 of the first conductive layer 210. The right inspection line 222 of the second conductive layer 220 is laminated closer to the right inspection line 212 of the first conductive layer 210 than the left inspection line 211 of the first conductive layer 210. The left inspection line 231 of the third conductive layer 230 is laminated closer to the left inspection line 221 of the second conductive layer 220 than the right inspection line 222 of the second conductive layer 220. The right inspection line 232 of the third conductive layer 230 is laminated closer to the right inspection line 222 of the second conductive layer 220 than the left inspection line 221 of the second conductive layer 220.

The inspection wiring portion 200 has a left wiring portion where the left inspection lines 211, 221, 231 are close to one another, and a right wiring portion where the right inspection lines 212, 222, 232 are close to one another. In order to transmit the inspection signal having the polarity of "+" to the odd source lines, the inspection signal having the polarity of "+" is supplied to the left inspection lines 211, 221, 231. Since the polarity of the inspection signal coincides among the close left inspection lines 211, 221, 231, interference by the signal is difficult to occur among the left inspection lines 211, 221, 231. In order to transmit the inspection signal having the polarity of "−" to the even source lines, the inspection signal having the polarity of "−" is supplied to the right inspection lines 212, 222, 232. Since the polarity of the inspection signal coincides among the close right inspection lines 212, 222, 232, interference by the signal is difficult to occur among the right inspection lines 212, 222, 232. A distance between the left wiring portion and the right wiring portion is properly set so as to make negligible a level of capacitive coupling between the left wiring portion and the right wiring portion.

In the present embodiment, the left wiring portion is connected to the odd source lines. Alternatively, the left wiring portion may be connected to the even source lines. In this case, the right wiring portion is connected to the odd source lines.

In the case where the left wiring portion is connected to the odd source lines, combination patterns between the three inspection lines in the left wiring portion and the three odd source lines, and combination patterns between the three inspection lines in the right wiring portion and the three even source lines do not limit a principle of the present embodiment. In the case where the left wiring portion is connected to the even source lines, combination patterns between the three inspection lines in the left wiring portion and the three even source lines, and combination patterns between the three inspection lines in the right wiring portion and the three odd source lines do not limit a principle of the present embodiment.

According to a principle of the first lamination pattern, an area (a vertical dimension) required for the horizontal wiring region 130 is smaller than that in the related art. Alternatively, the horizontal wiring region 130 can allow for arrangement of second inspection lines. Accordingly, resistances of the inspection lines are lower than those in the related art.

(Second Lamination Pattern)

Figure 4:
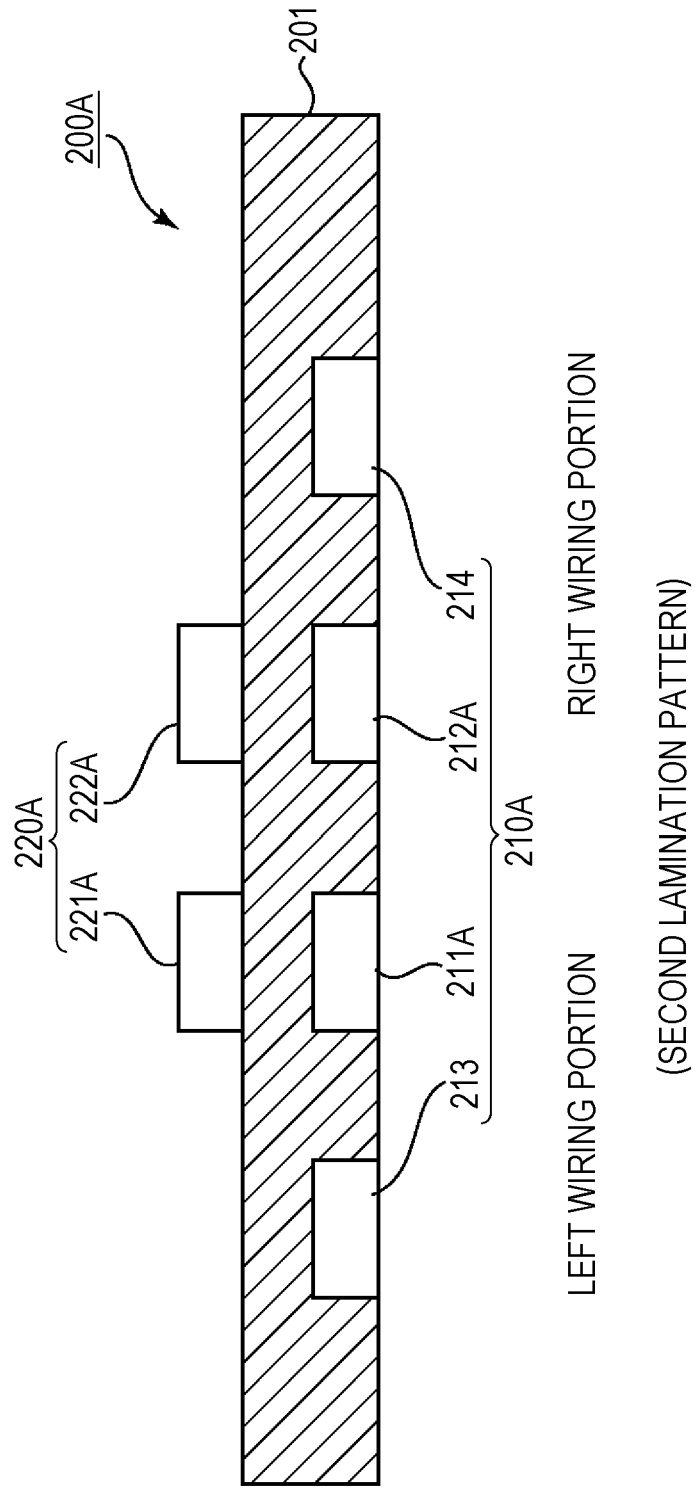
FIG. 4 is a schematic cross-sectional view of an inspection wiring portion having a second lamination pattern.

FIG. 4 is a schematic cross-sectional view of an inspection wiring portion 200A having a second lamination pattern. Referring to FIGS. 1, 2, and 4, the inspection wiring portion 200A will be described. The same reference numerals are attached to the same elements as those in the first lamination pattern. The description of the first lamination pattern is cited for elements with the same reference numerals attached.

As in the first lamination pattern, the inspection wiring portion 200A includes the first insulating layer 201. The inspection wiring portion 200A further includes a first conductive layer 210A and a second conductive layer 220A. The second conductive layer 220A is laminated on the first conductive layer 210A with the first insulating layer 201 interposed. Accordingly, the second conductive layer 220A is properly insulated from the first conductive layer 210A by the first insulating layer 201.

The first conductive layer 210A includes an inner left inspection line 211A, an outer left inspection line 213, an inner right inspection line 212A, and an outer right inspection line 214. The outer left inspection line 213 is arranged to the left of the inner left inspection line 211A. The outer right inspection line 214 is arranged to the right of the inner right inspection line 212A. The inner left inspection line 211A is arranged between the outer left inspection line 213 and the inner right inspection line 212A. The inner right inspection line 212A is arranged between the inner left inspection line 211A and the outer right inspection line 214.

The second conductive layer 220A includes an inner left inspection line 221A and an inner right inspection line 222A. The inner left inspection line 221A of the second conductive layer 220A is laminated on the first insulating layer 201 closer to the inner left inspection line 211A of the first conductive layer 210A than the outer left inspection line 213 of the first conductive layer 210A and the inner right inspection line 212A of the first conductive layer 210A. The inner right inspection line 222A of the second conductive layer 220A is laminated on the first insulating layer 201 closer to the inner right inspection line 212A of the first conductive layer 210A than the inner left inspection line 211A of the first conductive layer 210A and the outer right inspection line 214 of the first conductive layer 210A.

In the present embodiment, the inner left inspection line 211A, 221A and the outer left inspection line 213 are connected to the odd source lines. The inner right inspection line 212A, 222A and the outer right inspection line 214 are connected to the even source lines.

If the outer left inspection line 213 is connected to the fifth source line, the inner left inspection line 211A of the first conductive layer 210A may be connected to one of the first source line and the third source line, and the inner left inspection line 221A of the second conductive layer 220A may be connected to the other of the first source line and the third source line. In this case, the inner left inspection line 211A of the first conductive layer 210A may be exemplified as the first inspection line. The inner left inspection line 221A of the second conductive layer 220A may be exemplified as the third inspection line. The outer left inspection line 213 may be exemplified as the fifth inspection line.

If the outer right inspection line 214 is connected to the sixth source line, the inner right inspection line 212A of the first conductive layer 210A may be connected to one of the second source line and the fourth source line, and the inner right inspection line 222A of the second conductive layer 220A may be connected to the other of the second source line and the fourth source line. In this case, the inner right inspection line 212A of the first conductive layer 210A may be exemplified as the second inspection line. The inner right inspection line 222A of the second conductive layer 220A may be exemplified as the fourth inspection line. The outer right inspection line 214 may be exemplified as the sixth inspection line.

The inspection wiring portion 200A has the left wiring portion where the inner left inspection line 211A of the first conductive layer 210A, the outer left inspection line 213 of the first conductive layer 210A, and the inner left inspection line 221A of the second conductive layer 220A are close to one another, and the right wiring portion where the inner right inspection line 212A of the first conductive layer 210A, the outer right inspection line 214 of the first conductive layer 210A, and the inner right inspection line 222A of the second conductive layer 220A are close to one another. In order to transmit the inspection signal having the polarity of "+" to the odd source lines, the inspection signal having the polarity of "+" is supplied to the inner left inspection line 211A of the first conductive layer 210A, the outer left inspection line 213 of the first conductive layer 210A, and the inner left inspection line 221A of the second conductive layer 220A. Since the polarity of the inspection signal coincides among the inner left inspection line 211A of the first conductive layer 210A, the outer left inspection line 213 of the first conductive layer 210A, and the inner left inspection line 221A of the second conductive layer 220A, interference by the signal is difficult to occur among the inner left inspection line 211A of the first conductive layer 210A, the outer left inspection line 213 of the first conductive layer 210A, and the inner left inspection line 221A of the second conductive layer 220A.

In order to transmit the inspection signal having the polarity of "−" to the even source lines, the inspection signal having the polarity of "−" is supplied to the inner right inspection line 212A of the first conductive layer 210A, the outer right inspection line 214 of the first conductive layer 210A, and the inner right inspection line 222A of the second conductive layer 220A. Since the polarity of the inspection signal coincides among the inner right inspection line 212A of the first conductive layer 210A, the outer right inspection line 214 of the first conductive layer 210A, and the inner right inspection line 222A of the second conductive layer 220A, interference by the signal is difficult to occur among the inner right inspection line 212A of the first conductive layer 210A, the outer right inspection line 214 of the first conductive layer 210A, and the inner right inspection line 222A of the second conductive layer 220A. The distance between the left wiring portion and the right wiring portion is properly set so as to make negligible the level of capacitive coupling between the left wiring portion and the right wiring portion.

In the present embodiment, the left wiring portion is connected to the odd source lines. Alternatively, the left wiring portion may be connected to the even source lines. In this case, the right wiring portion is connected to the odd source lines.

In the case where the left wiring portion is connected to the odd source lines, combination patterns between the three inspection lines in the left wiring portion and the three odd source lines, and combination patterns between the three inspection lines in the right wiring portion and the three even source lines do not limit a principle of the present embodiment. In the case where the left wiring portion is connected to the even source lines, combination patterns between the three inspection lines in the left wiring portion and the three even source lines, and combination patterns between the three inspection lines in the right wiring portion and the three odd source lines do not limit a principle of the present embodiment.

(Third Lamination Pattern)

Figure 5:
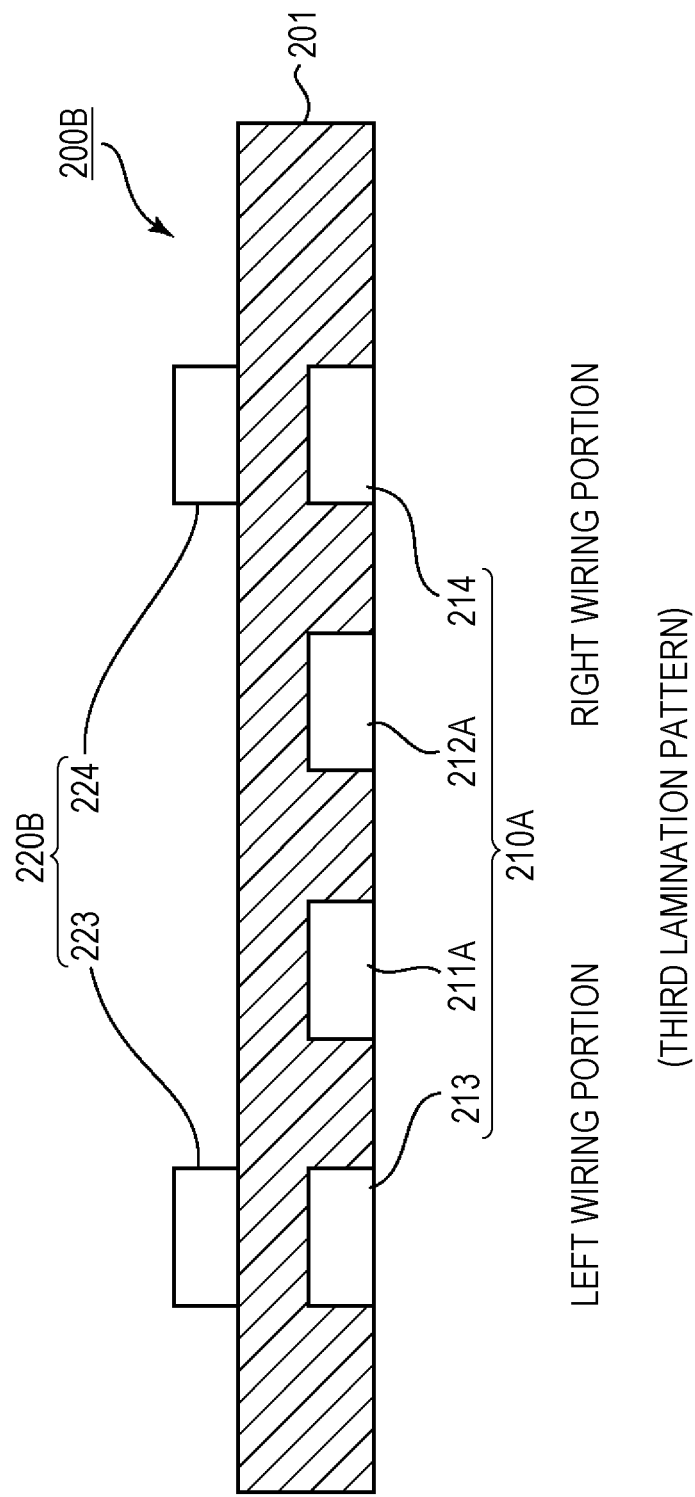
FIG. 5 is a schematic cross-sectional view of an inspection wiring portion having a third lamination pattern.

FIG. 5 is a schematic cross-sectional view of an inspection wiring portion 200B having a third lamination pattern. Referring to FIGS. 1, 2, and 5, the inspection wiring portion 200B will be described. The same reference numerals are attached to the same elements as those in the second lamination pattern. The description of the second lamination pattern is cited for elements with the same reference numerals attached.

As in the second lamination pattern, the inspection wiring portion 200B includes the first conductive layer 210A and the first insulating layer 201. The inspection wiring portion 200B further includes a second conductive layer 220B. The second conductive layer 220B is laminated on the first conductive layer 210A with the first insulating layer 201 interposed. Accordingly, the second conductive layer 220B is properly insulated from the first conductive layer 210A by the first insulating layer 201.

The second conductive layer 220B includes an outer left inspection line 223 and an outer right inspection line 224. The outer left inspection line 223 of the second conductive layer 220B is laminated on the first insulating layer 201 closer to the outer left inspection line 213 of the first conductive layer 210A than the inner left inspection line 211A of the first conductive layer 210A. The outer right inspection line 224 of the second conductive layer 220B is laminated on the first insulating layer 201 closer to the outer right inspection line 214 of the first conductive layer 210A than the inner right inspection line 212A of the first conductive layer 210A.

In the present embodiment, the inner left inspection line 211A and the outer left inspection lines 213, 223 are connected to the odd source lines. The inner right inspection line 212A and the outer right inspection lines 214, 224 are connected to the even source lines.

If the inner left inspection line 211A is connected to the fifth source line, the outer left inspection line 213 of the first conductive layer 210A may be connected to one of the first source line and the third source line, and the outer left inspection line 223 of the second conductive layer 220B may be connected to the other of the first source line and the third source line. In this case, the outer left inspection line 213 of the first conductive layer 210A may be exemplified as the first inspection line. The outer left inspection line 223 of the second conductive layer 220B may be illustrated as the third inspection line. The inner left inspection line 211A may be exemplified as the fifth inspection line.

If the inner right inspection line 212A is connected to the sixth source line, the outer right inspection line 214 of the first conductive layer 210A may be connected to one of the second source line and the fourth source line, and the outer right inspection line 224 of the second conductive layer 220B may be connected to the other of the second source line and the fourth source line. In this case, the outer right inspection line 224 of the second conductive layer 220B may be exemplified as the fourth inspection line. The outer right inspection line 224 of the second conductive layer 220B may be exemplified as the fourth inspection line. The inner right inspection line 212A may be exemplified as the sixth inspection line.

The inspection wiring portion 200B has the left wiring portion where the inner left inspection line 211A of the first conductive layer 210A, the outer left inspection line 213 of the first conductive layer 210A, and the outer left inspection line 223 of the second conductive layer 220B are close to one another, and the right wiring portion where the inner right inspection line 212A of the first conductive layer 210A, the outer right inspection line 214 of the first conductive layer 210A, and the outer right inspection line 224 of the second conductive layer 220A are close to one another. In order to transmit the inspection signal having the polarity of "+" to the odd source lines, the inspection signal having the polarity of "+" is supplied to the inner left inspection line 211A of the first conductive layer 210A, the outer left inspection line 213 of the first conductive layer 210A, and the outer left inspection line 223 of the second conductive layer 220B. Since the polarity of the inspection signal coincides among the inner left inspection line 211A of the first conductive layer 210A, the outer left inspection line 213 of the first conductive layer 210A, and the outer left inspection line 223 of the second conductive layer 220B, interference by the signal is difficult to occur among the inner left inspection line 211A of the first conductive layer 210A, the outer left inspection line 213 of the first conductive layer 210A, and the outer left inspection line 223 of the second conductive layer 220B. In order to transmit the inspection signal having the polarity of "−" to the even source lines, the inspection signal having the polarity of "−" is supplied to the inner right inspection line 212A of the first conductive layer 210A, the outer right inspection line 214 of the first conductive layer 210A, and the outer right inspection line 224 of the second conductive layer 220B. Since the polarity of the inspection signal coincides among the inner right inspection line 212A of the first conductive layer 210A, the outer right inspection line 214 of the first conductive layer 210A, and the outer right inspection line 224 of the second conductive layer 220B, interference by the signal is difficult to occur among the inner right inspection line 212A of the first conductive layer 210A, the outer right inspection line 214 of the first conductive layer 210A, and the outer right inspection line 224 of the second conductive layer 220B. The distance between the left wiring portion and the right wiring portion is properly set so as to make negligible the level of capacitive coupling between the left wiring portion and the right wiring portion.

In the present embodiment, the left wiring portion is connected to the odd source lines. Alternatively, the left wiring portion may be connected to the even source lines. In this case, the right wiring portion is connected to the odd source lines.

In the case where the left wiring portion is connected to the odd source lines, combination patterns between the three inspection lines in the left wiring portion and the three odd source lines, and combination patterns between the three inspection lines in the right wiring portion and the three even source lines do not limit a principle of the present embodiment. In the case where the left wiring portion is connected to the even source lines, combination patterns between the three inspection lines in the left wiring portion and the three even source lines, and combination patterns between the three inspection lines in the right wiring portion and the three odd source lines do not limit a principle of the present embodiment.

(Other Lamination Patterns Based on the Principles of the Second Lamination Pattern and the Third Lamination Pattern)

Other lamination patterns may be formed, based on the principles of the second lamination pattern and the third lamination pattern. As in the second lamination pattern and the third lamination pattern, the first conductive layer may be formed of the outer left inspection line 213, the inner left inspection line 211A, the inner right inspection line 212A, and the outer right inspection line 214. In this case, the second conductive layer only needs to be formed of one inspection line selected from a pair of the inner left inspection line 221A and the outer left inspection line 223, and one inspection line selected from a pair of the inner right inspection line 222A and the outer right inspection line 224.

If the left wiring portion is connected to the odd source lines, the inspection line forming the second conductive layer of the left wiring portion may be exemplified as the third inspection line. The inspection line of the first conductive layer which the inspection line exemplified as the third inspection line overlaps may be exemplified as the first inspection line. The other inspection line of the left wiring portion may be exemplified as the fifth inspection line.

If the right wiring portion is connected to the even source lines, the inspection line forming the second conductive layer of the right wiring portion may be exemplified as the fourth inspection line. The inspection line of the first conductive layer which the inspection line exemplified as the fourth inspection line overlaps may be exemplified as the second inspection line. The other inspection line of the right wiring portion may be exemplified as the sixth inspection line.

According to the principles of the second lamination pattern and the third lamination pattern, the inspection line exemplified as the fifth inspection line overlaps one of the first inspection line and the third inspection line with the insulating portion interposed. Moreover, the inspection line exemplified as the sixth inspection line overlaps one of the second inspection line and the fourth inspection line with the insulating portion interposed.

According to the principles of the second lamination pattern and the third lamination pattern, the second conductive layer may be formed of the outer left inspection line 223, the inner left inspection line 221A, the inner right inspection line 222A and the outer right inspection line 224. In this case, the first conductive layer only needs to be formed of one inspection line selected from a pair of the inner left inspection line 211A and the outer left inspection line 213, and a pair of the inner right inspection line 212A and the outer right inspection line 214.

If the left wiring portion is connected to the odd source lines, the inspection line forming the first conductive layer of the left wiring portion may be exemplified as the first inspection line. The inspection line of the first conductive layer which the inspection line exemplified as the first inspection line overlaps may be exemplified as the third inspection line. The other inspection line of the left wiring portion may be illustrated as the fifth inspection line.

If the right wiring portion is connected to the even source lines, the inspection line forming the first conductive layer of the right wiring portion may be exemplified as the second inspection line. The inspection line of the second conductive layer that the inspection line exemplified as the second inspection line overlaps may be exemplified as the fourth inspection line. The other inspection line of the right wiring portion may be exemplified as the sixth inspection line.

(Fourth Lamination Pattern)

Figure 6:
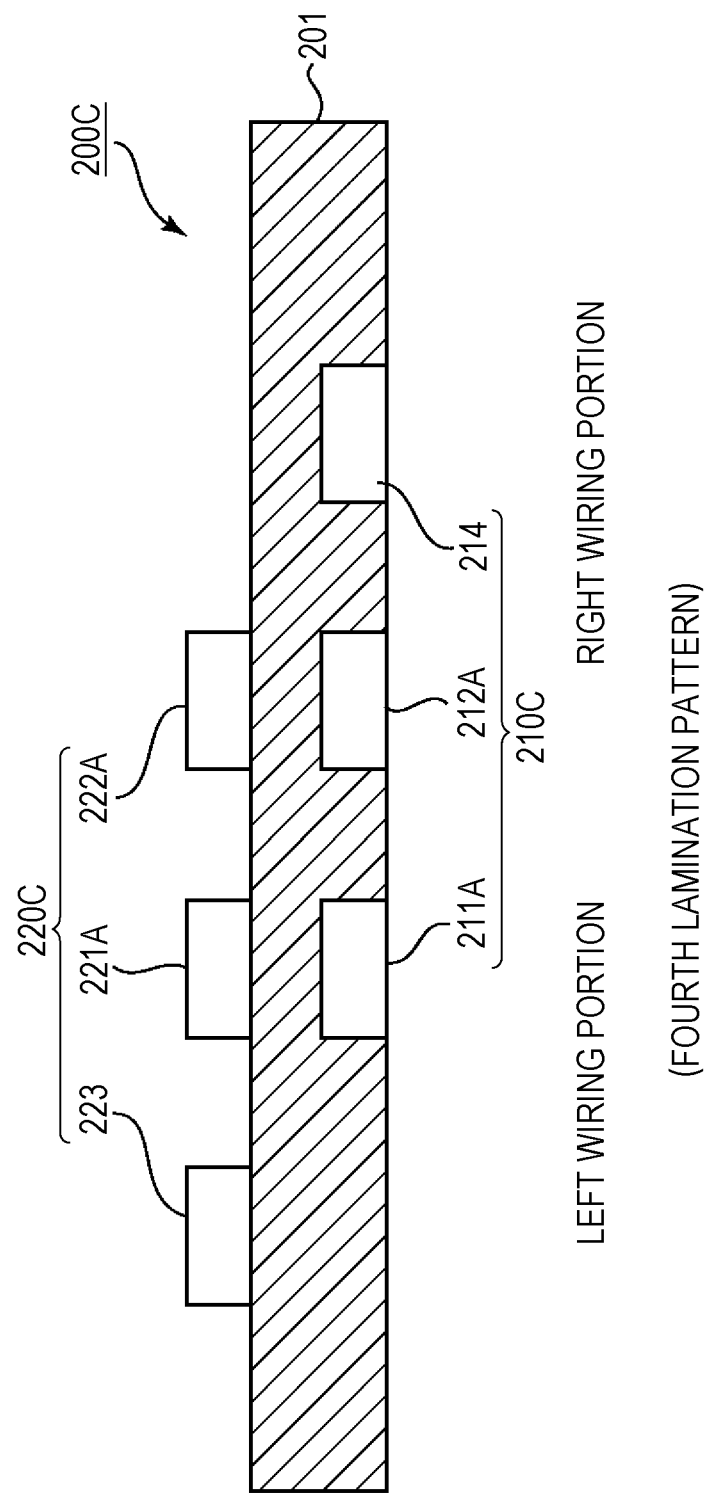
FIG. 6 is a schematic cross-sectional view of an inspection wiring portion having a fourth lamination pattern.

FIG. 6 is a schematic cross-sectional view of an inspection wiring portion 200C having a fourth lamination pattern. Referring to FIGS. 1, 2, and 6, the inspection wiring portion 200C will be described. The same reference numerals are attached to the same elements as those in the second or third lamination pattern. The description of the second or third lamination pattern or the third lamination pattern is cited for elements with the same reference numerals attached.

As in the second lamination pattern, the inspection wiring portion 200C includes the first insulating layer 201. The inspection wiring portion 200C further includes a first conductive layer 210C and a second conductive layer 220C. The second conductive layer 220C is laminated on the first conductive layer 210C with the first insulating layer 201 interposed. Accordingly, the second conductive layer 220C is properly insulated from the first conductive layer 210C by the first insulating layer 201.

The first conductive layer 210C includes the inner left inspection line 211A, the inner right inspection line 212A, and the outer right inspection line 214. The inner right inspection line 212A is arranged between the inner left inspection line 211A and the outer right inspection line 214.

The second conductive layer 220C includes the outer left inspection line 223, the inner left inspection line 221A, and the inner right inspection line 222A. The outer left inspection line 223 is arranged to the left of the inner left inspection line 221A. The inner right inspection line 222A is arranged to the right of the inner left inspection line 221A.

The inner left inspection line 211A of the first conductive layer 210C is arranged closer to the inner left inspection line 221A of the second conductive layer 220C than the outer left inspection line 223 of the second conductive layer 220C and the inner right inspection line 222A of the second conductive layer 220C. The inner right inspection line 212A of the first conductive layer 210C is arranged closer to the inner right inspection line 222A of the second conductive layer 220C than the inner left inspection line 221A of the second conductive layer 220C.

In the present embodiment, the inner left inspection lines 211A, 221A and the outer left inspection line 223 are connected to the odd source lines. The inner right inspection lines 212A, 222A and the outer right inspection line 214 are connected to the even source lines.

If the outer left inspection line 223 of the second conductive layer 220C is connected to the fifth source line, the inner left inspection line 211A of the first conductive layer 210C may be connected to one of the first source line and the third source line, and the inner left inspection line 221A of the second conductive layer 220C may be connected to the other of the first source line and the third source line. In this case, the inner left inspection line 211A of the first conductive layer 210C may be exemplified as the first inspection line. The inner left inspection line 221A of the second conductive layer 220C may be exemplified as the third inspection line. The outer left inspection line 223 may be exemplified as the fifth inspection line.

If the outer right inspection line 214 of the first conductive layer is connected to the sixth source line, the inner right inspection line 212A of the first conductive layer 210C may be connected to one of the second source line and the fourth source line, and the inner right inspection line 222A of the second conductive layer 220C may be connected to the other of the second source line and the fourth source line. In this case, the inner right inspection line 212A of the first conductive layer 210C may be exemplified as the second inspection line. The inner right inspection line 222A of the second conductive layer 220C may be exemplified as the fourth inspection line. The outer right inspection line 214 may be exemplified as the sixth inspection line.

The inspection wiring portion 200C has the left wiring portion where the inner left inspection line 211A of the first conductive layer 210C, the outer left inspection line 223 of the second conductive layer 220C, and the inner right inspection line 221A of the second conductive layer 220C are close to one another, and the right wiring portion where the inner right inspection line 212A of the first conductive layer 210C, the outer right inspection line 214 of the first conductive layer 210C, and the inner right inspection line 222A of the second conductive layer 220C are close to one another. In order to transmit the inspection signal having the polarity of "+" to the odd source lines, the inspection signal having the polarity of "+" is supplied to the inner left inspection line 211A of the first conductive layer 210C, the outer left inspection line 223 of the second conductive layer 220C, and the inner left inspection line 221A of the second conductive layer 220C. Since the polarity of the inspection signal coincides among the inner left inspection line 211A of the first conductive layer 210C, the outer left inspection line 223 of the second conductive layer 220C, and the inner left inspection line 221A of the second conductive layer 220C, interference by the signal is difficult to occur among the inner left inspection line 211A of the first conductive layer 210C, the outer left inspection line 223 of the second conductive layer 220CA, and the inner left inspection line 221A of the second conductive layer 220C. In order to transmit the inspection signal having the polarity of "−" to the even source lines, the inspection signal having the polarity of "−" is supplied to the inner right inspection line 212A of the first conductive layer 210C, the outer right inspection line 214 of the first conductive layer 210C, and the inner right inspection line 222A of the second conductive layer 220C. Since the polarity of the inspection signal coincides among the inner right inspection line 212A of the first conductive layer 210C, the outer right inspection line 214 of the first conductive layer 210C, and the inner right inspection line 222A of the second conductive layer 220C, interference by the signal is difficult to occur among the inner right inspection line 212A of the first conductive layer 210C, the outer right inspection line 214 of the first conductive layer 210C, and the inner right inspection line 222A of the second conductive layer 220C. The distance between the left wiring portion and the right wiring portion is properly set so as to make negligible the level of capacitive coupling between the left wiring portion and the right wiring portion.

In the present embodiment, the left wiring portion is connected to the odd source lines. Alternatively, the left wiring portion may be connected to the even source lines. In this case, the right wiring portion is connected to the odd source lines.

In the case where the left wiring portion is connected to the odd source lines, combination patterns between the three inspection lines in the left wiring portion and the three odd source lines, and combination patterns between the three inspection lines in the right wiring portion and the three even source lines do not limit a principle of the present embodiment. In the case where the left wiring portion is connected to the even source lines, combination patterns between the three inspection lines in the left wiring portion and the three even source lines, and combination patterns between the three inspection lines in the right wiring portion and the three odd source lines do not limit a principle of the present embodiment.

(Fifth Lamination Pattern)

Figure 7:
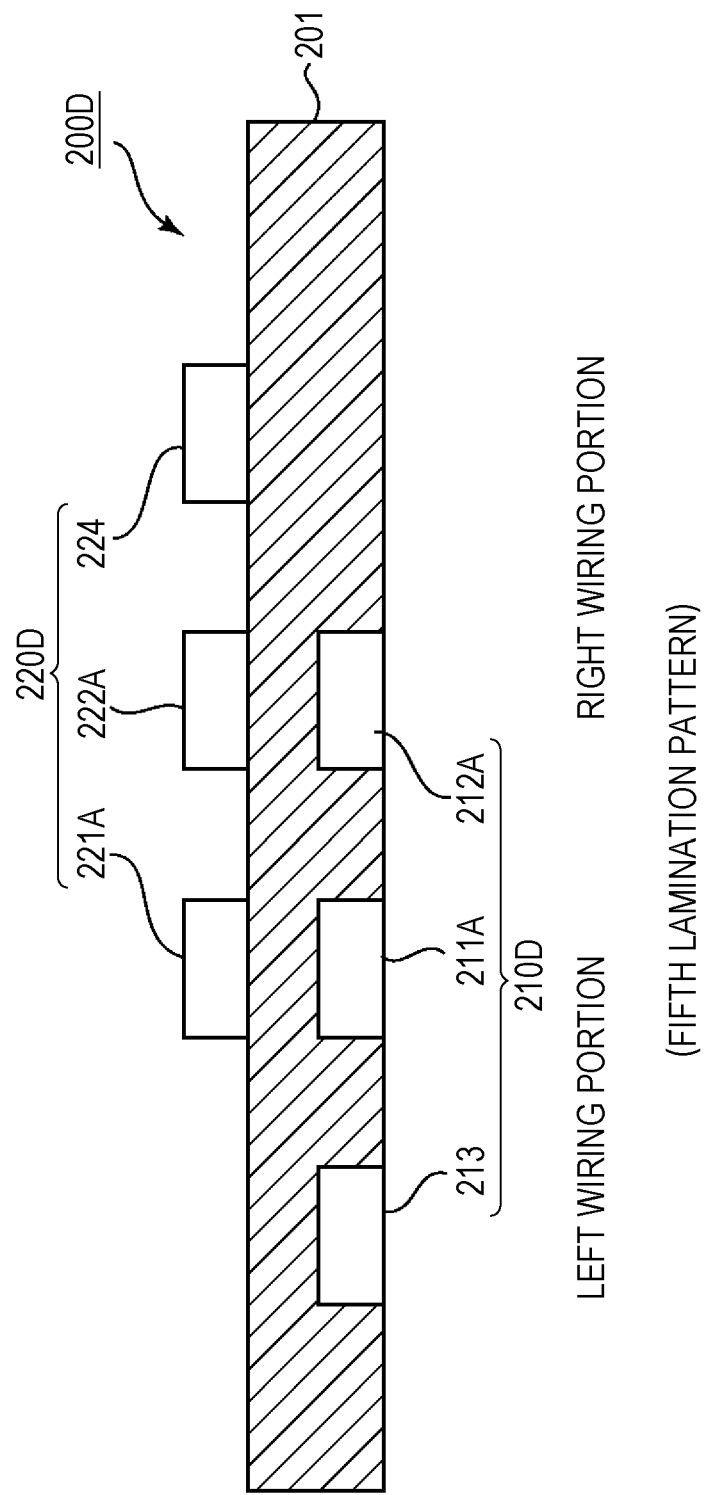
FIG. 7 is a schematic cross-sectional view of an inspection wiring portion having a fifth lamination pattern.

FIG. 7 is a schematic cross-sectional view of an inspection wiring portion 200D having a fifth lamination pattern. Referring to FIGS. 1, 2, and 7, the inspection wiring portion 200D will be described. The same reference numerals are attached to the same elements as those in the second or third lamination pattern. The description of the second or third lamination pattern or the third lamination pattern is cited for elements with the same reference numerals attached.

As in the second lamination pattern, the inspection wiring portion 200D includes the first insulating layer 201. The inspection wiring portion 200D further includes a first conductive layer 210D and a second conductive layer 220D. The second conductive layer 220D is laminated on the first conductive layer 210D with the first insulating layer 201 interposed. Accordingly, the second conductive layer 220D is properly insulated from the first conductive layer 210D by the first insulating layer 201.

The first conductive layer 210D includes the outer left inspection line 213, the inner left inspection line 211A, and the inner right inspection line 212A. The inner left inspection line 211A is arranged between the outer left inspection line 213 and the inner right inspection line 212A.

The second conductive layer 220D includes the inner left inspection line 221A, the inner right inspection line 222A, and the outer right inspection line 224. The inner left inspection line 221A is arranged to the left of the inner right inspection line 222A. The outer right inspection line 224 is arranged to the right of the inner right inspection line 222A.

The inner left inspection line 211A of the first conductive layer 210D is arranged closer to the inner left inspection line 221A of the second conductive layer 220D than the inner right inspection line 222A of the second conductive layer 220D. The inner right inspection line 212A of the first conductive layer 210D is arranged closer to the inner right inspection line 222A of the second conductive layer 220D than the inner left inspection line 221A of the second conductive layer 220D and the outer right inspection line 224 of the second conductive layer 220D.

In the present embodiment, the inner left inspection lines 211A, 221A and the outer left inspection line 213 are connected to the odd source lines. The inner right inspection lines 212A, 222A and the outer right inspection line 224 are connected to the even source lines.

If the outer left inspection line 213 of the first conductive layer 210D is connected to the fifth source line, the inner left inspection line 211A of the first conductive layer 210D may be connected to one of the first source line and the third source line, and the inner left inspection line 221A of the second conductive layer 220D may be connected to the other of the first source line and the third source line. In this case, the inner left inspection line 211A of the first conductive layer 210D may be exemplified as the first inspection line. The inner left inspection line 221A of the second conductive layer 220D may be exemplified as the third inspection line. The outer left inspection line 213 of the first conductive layer 210D may be exemplified as the fifth inspection line.

If the outer right inspection line 224 of the second conductive layer 220D is connected to the sixth source line, the inner right inspection line 212A of the first conductive layer 210D may be connected to one of the second source line and the fourth source line, and the inner right inspection line 222A of the second conductive layer 220D may be connected to the other of the second source line and the fourth source line. In this case, the inner right inspection line 212A of the first conductive layer 210D may be exemplified as the second inspection line. The inner right inspection line 222A of the second conductive layer 220D may be exemplified as the fourth inspection line. The outer right inspection line 224 of the second conducive layer 220D may be exemplified as the sixth inspection line.

The inspection wiring portion 200D has the left wiring portion where the outer left inspection line 213 of the first conductive layer 210D, the inner left inspection line 211A of the first conductive layer 210D, and the inner left inspection line 221A of the second conductive layer 220D are close to one another, and the right wiring portion where the inner right inspection line 212A of the first conductive layer 210D, the outer right inspection line 224 of the second conductive layer 220D, and the inner right inspection line 222A of the second conductive layer 220D are close to one another. In order to transmit the inspection signal having the polarity of "+" to the odd source lines, the inspection signal having the polarity of "+" is supplied to the outer left inspection line 213 of the first conductive layer 210D, the inner left inspection line 211A of the first conductive layer 210D, and the inner left inspection line 221A of the second conductive layer 220D. Since the polarity of the inspection signal coincides among the outer left inspection line 213 of the first conductive layer 210D, the inner left inspection line 211A of the first conductive layer 210D, and the inner left inspection line 221A of the second conductive layer 220D, interference by the signal is difficult to occur among the outer left inspection line 213 of the first conductive layer 210D, the inner left inspection line 211A of the first conductive layer 210D, and the inner left inspection line 221A of the second conductive layer 220D. In order to transmit the inspection signal having the polarity of "−" to the even source lines, the inspection signal having the polarity of "−" is supplied to the inner right inspection line 212A of the first conductive layer 210D, the outer right inspection line 224 of the second conductive layer 220D, and the inner right inspection line 222A of the second conductive layer 220D. Since the polarity of the inspection signal coincides among the inner right inspection line 212A of the first conductive layer 210D, the outer right inspection line 224 of the second conductive layer 220D, and the inner right inspection line 222A of the second conductive layer 220D, interference by the signal is difficult to occur among the inner right inspection line 212A of the first conductive layer 210D, the outer right inspection line 224 of the second conductive layer 220D, and the inner right inspection line 222A of the second conductive layer 220D. The distance between the left wiring portion and the right wiring portion is properly set so as to make negligible the level of capacitive coupling between the left wiring portion and the right wiring portion.

In the present embodiment, the left wiring portion is connected to the odd source lines. Alternatively, the left wiring portion may be connected to the even source lines. In this case, the right wiring portion is connected to the odd source lines.

In the case where the left wiring portion is connected to the odd source lines, combination patterns between the three inspection lines in the left wiring portion and the three odd source lines, and combination patterns between the three inspection lines in the right wiring portion and the three even source lines do not limit a principle of the present embodiment. In the case where the left wiring portion is connected to the even source lines, combination patterns between the three inspection lines in the left wiring portion and the three even source lines, and combination patterns between the three inspection lines in the right wiring portion and the three odd source lines do not limit a principle of the present embodiment.

(Other Lamination Patterns Based on the Principles of the Fourth Lamination Pattern and the Fifth Lamination Pattern)

Other lamination patterns may be formed, based on the principles of the fourth lamination pattern and the fifth lamination pattern. According to the principles of the fourth lamination pattern and the fifth lamination pattern, the first conductive layer may be formed of three inspection lines selected from a group of the outer left inspection line 213, the inner left inspection line 211A, the inner right inspection line 212A, and the outer right inspection line 214. Similarly, the second conductive layer may be formed of three inspection lines selected from a group of the outer left inspection line 223, the inner left inspection line 221A, the inner right inspection line 222A and the outer right inspection line 224.

If two inspection lines (the outer left inspection line 213 and the inner left inspection line 211A) are selected as the left wiring portion from the first conductive layer, one inspection line (the outer left inspection line 223 or the inner left inspection line 221A) is selected from the second conductive layer. In this case, one inspection line (the inner right inspection line 212A or the outer right inspection line 214) is selected as the right wiring portion from the first conductive layer, and two inspection lines (the outer right inspection line 224 and the inner right inspection line 222A) are selected as the right wiring portion from the second conductive layer.

If one inspection line (the outer left inspection line 213 or the inner left inspection line 211A) is selected as the left wiring portion from the first conductive layer, two inspection line (the outer left inspection line 223 or the inner left inspection line 221A) is selected from the second conductive layer. In this case, two inspection lines (the inner right inspection line 212A and the outer right inspection line 214) are selected as the right wiring portion from the first conductive layer, and one inspection line (the outer right inspection line 214 and the inner right inspection line 212A) is selected as the right wiring portion from the second conductive layer.

If the left wiring portion is connected to the odd source lines, and one inspection line is selected as the left wiring portion from the first conductive layer, the inspection line of the left wiring portion in the first conductive layer may be exemplified as the first inspection line. The inspection line in the second conductive layer overlapping the inspection line exemplified as the first inspection line may be exemplified as the third inspection line. The other inspection line of the left wiring portion in the second conductive layer may be exemplified as the fifth inspection line.

If the right wiring portion is connected to the even source lines, and one inspection line is selected as the right wiring portion from the first conductive layer, the inspection line of the right wiring portion in the first conductive layer may be exemplified as the second inspection line. The inspection line in the second conductive layer overlapping the inspection line exemplified as the second inspection line may be exemplified as the fourth inspection line. The other inspection line of the right wiring portion in the second conductive layer may be exemplified as the sixth inspection line.

If the left wiring portion is connected to the even source lines, and one inspection line is selected as the left wiring portion from the second conductive layer, the inspection line of the left wiring portion in the second conductive layer may be exemplified as the third inspection line. The inspection line in the first conductive layer overlapping the inspection line exemplified as the third inspection line may be exemplified as the first inspection line. The other inspection line of the left wiring portion in the first conductive layer may be exemplified as the fifth inspection line.

If the right wiring portion is connected to the even source lines, and one inspection line is selected as the right wiring portion from the second conductive layer, the inspection line of the right wiring portion in the second conductive layer may be exemplified as the fourth inspection line. The inspection line in the first conductive layer overlapping the inspection line exemplified as the fourth inspection line may be exemplified as the second inspection line. The other inspection line of the right wiring portion in the first conductive layer may be exemplified as the sixth inspection line.

As described above, based on the principles of the fourth lamination pattern and the fifth lamination pattern, the inspection line exemplified as the fifth inspection line is arranged in one of the first conductive layer and the second conductive layer. Moreover, the inspection line exemplified as the sixth inspection line is also arranged in one of the first conductive layer and the second conductive layer.

According to the principles of the second to fifth lamination patterns, the area (the vertical dimension) required for the horizontal wiring region 130 is smaller than that in the related art. Alternatively, the horizontal wiring region 130 can allow for arrangement of second inspection lines. Accordingly, resistances of the inspection lines are lower than those in the related art. Since the number of the layers in the horizontal wiring region 130 is small, as compared with the first lamination pattern, the wiring structure of the horizontal wiring region 130 is difficult to affect the wiring structure of the liquid crystal panel 100.

(Sixth Lamination Pattern)

Figure 8:
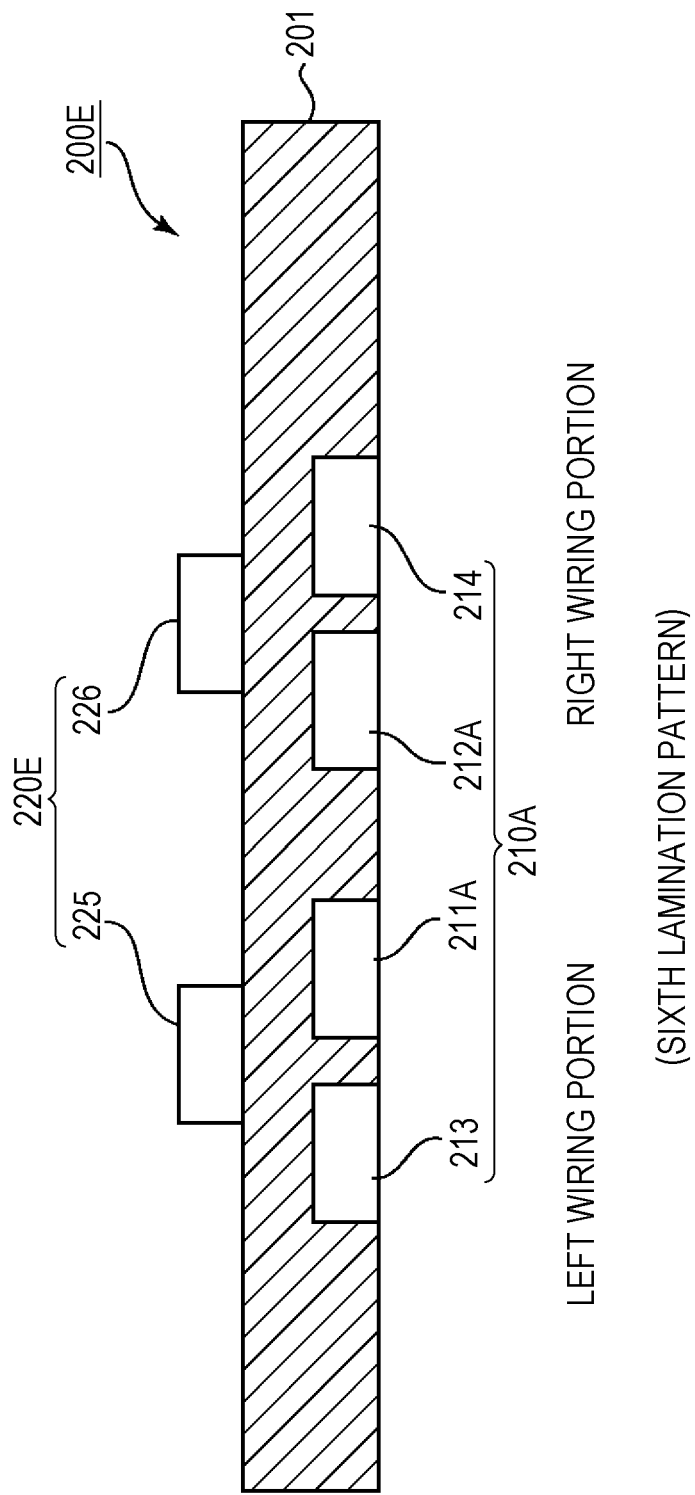
FIG. 8 is a schematic cross-sectional view of an inspection wiring portion having a sixth lamination pattern.

FIG. 8 is a schematic cross-sectional view of an inspection wiring portion 200E having a sixth lamination pattern. Referring to FIGS. 1, 2, and 8, the inspection wiring portion 200E will be described. The same reference numerals are attached to the same elements as those in the second or third lamination pattern. The description of the second or third lamination pattern or the third lamination pattern is cited for elements with the same reference numerals attached.

As in the second lamination pattern, the inspection wiring portion 200E includes a first conductive layer 201A and the first insulating layer 201. The inspection wiring portion 200E further includes a second conductive layer 220E. The second conductive layer 220E is laminated on the first conductive layer 210A with the first insulating layer 201 interposed. Accordingly, the second conductive layer 220E is properly insulated from the first conductive layer 210A by the first insulating layer 201.

The second conductive layer 220E includes an intermediate left inspection line 225 and an intermediate right inspection line 226. The intermediate left inspection line 225 mutually overlaps the outer left inspection line 213 and the inner left inspection line 211A with the first insulating layer 201 interposed. The intermediate right inspection line 226 mutually overlaps the outer right inspection line 214 and the inner right inspection line 212A with the first insulating layer 201 interposed.

In the present embodiment, the intermediate left inspection line 225, the outer left inspection line 213, and the inner left inspection line 211A are used as the left wiring portion connected to the odd source lines. The intermediate right inspection line 226, the outer right inspection line 214, and the inner right inspection line 212A are used as the right wiring portion connected to the even source lines.

Since the intermediate left inspection line 225 partially overlaps the outer left inspection line 213 and the inner left inspection line 211A, the intermediate left inspection line 225 is laminated closer to the inspection lines of the left wiring portion (the outer left inspection line 213 and the inner left inspection line 211A) than the inspection lines of the right wiring portion (the intermediate right inspection line 226, the outer right inspection line 214, and the inner right inspection line 212A). In the present embodiment, one of the outer left inspection line 213 and the inner left inspection line 211A may be exemplified as the first inspection line. The other of the outer left inspection line 213 and the inner left inspection line 211A may be exemplified as the fifth inspection line. The intermediate left inspection line 225 may be exemplified as the third inspection line.

Since the intermediate right inspection line 226 partially overlaps the outer right inspection line 214 and the inner right inspection line 212A, the intermediate right inspection line 226 is laminated closer to the inspection lines of the right wiring portion (the outer right inspection line 214 and the inner right inspection line 212A) than the inspection lines of the left wiring portion (the intermediate left inspection line 225, the outer left inspection line 213, and the inner left inspection line 211A). In the present embodiment, one of the outer right inspection line 214 and the inner right inspection line 212A may be exemplified as the second inspection line. The other of the outer right inspection line 214 and the inner right inspection line 212A may be exemplified as the sixth inspection line. The intermediate right inspection line 226 may be exemplified as the fourth inspection line.

In order to transmit the inspection signal having the polarity of "+" to the odd source lines, the inspection signal having the polarity of "+" is supplied to the intermediate left inspection line 225, the outer left inspection line 213, and the inner left inspection line 211A. Since the polarity of the inspection signal coincides among the intermediate left inspection line 225, the outer left inspection line 213, and the inner left inspection line 211A, interference by the signal is difficult to occur among the intermediate left inspection line 225, the outer left inspection line 213, and the inner left inspection line 211A. Meanwhile, in order to transmit the inspection signal having the polarity of "−" to the even source lines, the inspection signal having the polarity of "−" is supplied to the intermediate right inspection line 226, the outer right inspection line 214, and the inner right inspection line 212A. Since the polarity of the inspection signal coincides among the intermediate right inspection line 226, the outer right inspection line 214, and the inner right inspection line 212A, interference by the signal is difficult to occur among the intermediate right inspection line 226, the outer right inspection line 214, and the inner right inspection line 212A. The distance between the left wiring portion and the right wiring portion is properly set so as to make negligible the level of capacitive coupling between the left wiring portion and the right wiring portion.

In the present embodiment, the left wiring portion is connected to the odd source lines. Alternatively, the left wiring portion may be connected to the even source lines. In this case, the right wiring portion is connected to the odd source lines.

In the case where the left wiring portion is connected to the odd source lines, combination patterns between the three inspection lines in the left wiring portion and the three odd source lines, and combination patterns between the three inspection lines in the right wiring portion and the three even source lines do not limit a principle of the present embodiment. In the case where the left wiring portion is connected to the even source lines, combination patterns between the three inspection lines in the left wiring portion and the three even source lines, and combination patterns between the three inspection lines in the right wiring portion and the three odd source lines do not limit a principle of the present embodiment.

(Seventh Lamination Pattern)

Figure 9:
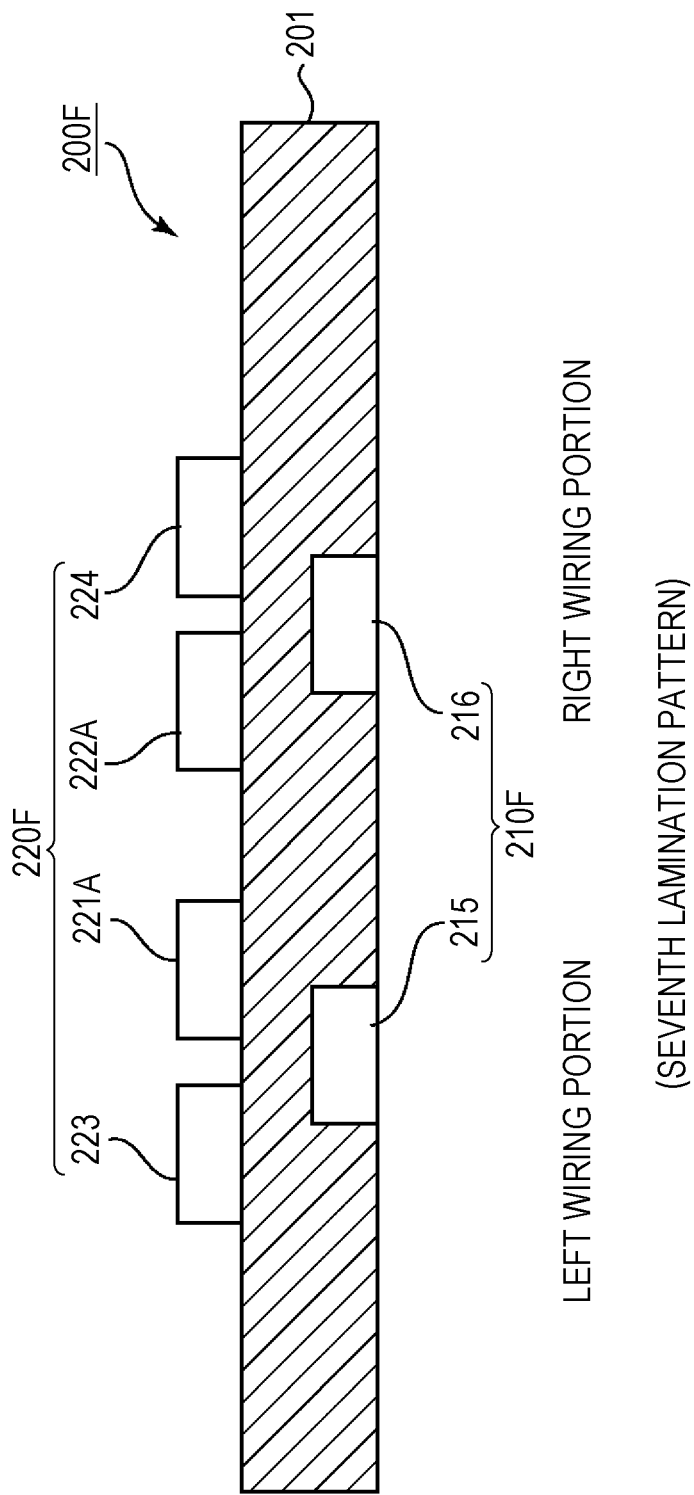
FIG. 9 is a schematic cross-sectional view of an inspection wiring portion having a seventh lamination pattern.

FIG. 9 is a schematic cross-sectional view of an inspection wiring portion 200F having a fourth lamination pattern. Referring to FIGS. 1, 2, and 9, the inspection wiring portion 200F will be described. The same reference numerals are attached to the same elements as those in the second or third lamination pattern. The description of the second or third lamination pattern is cited for elements with the same reference numerals attached.

As in the second lamination pattern, the inspection wiring portion 200F includes the first insulating layer 201. The inspection wiring portion 200F further includes a first conductive layer 210F and a second conductive layer 220F. The second conductive layer 220F is laminated on the first conductive layer 210F with the first insulating layer 201 interposed. Accordingly, the second conductive layer 220F is properly insulated from the first conductive layer 210F by the first insulating layer 201.

The first conductive layer 210F includes an intermediate left inspection line 215 and an intermediate right inspection line 216. The second conductive layer 220F includes the outer left inspection line 223, the inner left inspection line 221A, the inner right inspection line 222A, and the outer right inspection line 224. Both of the outer left inspection line 223 and the inner left inspection line 221A partially overlap the intermediate left inspection line 215. Both of the outer right inspection line 224 and the inner right inspection line 222A partially overlap the intermediate right inspection line 216.

In the present embodiment, the intermediate left inspection line 215, the outer left inspection line 223, and the inner left inspection line 221A are used as the left wiring portion connected to the odd source lines. The intermediate right inspection line 216, the outer right inspection line 224, and the inner right inspection line 222A are used as the right wiring portion connected to the even source lines.

Since the intermediate left inspection line 215 partially overlaps the outer left inspection line 223 and the inner left inspection line 221A, the intermediate left inspection line 215 is arranged closer to the inspection lines of the left wiring portion (the outer left inspection line 223 and the inner left inspection line 221A) than the inspection lines of the right wiring portion (the intermediate right inspection line 216, the outer right inspection line 224, and the inner right inspection line 222A). Since the intermediate right inspection line 216 partially overlaps the outer right inspection line 224 and the inner right inspection line 222A, the intermediate right inspection line 216 is arranged closer to the inspection lines of the right wiring portion (the outer right inspection line 224 and the inner right inspection line 222A) than the inspection lines of the left wiring portion (the intermediate left inspection line 215, the outer left inspection line 223, and the inner left inspection line 221A).

In order to transmit the inspection signal having the polarity of "+" to the odd source lines, the inspection signal having the polarity of "+" is supplied to the intermediate left inspection line 215, the outer left inspection line 223, and the inner left inspection line 221A. Since the polarity of the inspection signal coincides among the intermediate left inspection line 215, the outer left inspection line 223, and the inner left inspection line 221A, interference by the signal is difficult to occur among the intermediate left inspection line 215, the outer left inspection line 223, and the inner left inspection line 221A. Meanwhile, in order to transmit the inspection signal having the polarity of "−" to the even source lines, the inspection signal having the polarity of "−" is supplied to the intermediate right inspection line 216, the outer right inspection line 224, and the inner right inspection line 222A. Since the polarity of the inspection signal coincides among the intermediate right inspection line 216, the outer right inspection line 224, and the inner right inspection line 222A, interference by the signal is difficult to occur among the intermediate right inspection line 216, the outer right inspection line 224, and the inner right inspection line 222A. The distance between the left wiring portion and the right wiring portion is properly set so as to make negligible the level of capacitive coupling between the left wiring portion and the right wiring portion.

In the present embodiment, the left wiring portion is connected to the odd source lines. Alternatively, the left wiring portion may be connected to the even source lines. In this case, the right wiring portion is connected to the odd source lines.

In the case where the left wiring portion is connected to the odd source lines, combination patterns between the three inspection lines in the left wiring portion and the three odd source lines, and combination patterns between the three inspection lines in the right wiring portion and the three even source lines do not limit a principle of the present embodiment. In the case where the left wiring portion is connected to the even source lines, combination patterns between the three inspection lines in the left wiring portion and the three even source lines, and combination patterns between the three inspection lines in the right wiring portion and the three odd source lines do not limit a principle of the present embodiment.

(Other Lamination Patterns Based on the Principles of the Sixth Lamination Pattern and the Seventh Lamination Pattern)

Other lamination patterns may be formed, based on the principles of the sixth lamination pattern and the seventh lamination pattern. For example, a lamination pattern may be formed, using combination of the left wiring portion described with reference to the sixth lamination pattern and the right wiring portion described with reference to the seventh lamination pattern. Alternatively, a lamination pattern may be formed, using combination of the left wiring portion described with reference to the seventh lamination pattern and the right wiring portion described with reference to the sixth lamination pattern.

According to the principles of the sixth lamination pattern and the seventh lamination pattern, the area (the vertical dimension) required for the horizontal wiring region 130 is smaller than that in the related art. Alternatively, the horizontal wiring region 130 can allow for arrangement of second inspection lines. Accordingly, resistances of the inspection lines are lower than those in the related art. Since the number of the layers in the horizontal wiring region 130 is small, as compared with the first lamination pattern, the wiring structure of the horizontal wiring region 130 is difficult to affect the wiring structure of the liquid crystal panel 100. In addition, since capacitive coupling becomes easy among the three inspection lines in the left wiring portion, and the three inspection lines in the right wiring portion, variation in delay amount of the signal in the left wiring portion, and variation in delay amount of the signal in the right wiring portion become small.

Second Embodiment (Display Device)

Figure 10:
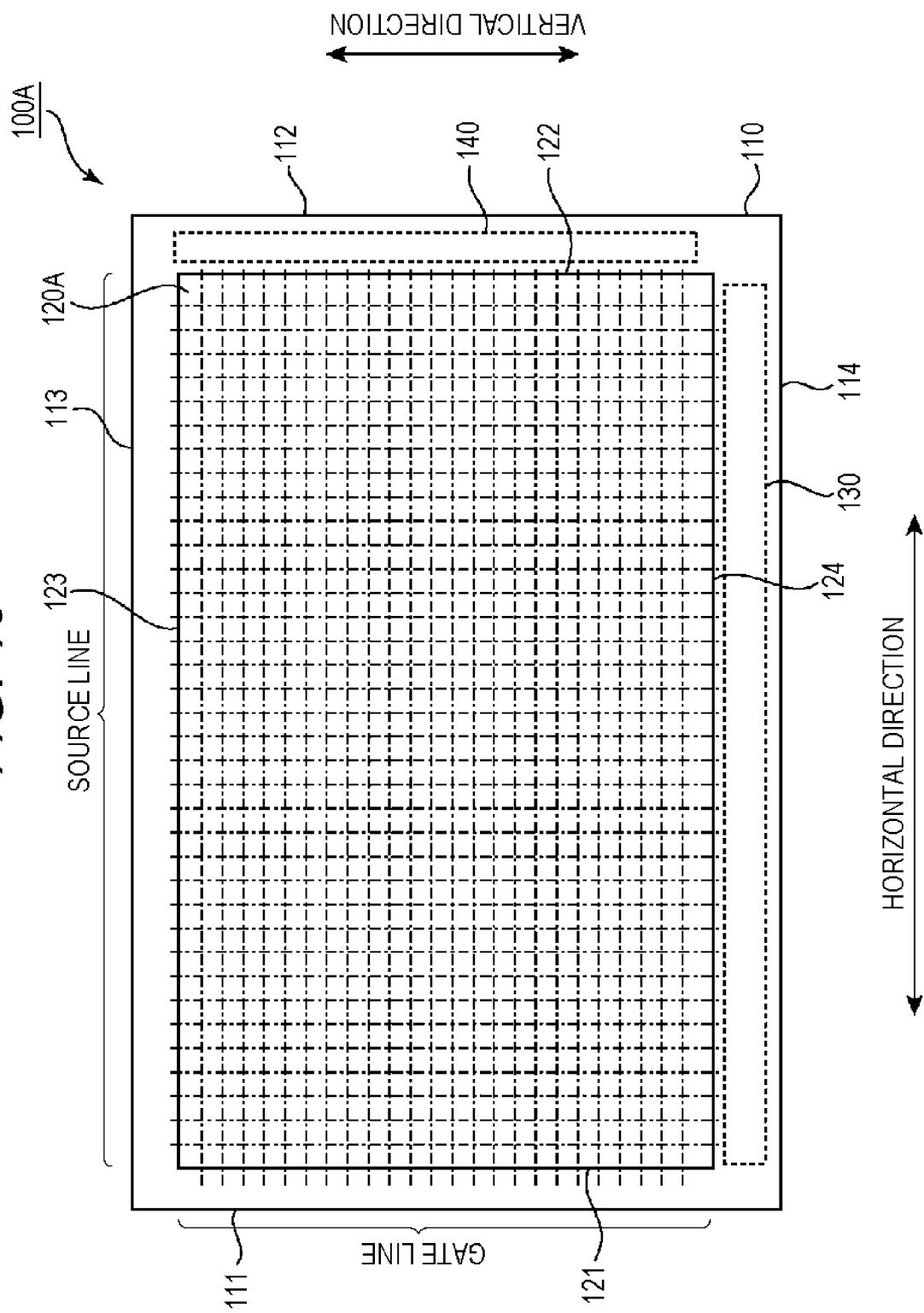
FIG. 10 is a schematic view of a liquid crystal panel illustrated as a display device of a second embodiment.

FIG. 10 is a schematic view of a liquid crystal panel 100A illustrated as a display device of a second embodiment. Referring to FIG. 10, the liquid crystal panel 100A will be described. The same reference numerals are attached to the same elements as those of the first embodiment. The description of the first embodiment is cited for elements with the same reference numerals attached.

As in the first embodiment, the liquid crystal panel 100A includes a case 110, a horizontal wiring region 130, and a vertical wiring region 140. The liquid crystal panel 100A further includes a display surface 120A supported by the case 110. Unlike the first embodiment, pictures represented using a yellow hue in addition to red, green, and blue hues are displayed on the display surface 120A. An observer can observe the pictures projected to the display surface 120A exposed from the case 110.

(Grouping of Source Lines)

Figure 11:
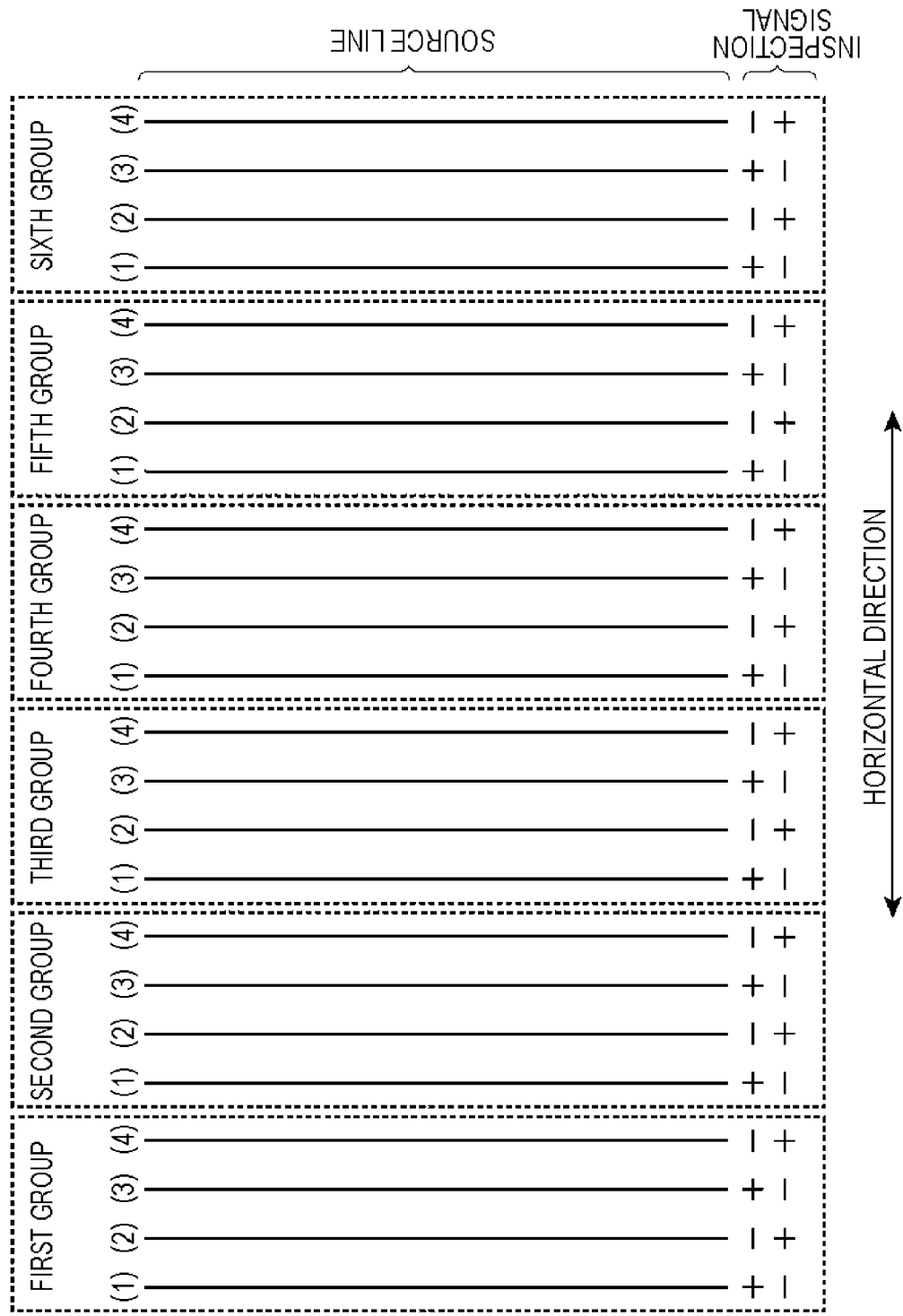
FIG. 11 is a schematic view of the source lines of a liquid crystal panel illustrated in FIG. 10.

FIG. 11 is a schematic view of source lines. Referring to FIGS. 10 and 11, the source lines will be described.

In FIG. 11, the many source lines are grouped so that each group includes four source lines provided continuously in a horizontal direction. FIG. 11 shows a first group, a second group, a third group, a fourth group, a fifth group, and a sixth group. FIG. 11 shows a part of the many source lines shown in FIG. 10.

In each of the groups, numbers of "1" to "4" are attached to the source lines. In each of the groups, the number "1" is attached to the leftmost source line. In the following description, the source line with the number "1" attached is referred to as a "first source line".

The number "2" is attached to the source line arranged to the right of the first source line. In the following description, the source line with the number "2" attached is referred to a "second source line".

The number "3" is attached to the source line arranged to the right of the second source line. In the following description, the source line with the number "3" attached is referred to a "third source line".

The number "4" is attached to the source line arranged to the right of the third source line. In the following description, the source line with the number "4" attached is referred to a "fourth source line".

Along the first source line, a plurality of pixels that emit light in one hue selected from the red, green, blue, and yellow hues are arrayed. Along the second source line, a plurality of pixels that emit light in another hue selected from the red, green, blue, and yellow hues are arrayed. Along the third source line, a plurality of pixels that emit light in another hue selected from the red, green, blue, and yellow hues are arrayed. Along the fourth source line, a plurality of pixels that emit light in the other hue selected from the red, green, blue, and yellow hues are arrayed. In the present embodiment, the pixels arrayed along the first source line are illustrated as a first pixel group. Each of the pixels arrayed along the first source line may be exemplified as a first pixel. A luminescent color of the pixels arrayed along the first source line may be exemplified as a first hue. The pixels arrayed along the second source line may be exemplified as a second pixel group. Each of the pixels arrayed along the second source line may be exemplified as a second pixel. A luminescent color of the pixels arrayed along the second source line may be exemplified as a second hue. The pixels arrayed along the third source line may be exemplified as a third pixel group. Each of the pixels arrayed along the third source line may be exemplified as a third pixel. A luminescent color of the pixels arrayed along the third source line may be exemplified as a third hue. The pixels arrayed along the fourth source line may be exemplified as a fourth pixel group. Each of the pixels arrayed along the fourth source line may be exemplified as a fourth pixel. A luminescent color of the pixels arrayed along the fourth source line may be exemplified illustrated as a fourth hue.

In FIG. 11, signs of "+" and "−" are shown, corresponding to the respective source lines. The relevant signs represent polarity of the inspection signal input through the horizontal wiring region 130. The inspection signal may be a high-frequency signal. In this case, the display surface 120A emits light in white and/or black hue as a whole. An inspector conducting the inspection can observe the display surface 120A to find out a defect of the source lines.

As illustrated in FIG. 11, when the signal having the polarity of "+" is input to odd source lines, the signal having the polarity of "−" is input to even source lines. When the signal having the polarity of "−" is input to odd source lines, the signal having the polarity of "+" is input to even source lines.

Figure 12:
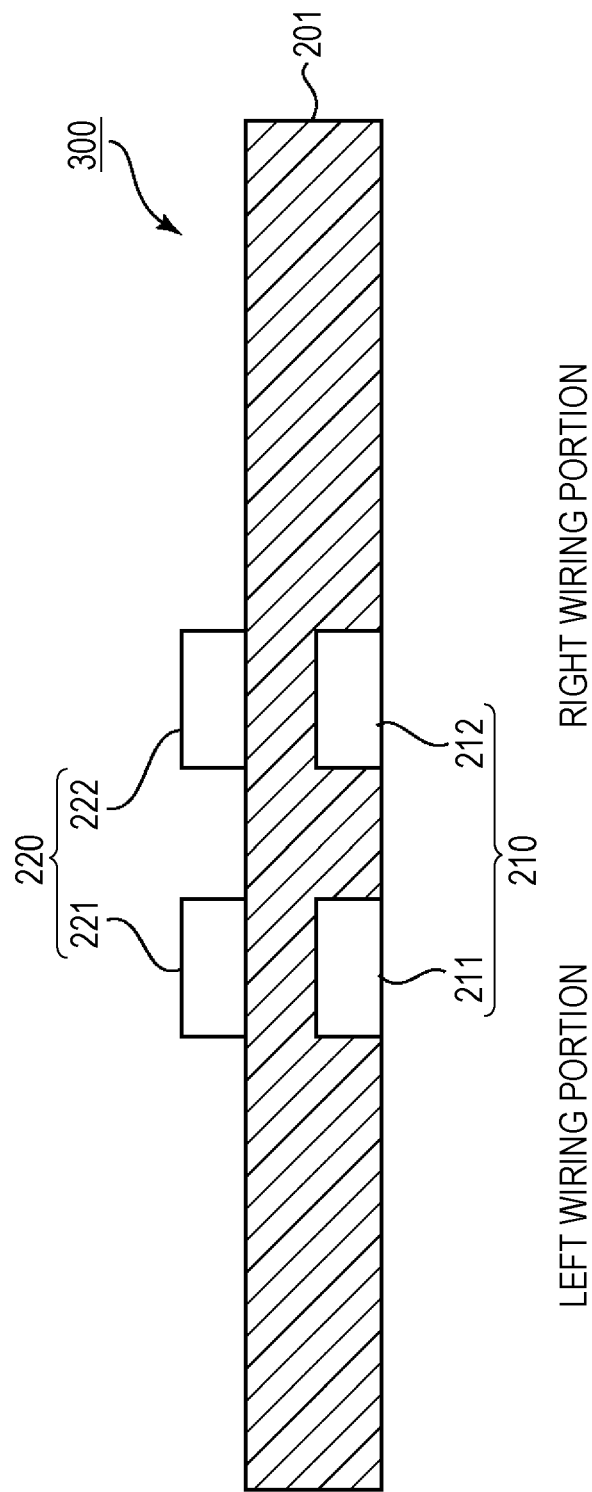
FIG. 12 is a schematic cross-sectional view of an inspection wiring portion formed in the horizontal wiring region of a liquid crystal panel illustrated in FIG. 10.

FIG. 12 is a schematic cross-sectional view of an inspection wiring portion 300 formed in the horizontal wiring region 130. Referring to FIGS. 10 to 12, the inspection wiring portion 300 will be described.

The inspection wiring portion 300 is formed, based on each of the groups shown in FIG. 11. As in the first lamination pattern of the first embodiment, the inspection wiring portion 300 includes a first conductive layer 210, a first insulating layer 201, and a second conductive layer 220.

A left inspection line 211 of the first conductive layer 210 is connected to one odd source line of the first source line and the third source line. A right inspection line 212 of the first conductive layer 210 is connected to one even source line of the second source line and the fourth source line. In the present embodiment, the left inspection line 211 may be exemplified as a first inspection line. The right inspection line 212 may be exemplified as a second inspection line.

A left inspection line 221 of the second conductive layer 220 is connected to the other odd source line of the first source line and the third source line. A right inspection line 222 of the second conductive layer 220 is connected to the other even source line of the second source line and the fourth source line. In the present embodiment, the left inspection line 221 may be exemplified as a third inspection line. The right inspection line 222 may be exemplified as a fourth inspection line.

The inspection wiring portion 300 has a left wiring portion where the left inspection lines 211, 221 are close to each other, and a right wiring portion where the right inspection lines 212, 222 are close to each other. In order to transmit the inspection signal having the polarity of "+" to the odd source lines, the inspection signal having the polarity of "+" is supplied to the left inspection lines 211, 221. Since the polarity of the inspection signal coincides between the close left inspection lines 211, 221, interference by the signal is difficult to occur between the left inspection lines 211, 221. In order to transmit the inspection signal having the polarity of "−" to the even source lines, the inspection signal having the polarity of "−" is supplied to the right inspection lines 212, 222. Since the polarity of the inspection signal coincides between the close right inspection lines 212, 222, interference by the signal is difficult to occur between the right inspection lines 212, 222. A distance between the left wiring portion and the right wiring portion is properly set so as to make negligible a level of capacitive coupling between the left wiring portion and the right wiring portion.

In the present embodiment, the left wiring portion is connected to the odd source lines. Alternatively, the left wiring portion may be connected to the even source lines. In this case, the right wiring portion is connected to the odd source lines.

In the case where the left wiring portion is connected to the odd source lines, combination patterns between the two inspection lines in the left wiring portion and the two odd source lines, and combination patterns between the two inspection lines in the right wiring portion and the three even source lines do not limit a principle of the present embodiment. In the case where the left wiring portion is connected to the even source lines, combination patterns between the two inspection lines in the left wiring portion and the two even source lines, and combination patterns between the two inspection lines in the right wiring portion and the two odd source lines do not limit a principle of the present embodiment.

According to a principle of a lamination pattern shown in FIG. 12, an area (a vertical dimension) required for the horizontal wiring region 130 is smaller than that in the related art. Alternatively, the horizontal wiring region 130 can allow for arrangement of second inspection lines. Accordingly, resistances of the inspection lines are lower than those in the related art. In addition, the liquid crystal panel 100A can display a white image on the display surface 120A under column inversion driving. Accordingly, the inspector can properly inspect the source lines.

Figure 13:
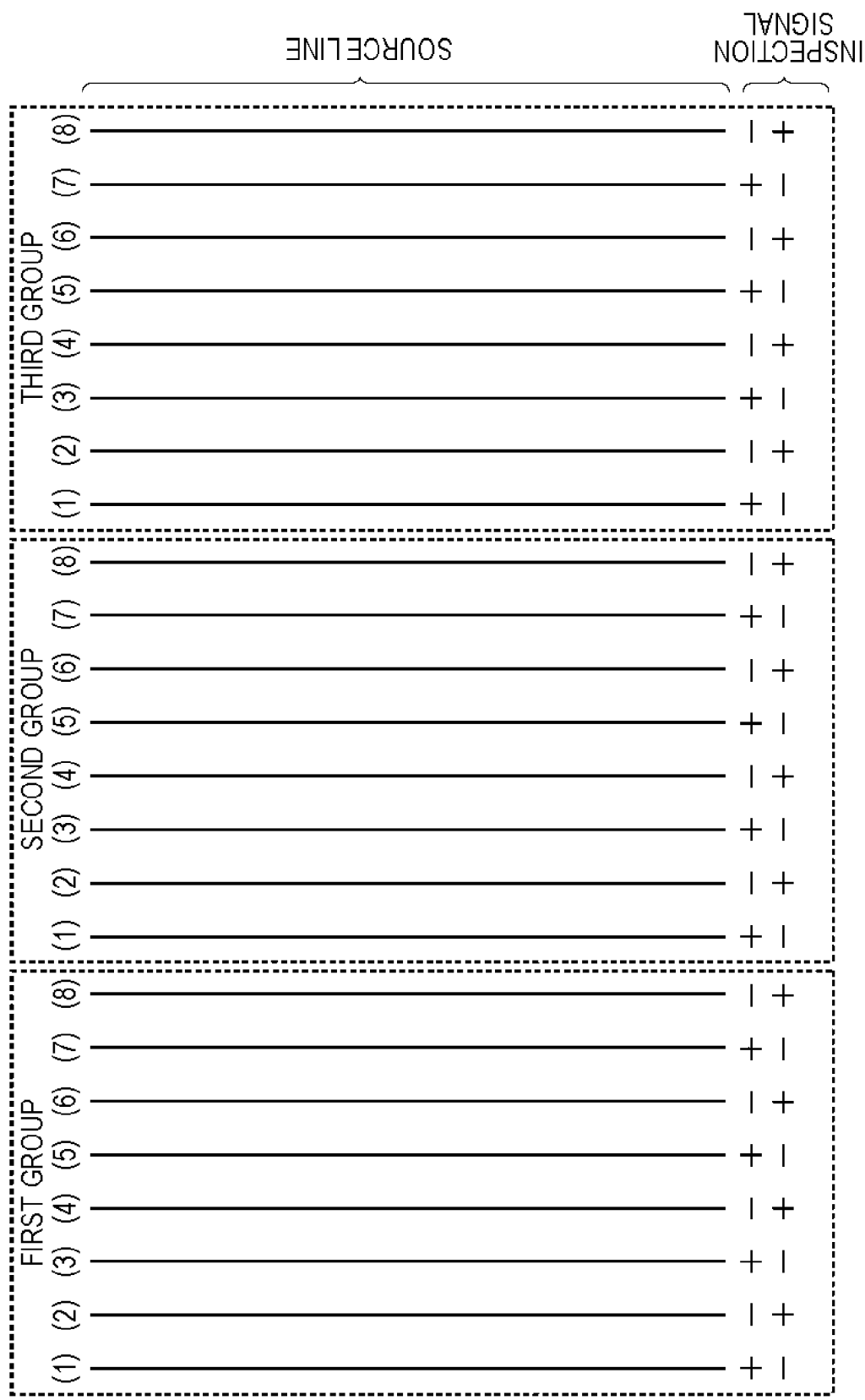
FIG. 13 is a schematic view of the source lines of a liquid crystal panel illustrated in FIG. 10.

FIG. 13 is a schematic view of the source lines. Referring to FIGS. 10 to 13, the source lines will be described.

In FIG. 11, the many source lines are grouped so that each group includes eight source lines provided continuously in the horizontal direction. FIG. 13 shows a first group, a second group, and a third group. FIG. 13 shows a part of the many source lines shown in FIG. 10.

In each of the groups, numbers of "1" to "8" are attached to the source lines. In each of the groups, the number "1" is attached to the leftmost source line. In the following description, the source line with the number "1" attached is referred to as a "first source line".

The number "2" is attached to the source line arranged to the right of the first source line. In the following description, the source line with the number "2" attached is referred to a "second source line".

The number "3" is attached to the source line arranged to the right of the second source line. In the following description, the source line with the number "3" attached is referred to a "third source line".

The number "4" is attached to the source line arranged to the right of the third source line. In the following description, the source line with the number "4" attached is referred to a "fourth source line".

The number "5" is attached to the source line arranged to the right of the fourth source line. In the following description, the source line with the number "5" attached is referred to a "fifth source line".

The number "6" is attached to the source line arranged to the right of the fifth source line. In the following description, the source line with the number "6" attached is referred to a "sixth source line".

The number "7" is attached to the source line arranged to the right of the sixth source line. In the following description, the source line with the number "7" attached is referred to a "seventh source line".

The number "8" is attached to the source line arranged to the right of the seventh source line. In the following description, the source line with the number "8" attached is referred to an "eighth source line".

A plurality of pixels that emit light in one hue selected from the red, green, blue and yellow hues are arrayed along the first source line and the fifth source line between the fourth source line and the sixth source line. A plurality of pixels that emit light in another hue selected from the red, green, blue and yellow hues are arrayed along the second source line and the sixth source line between the fifth source line and the seventh source line. A plurality of pixels that emit light in another hue selected from the red, green, blue and yellow hues are arrayed along the third source line and the seventh source line between the sixth source line and the eighth source line. A plurality of pixels that emit light in the other hue selected from the red, green, blue and yellow hues are arrayed along the fourth source line and the eighth source line. In the present embodiment, the pixels arrayed along the first source line and the fifth source line may be exemplified as a first pixel group. Each of the pixels arrayed along the first source line and the fifth source line may be exemplified as a first pixel. A luminescent color of the pixels arrayed along the first source line and the fifth source line may be exemplified as a first hue. The pixels arrayed along the second source line and the sixth source line may be exemplified as a second pixel group. Each of the pixels arrayed along the second source line and the sixth source line may be exemplified as a second pixel. A luminescent color of the pixels arrayed along the second source line and the sixth source line may be exemplified as a second hue. The pixels arrayed along the third source line and the seventh source line may be exemplified as a third pixel group. Each of the pixels arrayed along the third source line and the seventh source line may be exemplified as a third pixel. A luminescent color of the pixels arrayed along the third source line and the seventh source line may be exemplified as a third hue. The pixels arrayed along the fourth source line and the eighth source line may be exemplified as a fourth pixel group. Each of the pixels arrayed along the fourth source line and the eighth source line is illustrated as a fourth pixel. A luminescent color of the pixels arrayed along the fourth source line and the eighth source line may be exemplified as a fourth hue.

In FIG. 13, signs of "+" and "−" are shown, corresponding to the respective source lines. The relevant signs represent polarity of the inspection signal input through the horizontal wiring region 130. The inspection signal may be a high-frequency signal. In this case, the display surface 120A emits light in a white and/or black hue as a whole. The display surface 120A can emit light in one hue selected from red, green, blue and yellow as a whole as needed. The inspector conducting the inspection can observe the display surface 120A to find out a defect of the source lines.

As illustrated in FIG. 13, when the signal having the polarity of "+" is input to odd source lines, the signal having the polarity of "−" is input to even source lines. When the signal having the polarity of "−" is input to odd source lines, the signal having the polarity of "+" is input to even source lines.

FIG. 14 is a schematic cross-sectional view of an inspection wiring portion 300A formed in the horizontal wiring region 130. Referring to FIGS. 10, 13 and 14, the inspection wiring portion 300A will be described.

The inspection wiring portion 300A is formed, based on each of the groups shown in FIG. 13. As in the second lamination pattern of the first embodiment, the inspection wiring portion 300A includes a first conductive layer 210A and a first insulating layer 201. As in the seventh lamination pattern of the first embodiment, the inspection wiring portion 300A includes a second conductive layer 220F.

An inner left inspection line 211A of the first conductive layer 210A is connected to one odd source line selected from the first source line, the third source line, the fifth source line, and the seventh source line. An outer left inspection line 213 of the first conductive layer 210A is connected to another odd source line selected from the first source line, the third source line, the fifth source line, and the seventh source line. An outer left inspection line 223 of the second conductive layer 220F is connected to another odd source line selected from the first source line, the third source line, the fifth source line, and the seventh source line. An inner left inspection line 221A of the second conductive layer 220F is connected to the other odd source line selected from the first source line, the third source line, the fifth source line, and the seventh source line.

An inner right inspection line 212A of the first conductive layer 210A is connected to one even source line selected from the second source line, the fourth source line, the sixth source line, and the eighth source line. An outer right inspection line 214 of the first conductive layer 210A is connected to another even source line selected from the second source line, the fourth source line, the sixth source line, and the eighth source line. An outer right inspection line 224 of the second conductive layer 220F is connected to another even source line selected from the second source line, the fourth source line, the sixth source line, and the eighth source line. An inner right inspection line 222A of the second conductive layer 220F is connected to the other even source line selected from the second source line, the fourth source line, the sixth source line, and the eighth source line.

In the present embodiment, one of the inner left inspection line 211A and the outer left inspection line 213 may be exemplified as the first inspection line. If the inner left inspection line 211A of the first conductive layer 210A may be exemplified as the first inspection line, the inner left inspection line 221A of the second conductive layer 220F overlapping the inner left inspection line 211A with the first insulating layer 201 interposed may be exemplified as one of the third inspection line, a fifth inspection line, and a seventh inspection line. If the inner left inspection line 211A of the first conductive layer 210A may be exemplified as the first inspection line, and if the inner left inspection line 221A of the second conductive layer 220F may be exemplified as the third inspection line, one of the outer left inspection line 213 of the first conductive layer 210A and the outer left inspection line 223 of the second conductive layer 220F may be exemplified as the fifth inspection line. In this case, the other of the outer left inspection line 213 of the first conductive layer 210A and the outer left inspection line 223 of the second conductive layer 220F may be exemplified as the seventh inspection line.

In the present embodiment, the other of the inner left inspection line 211A and the outer left inspection line 213 may be exemplified as the second inspection line. If the inner right inspection line 212A of the first conductive layer 210A may be exemplified as the second inspection line, the inner right inspection line 222A of the second conductive layer 220F overlapping the inner right inspection line 212A with the first insulating layer 201 interposed may be exemplified as one of the second inspection line, a sixth inspection line, and an eighth inspection line. If the inner right inspection line 212A of the first conductive layer 210A may be exemplified as the second inspection line, and if the inner right inspection line 222A of the second conductive layer 220F may be exemplified as the third inspection line, one of the outer right inspection line 214 of the first conductive layer 210A and the outer right inspection line 224 of the second conductive layer 220F may be exemplified as the sixth inspection line. In this case, the other of the outer right inspection line 214 of the first conductive layer 210A and the outer right inspection line 224 of the second conductive layer 220F may be exemplified as the eighth inspection line.

The inspection wiring portion 300A has a left wiring portion where the inner left inspection lines 211A, 221A and the outer left inspection lines 213, 223 are close to each other, and a right wiring portion where the inner right inspection lines 212A, 222A and the outer right inspection lines 214, 224 are close to each other. In order to transmit the inspection signal having the polarity of "+" to the odd source lines, the inspection signal having the polarity of "+" is supplied to the inner left inspection lines 211A, 221A and the outer left inspection lines 213, 223. Since the polarity of the inspection signal coincides between the inner left inspection lines 211A, 221A and the outer left inspection lines 213, 223 interference by the signal is difficult to occur between the inner left inspection lines 211A, 221A and the outer left inspection lines 213, 223. In order to transmit the inspection signal having the polarity of "−" to the even source lines, the inspection signal having the polarity of "−" is supplied to the inner right inspection lines 212A, 222A and the outer right inspection lines 214, 224. Since the polarity of the inspection signal coincides between the inner right inspection lines 212A, 222A and the outer right inspection lines 214, 224 interference by the signal is difficult to occur between the inner right inspection lines 212A, 222A and the outer right inspection lines 214, 224. A distance between the left wiring portion and the right wiring portion is properly set so as to make negligible a level of capacitive coupling between the left wiring portion and the right wiring portion.

In the present embodiment, the left wiring portion is connected to the odd source lines. Alternatively, the left wiring portion may be connected to the even source lines. In this case, the right wiring portion is connected to the odd source lines.

In the case where the left wiring portion is connected to the odd source lines, combination patterns between the four inspection lines in the left wiring portion and the four odd source lines, and combination patterns between the four inspection lines in the right wiring portion and the four even source lines do not limit a principle of the present embodiment. In the case where the left wiring portion is connected to the even source lines, combination patterns between the four inspection lines in the left wiring portion and the four even source lines, and combination patterns between the four inspection lines in the right wiring portion and the four odd source lines do not limit a principle of the present embodiment.

According to the principle of the lamination pattern shown in FIG. 14, an area (a vertical dimension) required for the horizontal wiring region 130 is smaller than that in the related art. Alternatively, the horizontal wiring region 130 can allow for arrangement of second inspection lines. Accordingly, resistances of the inspection lines are lower than those in the related art. In addition, the liquid crystal panel 100A can display a white image on the display surface 120A under column inversion driving.

The liquid crystal panel 100A can display an image in one hue selected from red, green, blue, and yellow on the display surface 120A under the column inversion driving as needed. For example, if sub-pixels in the red hue are arrayed along the first source line and the fifth source line, the inspection signal having the polarity of "+" may be input to the first source line. At this time, if the inspection signal having the polarity of "−" is input to the fifth source line, the polarity of the inspection signal differs between columns of the adjacent red sub-pixels. As a result, a red image is displayed on the whole display surface. An observer can inspect whether or not the red image is properly displayed by observing the display surface.

Accordingly, the principle of the lamination pattern shown in FIG. 14 enables the inspector to inspect not only quality of the white image but quality of an image in the other single hue. Thus, the inspector can properly inspect not only the source lines but the quality of the image displayed on the display surface.

Third Embodiment

With reference to a third embodiment, a technique for reducing a difference in sheet resistance value between inspection lines in a lamination structure will be described. A type of the inspection lines of the lamination structure may differ in accordance with a conductive layer. If the type of the inspection lines differs in accordance with the conductive layer, the difference in sheet resistance value is caused between the conductive layers. A processing technique for forming the lamination structure (e.g., sputtering) may cause the difference in sheet resistance value between the conductive layers. The technique described with reference to the third embodiment contributes to reduction of the difference in sheet resistance value between the conductive layers.

FIG. 15 is a schematic cross-sectional view of an inspection wiring portion 400 formed in a horizontal wiring region 130. Referring to FIGS. 3 and 15, the inspection wiring portion 400 will be described. The same reference numerals are attached to the same elements as those in the first embodiment. The description of the first embodiment is cited for elements with the same reference numerals attached.

The inspection wiring portion 400 is formed, based on the principle of the first lamination pattern of the first embodiment. Cross-sectional areas of the six inspection lines (the left inspection lines 211, 221, 231, and the right inspection lines 212, 222, 232) described with reference to the first lamination pattern of the first embodiment are equal to one another. In addition, while the sheet resistance value of the first conductive layer 210 described with reference to the first lamination pattern of the first embodiment is the lowest, the sheet resistance value of the third conductive layer 230 described with reference to the first lamination pattern of the first embodiment is the highest. The sheet resistance value of the second conductive layer 220 is higher than the sheet resistance value of the first conductive layer 210, and is lower than the sheet resistance value of the third conductive layer 230.

As in the first lamination pattern of the first embodiment, the inspection wiring portion 400 includes a first conductive layer 210, a first insulating layer 201, and a second insulating layer 202. The inspection wiring portion 400 further includes a second conductive layer 420 and a third conductive layer 430. The second conductive layer 420 includes a left inspection line 421 and a right inspection line 422. The third conductive layer 430 includes a left inspection line 431 and a right inspection line 432. The second conductive layer 420 is different from the second conductive layer 220 described with reference to the first lamination patter of the first embodiment only in the cross-sectional area of the inspection lines described later. The third conductive layer 430 is different from the third conductive layer 230 described with reference to the first lamination pattern of the first embodiment only in the cross-sectional area of the inspection lines described later.

The cross-sectional area of the left inspection line 421 and the right inspection line 422 of the second conductive layer 420 shown in FIG. 15 is larger than that of the left inspection line 221 and the right inspection line 222 of the second conductive layer 220 described with reference to the first lamination pattern of the first embodiment. As a result, a resistance value of the second conductive layer 420 shown in FIG. 15 is smaller than a resistance value of the second conductive layer 220 described with reference to the first lamination pattern of the first embodiment. Accordingly, a difference in resistance value between the first conductive layer 210 and the second conductive layer 420 of the present embodiment is smaller than a difference in resistance value between the first conductive layer 210 and the second conductive layer 220 described with reference to the first lamination pattern of the first embodiment.

As shown in FIG. 15, the cross-section area of the left inspection line 431 and the right inspection line 432 of the third conductive layer 430 is larger than that of the left inspection line 421 and the right inspection line 422 of the second conductive layer 420. That is, a resistance value of the third conductive layer 430 shown in FIG. 15 is largely smaller than a resistance value of the third conductive layer 230 described with reference to the first lamination pattern of the first embodiment. Accordingly, a difference in resistance value between the first conductive layer 210 and the third conductive layer 430 of the present embodiment is smaller than a difference in resistance value between the first conductive layer 210 and the third conductive layer 230 described with reference to the first lamination pattern of the first embodiment.

In the present embodiment, one of the left inspection line 211 and the right inspection line 212 of the first conductive layer 210 may be exemplified as a first inspection line. In this case, the cross-sectional area of one of the left inspection line 211 and the right inspection line 212 may be exemplified as a first cross-sectional area. One of the left inspection line 421 and the right inspection line 422 of the second conductive layer 420 may be exemplified as a second inspection line. In this case, the cross-section area of one of the left inspection line 421 and the right inspection line 422 may be exemplified as a second cross-section area.

Size relationships of the cross-sectional areas of the inspection lines of the respective conductive layers may be decided in accordance with the sheet resistance value of the conductive layer. Accordingly, the cross-sectional area of the inspection lines of the second conductive layer may be set the smallest. Alternatively, the cross-sectional area of the inspection lines of the third conductive layer may be set the smallest.

Fourth Embodiment

With reference to a fourth embodiment, a connection structure between source lines and conductive layers in a lamination structure will be described. The lamination structure described with reference to the fourth embodiment is formed in accordance with the principle of the first lamination pattern of the first embodiment. The connection structure described with reference to the fourth embodiment can be applied to the various lamination patterns described with reference to the first embodiment.

Figure 16B:
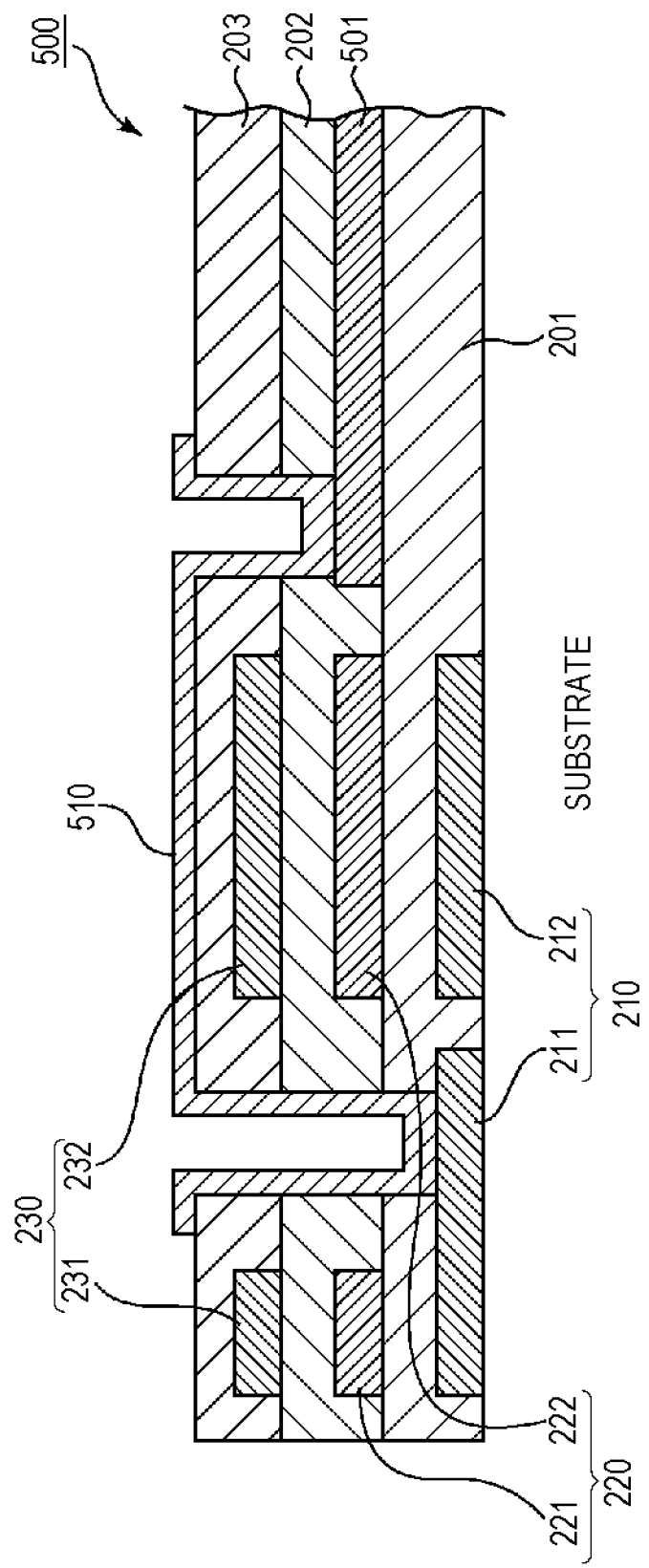
FIG. 16B is a cross-sectional view of the connection structure along A-A line shown in FIG. 16A.

FIG. 16A is a schematic plan view of a connection structure 500. FIG. 16B is a cross-sectional view of the connection structure 500 along A-A line shown in FIG. 16A. Referring to FIGS. 16A and 16B, the connection structure 500 will be described. The same reference numerals are attached to the same elements as those in the first embodiment. The description of the first embodiment is cited for elements with the same reference numerals attached.

In FIG. 16A, a first source line 501, a second source line 502, a third source line 503, a fourth source line 504, a fifth source line 505, and a sixth source line 506 are shown. The first source line 501 is connected to a left inspection line 211 of a first conductive layer 210. The second source line 502 is connected to a right inspection line 212 of a first conductive layer 210. The third source line 503 is connected to a left inspection line 221 of a second conductive layer 220. The fourth source line 504 is connected to a right inspection line 222 of a second conductive layer 220. The fifth source line 505 is connected to a left inspection line 231 of a third conductive layer 230. The sixth source line 506 is connected to a right inspection line 232 of a third conductive layer 230.

The connection structure 500 includes a plurality of connection layers 510 that perform electric connection between the first source line 501 and the left inspection line 211 of the first conductive layer 210, between the second source line 502 and the right inspection line 212 of the first conductive layer 210, between the third source line 503 and the left inspection line 221 of the second conductive layer 220, between the fourth source line 504 and the right inspection line 222 of the second conductive layer 220, between the fifth source line 505 and the left inspection line 231 of the third conductive layer 230, and between the sixth source line 506 and the right inspection line 232 of the third conductive layer 230. The connection layers 510 are formed of a material having conductivity. In the present embodiment, the connection layers 510 are each illustrated as a connection portion. The connection layer 510 that performs the electric connection between the first source line 501 and the left inspection line 211 of the first conductive layer 210 may be exemplified as a first connection portion. The connection layer 510 that performs the electric connection between the third source line 503 and the left inspection line 221 of the second conductive layer 220 may be exemplified as a second connection portion.

As in the first lamination pattern of the first embodiment, a lamination pattern used in the connection structure 500 includes a first insulating layer 201 and a second insulating layer 202. The lamination pattern used in the connection structure 500 further includes a third insulating layer 203. The third insulating layer 203 covers the third conductive layer 230. The connection layer 510 is laminated on the third insulating layer 203.

As shown in FIG. 16B, the first conductive layer 210 is formed on a substrate. Thereafter, the first insulating layer 201 is laminated on the substrate. As a result, the first conductive layer 210 and the substrate are covered with the first insulating layer 201.

Thereafter, the second conductive layer 220 and the source lines (the first source line 501 to the sixth source line 506) are laminated on the first insulating layer 201. The second insulating layer 202 is laminated on the first insulating layer 201. As a result, the second conductive layer 220, the source lines and the substrate are covered with the second insulating layer 202. In FIG. 16A, in order to clearly indicate the source lines, the insulating layer covering the source lines is not shown.

The third conductive layer 230 is laminated on the second insulating layer 202. Thereafter, the third insulating layer 203 is laminated on the second insulating layer 202. As a result, the third conductive layer 230 is covered with the third insulating layer 203. In the present embodiment, the first insulating layer 201 to the third insulating layer 203 each may be exemplified as an insulating portion.

Through-holes 520 are formed in the laminated insulating layers (the first insulating layer 201 to the third insulating layer 203). In order to form the through-holes 520, for example, a photoresist processing technique may be applied. The through-holes 520 are each formed on the conductive layer (the first conductive layer 210, the second conductive layer 220, or the third conductive layer 230), and the source line (the first source line 501, the second source line 502, the third source line 503, the fourth source line 504, the fifth source line 505 or the sixth source line 506).

Each of the connection layers 510 is continuously formed so as to cover the through-hole 520 on the conductive layer and the through-hole 520 on the source line. Accordingly, the connection layer 510 becomes a band-like layer connecting both the through-holes 520.

Figure 17A:
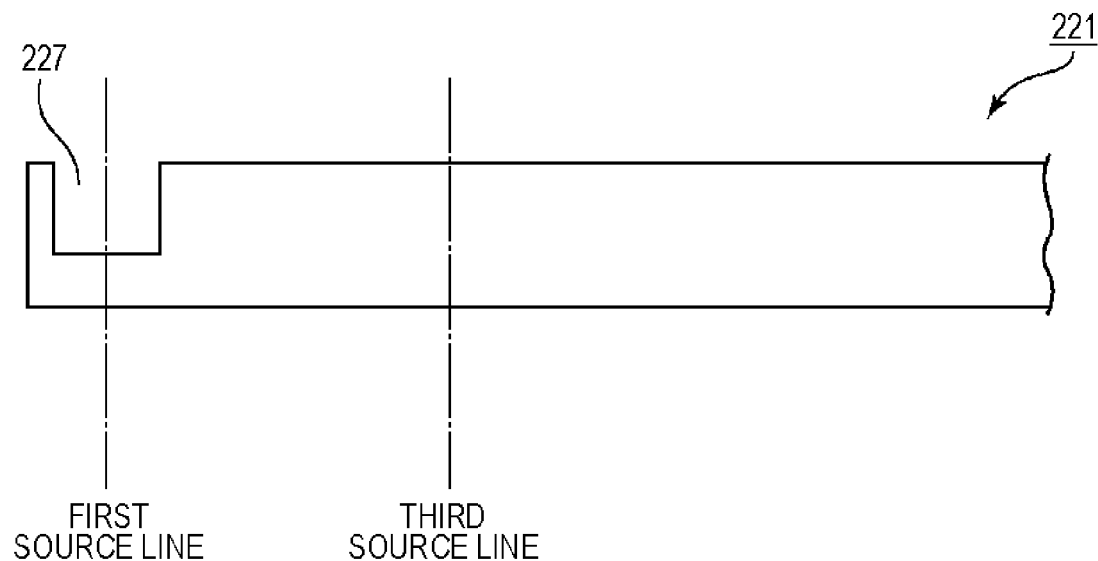
FIG. 17A is a schematic plan view of the left inspection line of the second conductive layer.
Figure 17B:
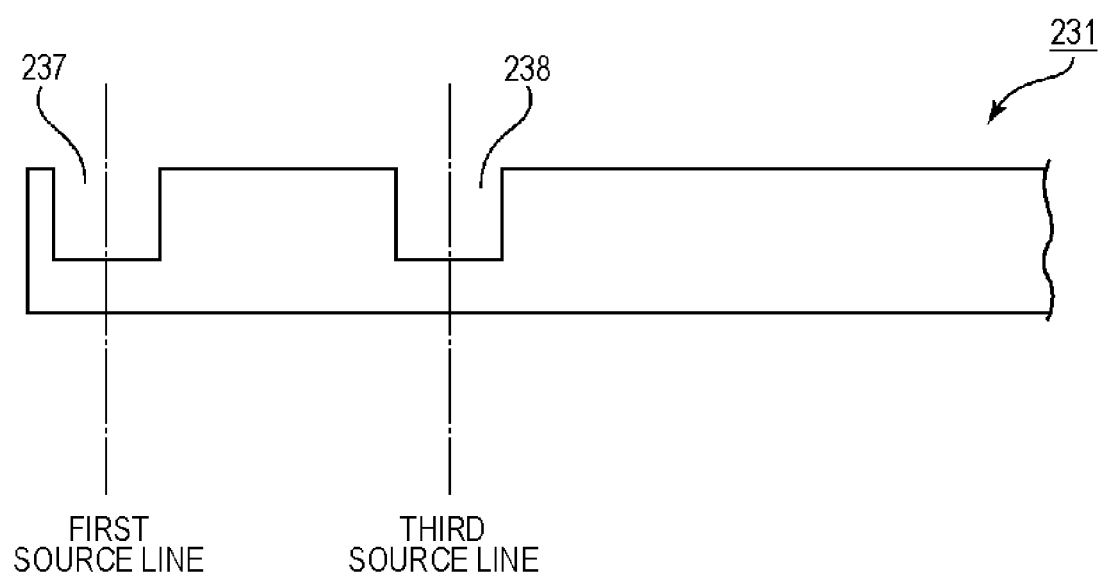
FIG. 17B is a schematic plan view of the left inspection line of the third conductive layer.

FIG. 17A is a schematic plan view of the left inspection line 221 of the second conductive layer 220. FIG. 17B is a schematic plan view of the left inspection line 231 of the third conductive layer 230. Referring to FIGS. 1, 16A to 17B, the left inspection lines 221, 231 will be described.

At a position corresponding to the first source line 501, a cut-out portion 227 is formed in the left inspection line 221 of the second conductive layer 220. Similarly, at a position corresponding to the first source line 501, a cut-out portion 237 is formed in the left inspection line 231 of the third conductive layer 230. Accordingly, the through-hole 520 formed at the position corresponding to the first source line 501 reaches the left inspection line 211 of the first conductive layer 210 through the cut-out portions 227, 237. Thereafter, the connection layer 510 formed at the position corresponding to the first source line 501 is connected to the left inspection line 211 exposed by the through-hole 520. Accordingly, the connection layer 510 is selectively connected to the left inspection line 211. In the present embodiment, the cut-out portions 227, 237 each may be exemplified as a missing portion.

At a position corresponding to the third source line 503, a cut-out portion 238 is formed in the left inspection line 231 of the third conductive layer 230, while no cut-out portion is formed in the left inspection line 221 of the second conductive layer 220. Accordingly, the through-hole 520 formed at the position corresponding to the third source line 503 passes through the cut-out portion 238, and has an end portion in the left inspection line 221 of the second conductive layer 220. Thereafter, the connection layer 510 formed at the position corresponding to the third source line 503 is connected to the left inspection line 221 exposed by the through-hole 520. Accordingly, the connection layer 510 is selectively connected to the left inspection line 221. In the present embodiment, the cut-out portion 238 is illustrated as the missing portion.

In the connection structure 500, since the cut-out portions (the cut-out portions 227, 237, 238) formed in the insulating layers (the first insulating layer 201 to the third insulating layer 203) are used, a distance between the left wiring portion and the right wiring portion does not become excessively large. Accordingly, an area (a vertical dimension) required for the horizontal wiring region 130 where the connection structure 500 is constructed is smaller than that in the related art. Alternatively, the horizontal wiring region 130 can allow for arrangement of second inspection lines. Accordingly, resistances of the inspection lines are lower than those in the related art.

Fifth Embodiment

In the connection technique of the fourth embodiment, since the cut-out portions are formed in the conductive layers, the resistances in the conductive layers become unstable. A technique of a fifth embodiment contributes to stabilization of the resistances in the conductive layers.

Figure 18A:
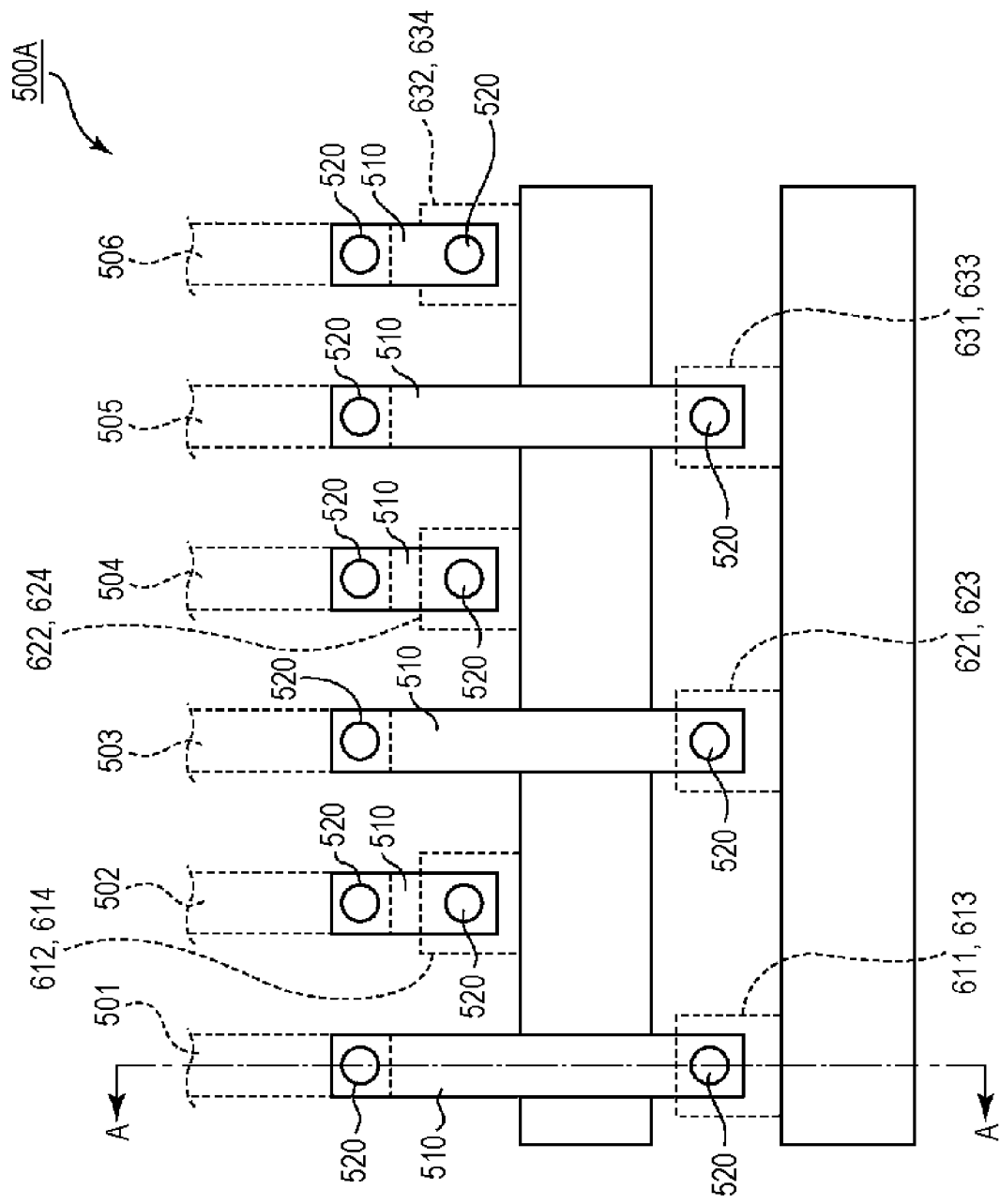
FIG. 18A is a schematic plan view of a connection structure.
Figure 18B:
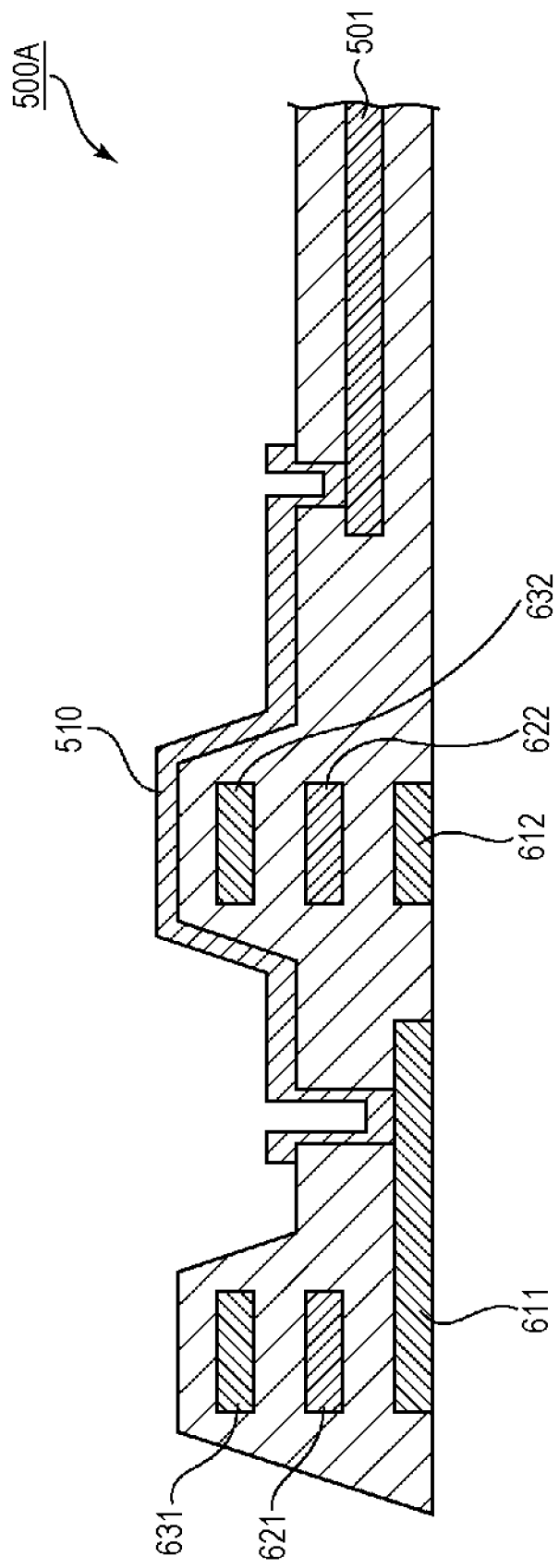
FIG. 18B is a cross-sectional view of the connection structure along A-A line shown in FIG. 18A.

FIG. 18A is a schematic plan view of a connection structure 500A. FIG. 18B is a cross-sectional view of the connection structure 500A along A-A line shown in FIG. 18A. Referring to FIGS. 3, 18A and 18B, the connection structure 500A will be described. The same reference numerals are attached to the same elements as those in the first and the fourth embodiment. The description of the first and fourth embodiment is cited for elements with the same reference numerals attached.

As in the fourth embodiment, the connection structure 500A includes a first source line 501, a second source line 502, a third source line 503, a fourth source line 504, a fifth source line 505, a sixth source line 506, and connection layers 510. The connection structure 500A further includes left inspection lines 611, 621, 631, and right inspection lines 612, 622, 632. The left inspection line 611 is used in place of the left inspection line 211 described with reference to the first embodiment and the fourth embodiment. The left inspection line 621 is used in place of the left inspection line 221 described with reference to the first embodiment and the fourth embodiment. The left inspection line 631 is used in place of the left inspection line 231 described with reference to the first embodiment and the fourth embodiment. The right inspection line 612 is used in place of the right inspection line 212 described with reference to the first embodiment and the fourth embodiment. The right inspection line 622 is used in place of the right inspection line 222 described with reference to the first embodiment and the fourth embodiment. The right inspection line 632 is used in place of the right inspection line 232 described with reference to the first embodiment and the fourth embodiment. Accordingly, the first source line 501 is connected to the left inspection line 611 by the connection layer 510. The second source line 502 is connected to the right inspection line 612 by the connection layer 510. The third source line 503 is connected to the left inspection line 621 by the connection layer 510. The fourth source line 504 is connected to the right inspection line 622 by the connection layer 510. The fifth source line 505 is connected to the left inspection line 631 by the connection layer 510. The sixth source line 506 is connected to the right inspection line 632 by the connection layer 510.

Figure 19A:
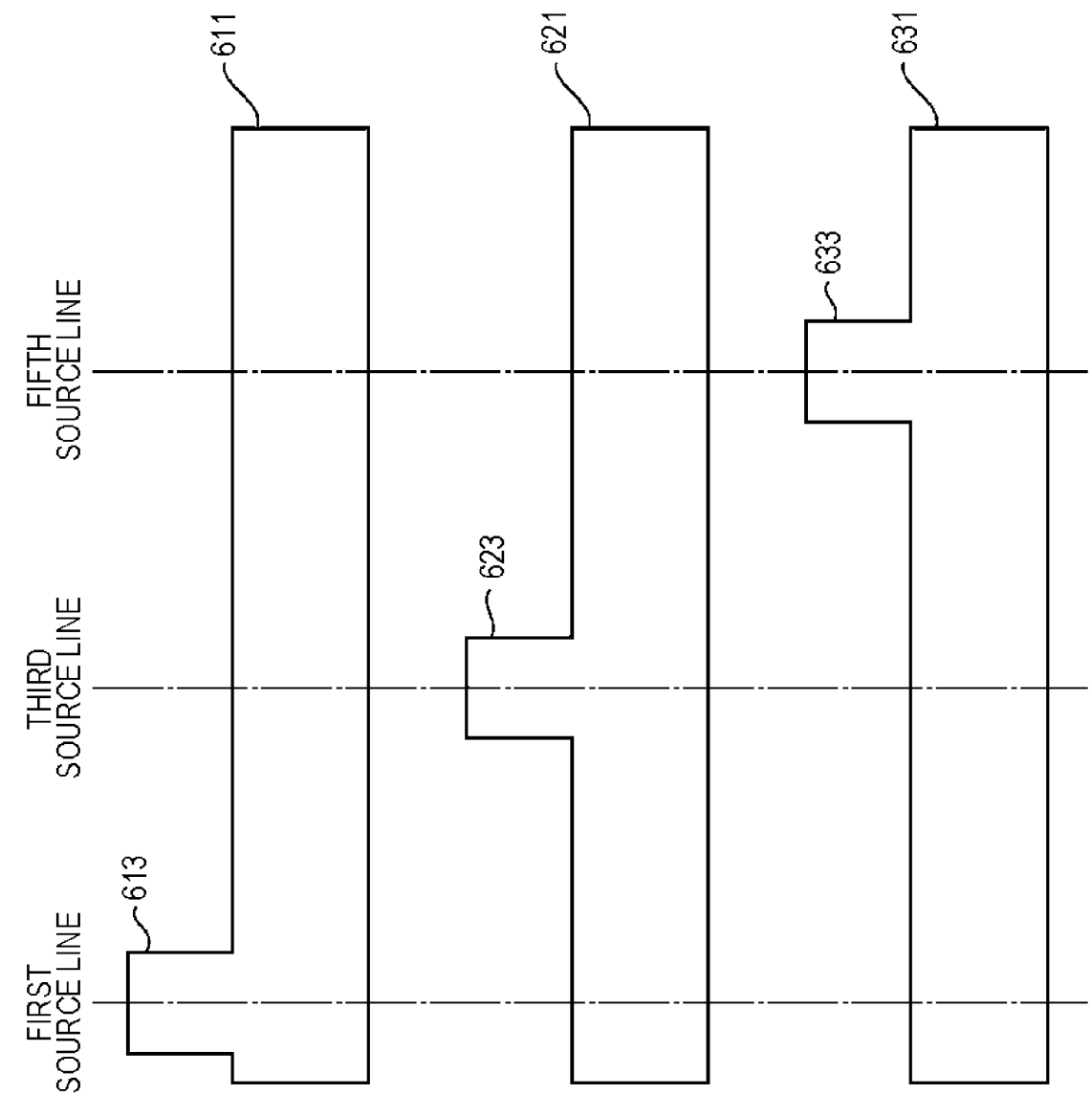
FIG. 19A is a schematic plan view of the left inspection line.
Figure 19B:
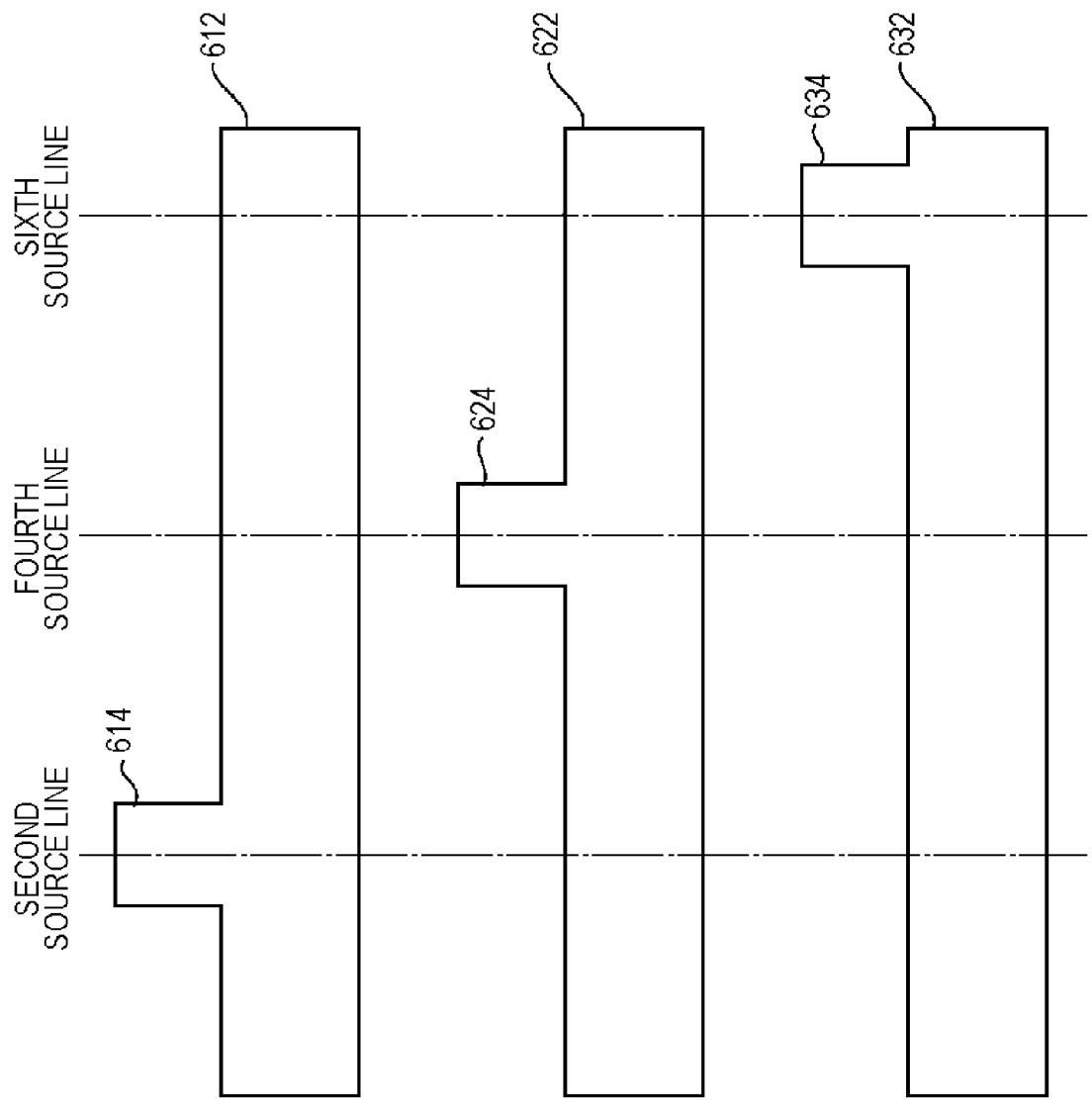
FIG. 19B is a schematic plan view of the right inspection line.

FIG. 19A is a schematic plan view of the left inspection lines 611, 621, 631. FIG. 19B is a schematic plan view of the right inspection lines 612, 622, 632. Referring to FIGS. 18A, 19A, and 19B, the left inspection lines 611, 621, 631 and the right inspection lines 612, 622, 632 will be described.

The left inspection line 611 includes a projected portion 613 that is projected toward the first source line 501 at a position corresponding to the first source line 501. The first source line 501 is connected to the projected portion 613 through a through-hole 520. In the present embodiment, the projected portion 613 may be exemplified as a first projected portion.

The left inspection line 621 includes a projected portion 623 that is projected toward the third source line 503 at a position corresponding to the three source line 503. The third source line 503 is connected to the projected portion 623 through a through-hole 520. In the present embodiment, the projected portion 623 may be exemplified as a second projected portion.

The left inspection line 631 includes a projected portion 633 that is projected toward the fifth source line 505 at a position corresponding to the fifth source line 505. The fifth source line 505 is connected to the projected portion 633 through a through-hole 520.

The right inspection line 612 includes a projected portion 614 that is projected toward the second source line 502 at a position corresponding to the second source line 502. The second source line 502 is connected to the projected portion 614 through a through-hole 520. In the present embodiment, the projected portion 614 may be exemplified as a first projected portion.

The right inspection line 622 includes a projected portion 624 that is projected toward the fourth source line 504 at a position corresponding to the fourth source line 504. The fourth source line 504 is connected to the projected portion 624 through a through-hole 520. In the present embodiment, the projected portion 624 may be exemplified as a second projected portion.

The right inspection line 632 includes a projected portion 634 that is projected toward the sixth source line 506 at a position corresponding to the sixth source line 506. The sixth source line 506 is connected to the projected portion 634 through a through-hole 520.

Sixth Embodiment

In the connection technique of the fifth embodiment, since both the projected portions of the left inspection lines and the projected portions of the right inspection lines are projected toward the source lines, a length of the source lines connected to the projected portions is varied. The variation in the length of the source lines results in variation in resistance of the source lines. A technique of the sixth embodiment contributes to reduction of the variation in resistance of the source lines.

Figure 20B:
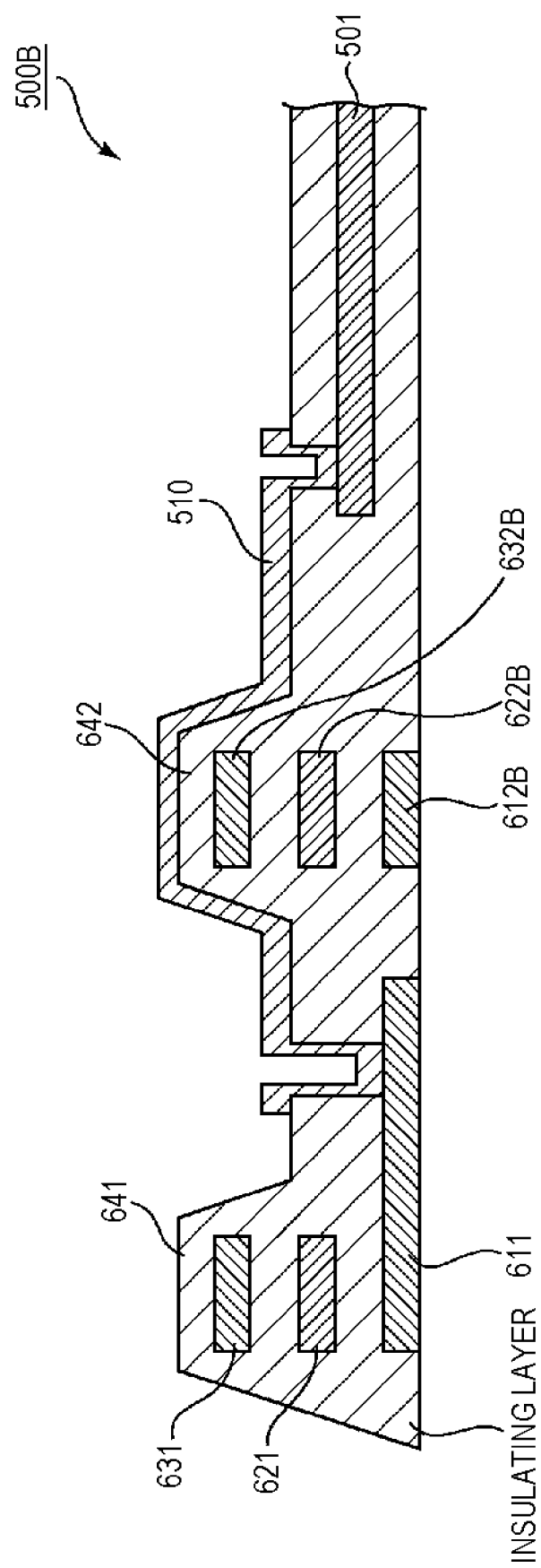
FIG. 20B is a cross-sectional view of the connection structure along A-A line shown in FIG. 20A.

FIG. 20A is a schematic plan view of a connection structure 500B. FIG. 20B is a cross-sectional view of the connection structure 500B along A-A line shown in FIG. 20A. Referring to FIGS. 20A and 20B, the connection structure 500B will be described. The same reference numerals are attached to the same elements as those in the fifth embodiment. The description of the fourth and fifth embodiment is cited for elements with the same reference numerals attached.

As in the fifth embodiment, the connection structure 500B includes a first source line 501, a second source line 502, a third source line 503, a fourth source line 504, a fifth source line 505, a sixth source line 506, connection layers 510, and left inspection lines 611, 621, 631. The connection structure 500B further includes right inspection lines 612B, 622B, 632B. The right inspection line 612B is used in place of the right inspection line 612 described with reference to the fifth embodiment. The right inspection line 622B is used in place of the right inspection line 622 described with reference to the fifth embodiment. The right inspection line 632B is used in place of the right inspection line 632 described with reference to the fifth embodiment. The second source line 502 is connected to the right inspection line 612B by the connection layer 510. The fourth source line 504 is connected to the right inspection line 622B by the connection layer 510. The sixth source line 506 is connected to the right inspection line 632B by the connection layer 510.

As shown in FIG. 20B, a region where the left inspection lines 611, 621, 631 are laminated, and a region where the right inspection lines 612B, 622B, 632B are laminated are thicker than the other region by thicknesses of the left inspection lines 611, 621, 631 and the right inspection lines 612B, 622B, 632B. As a result, an insulating layer formed by the lamination technique described with reference to the fourth embodiment forms a left insulating ridge 641 that rises so as to cover the left inspection lines 611, 621, 631, and a right insulating ridge 642 that rises so as to cover the right inspection lines 612B, 622B, 632B. In the present embodiment, one of the left insulating ridge 641 and the right insulating ridge 642 may be exemplified as a first insulating ridge. The other of the left insulating ridge 641 and the right insulating ridge 642 may be exemplified as a second insulating ridge.

Figure 21:
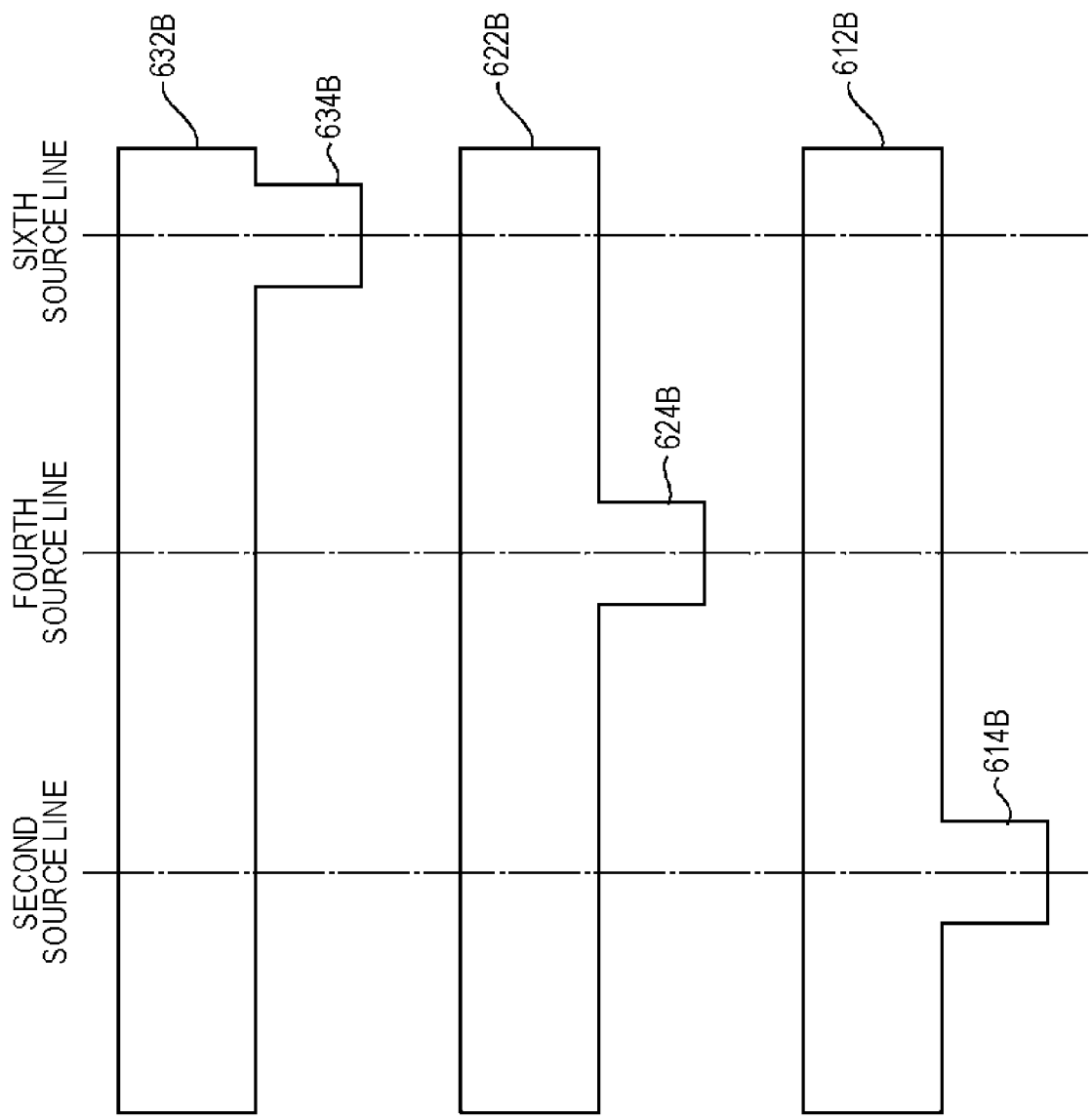
FIG. 21 is a schematic plan view of the right inspection line.

FIG. 21 is a schematic plan view of the right inspection lines 612B, 622B, 632B. Referring to FIGS. 20A and 21, the right inspection lines 612B, 622B, 632B will be described.

The right inspection line 612B includes a projected portion 614B at a position corresponding to the second source line 502. The second source line 502 is connected to the projected portion 614B through a through-hole 520.

The right inspection line 622B includes a projected portion 624B at a position corresponding to the fourth source line 504. The fourth source line 504 is connected to the projected portion 624B through a through-hole 520.

The right inspection line 632B includes a projected portion 634B at a position corresponding to the sixth source line 506. The sixth source line 506 is connected to the projected portion 634B through a through-hole 520.

Unlike the fifth embodiment, a projection direction of the projected portions 614B, 624B, 634B is opposite to a projection direction of the projected portions 613, 623, 633. Accordingly, all the connection layers 510 are formed so as to go over the right insulating ridge 642. As a result, all the connection layers 510 are connected, through through-holes 520, to the projected portions 613, 623, 633, 614B, 624B, 634B arranged between the left insulating ridge 641 and the right insulating ridge 642.

Seventh Embodiment

If the insulating ridges described with reference to the sixth embodiment each have a steep gradient, the insulating layer may be disconnected. A technique of a seventh embodiment contributes to reducing the gradient of each of the insulating ridges.

Figure 22A:
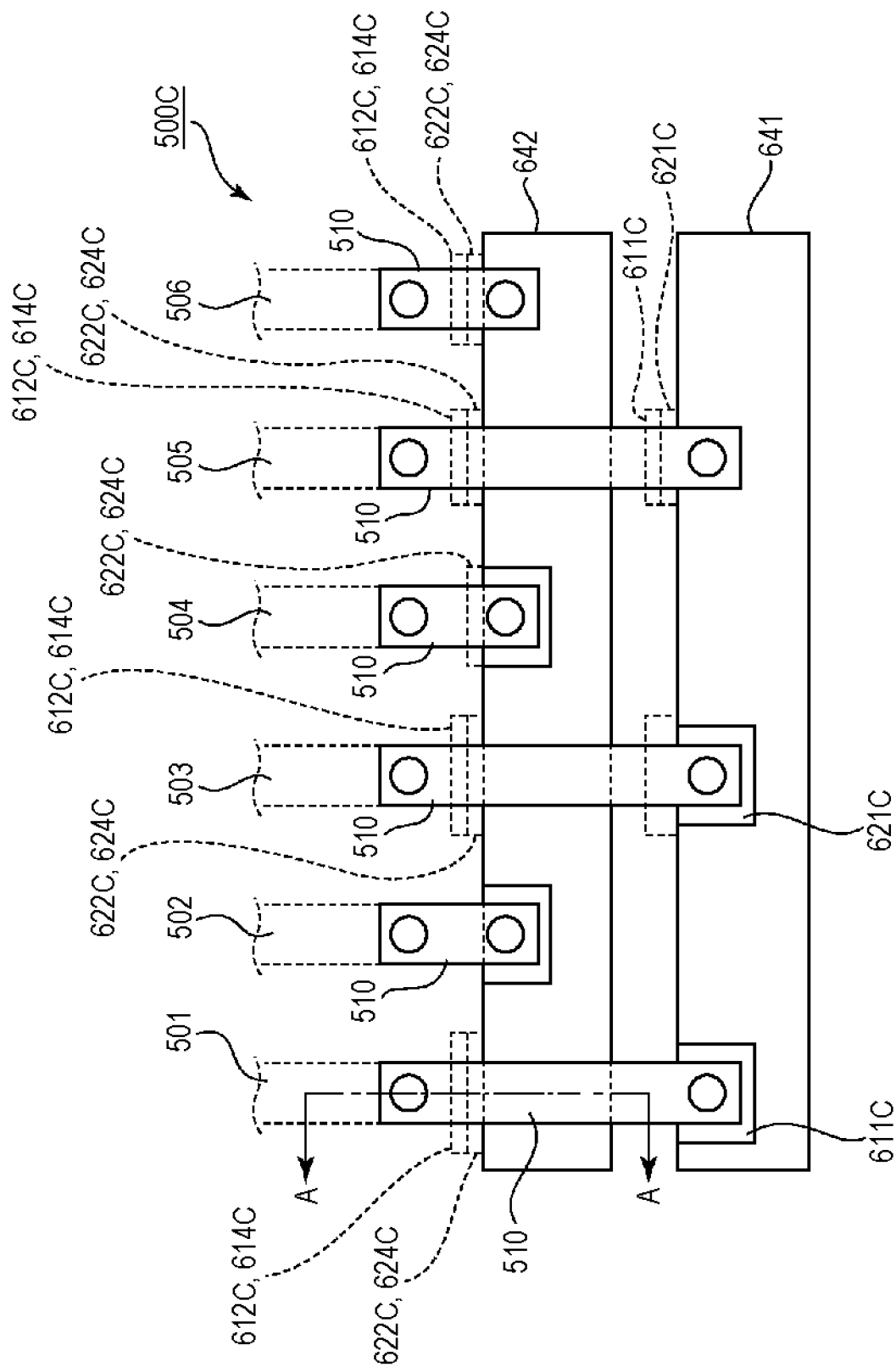
FIG. 22A is a schematic plan view of a connection structure.
Figure 22B:
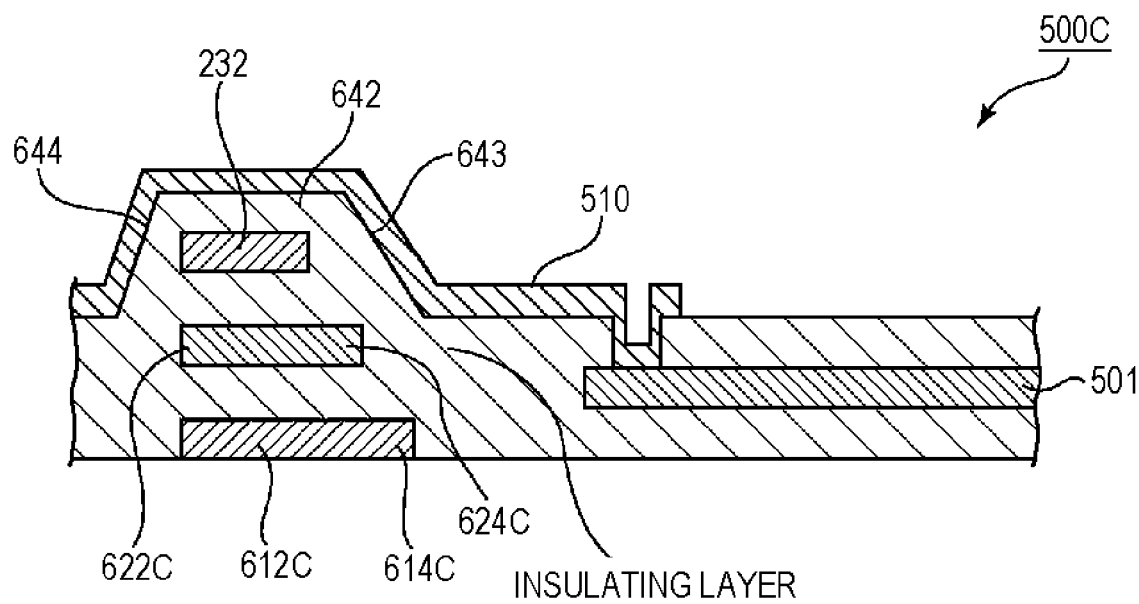
FIG. 22B is a cross-sectional view of the connection structure along A-A line shown in FIG. 22A.

FIG. 22A is a schematic plan view of a connection structure 500C. FIG. 22B is a cross-sectional view of the connection structure 500C along A-A line shown in FIG. 22A. Referring to FIGS. 17B, 22A and 22B, the connection structure 500C will be described. The same reference numerals are attached to the same elements as those in the sixth embodiment. The description of the fourth and sixth embodiment is cited for elements with the same reference numerals attached.

As in the sixth embodiment, the connection structure 500C includes a first source line 501, a second source line 502, a third source line 503, a fourth source line 504, a fifth source line 505, a sixth source line 506, connection layers 510, a left inspection line 231, and a right inspection line 232. The connection structure 500C further includes left inspection lines 611C, 621C, and right inspection lines 612C, 622C. The left inspection line 611C is used in place of the left inspection line 611 described with reference to the sixth embodiment. The left inspection line 621C is used in place of the left inspection line 621 described with reference to the sixth embodiment. The right inspection line 612C is used in place of the right inspection line 612B described with reference to the fifth embodiment. The right inspection line 622C is used in place of the right inspection line 622B described with reference to the fifth embodiment. The first source line 501 is connected to the left inspection line 611C by the connection layer 510. The second source line 502 is connected to the right inspection line 612C by the connection layer 510. The third source line 503 is connected to the left inspection line 621C by the connection layer 510. The fourth source line 504 is connected to the right inspection line 622C by the connection layer 510.

In FIG. 22B, a right insulating ridge 642 is shown. The first source line 501 connected to the left inspection line 611C is formed so as to go over the right insulating ridge 642. The right insulating ridge 642 includes a first inclined plane 643 facing the first source line 501, and a second inclined plane 644 on the opposite side of the first inclined plane 643. The second inclined plane 644 is gentler than the first inclined plane 643.

Figure 23:
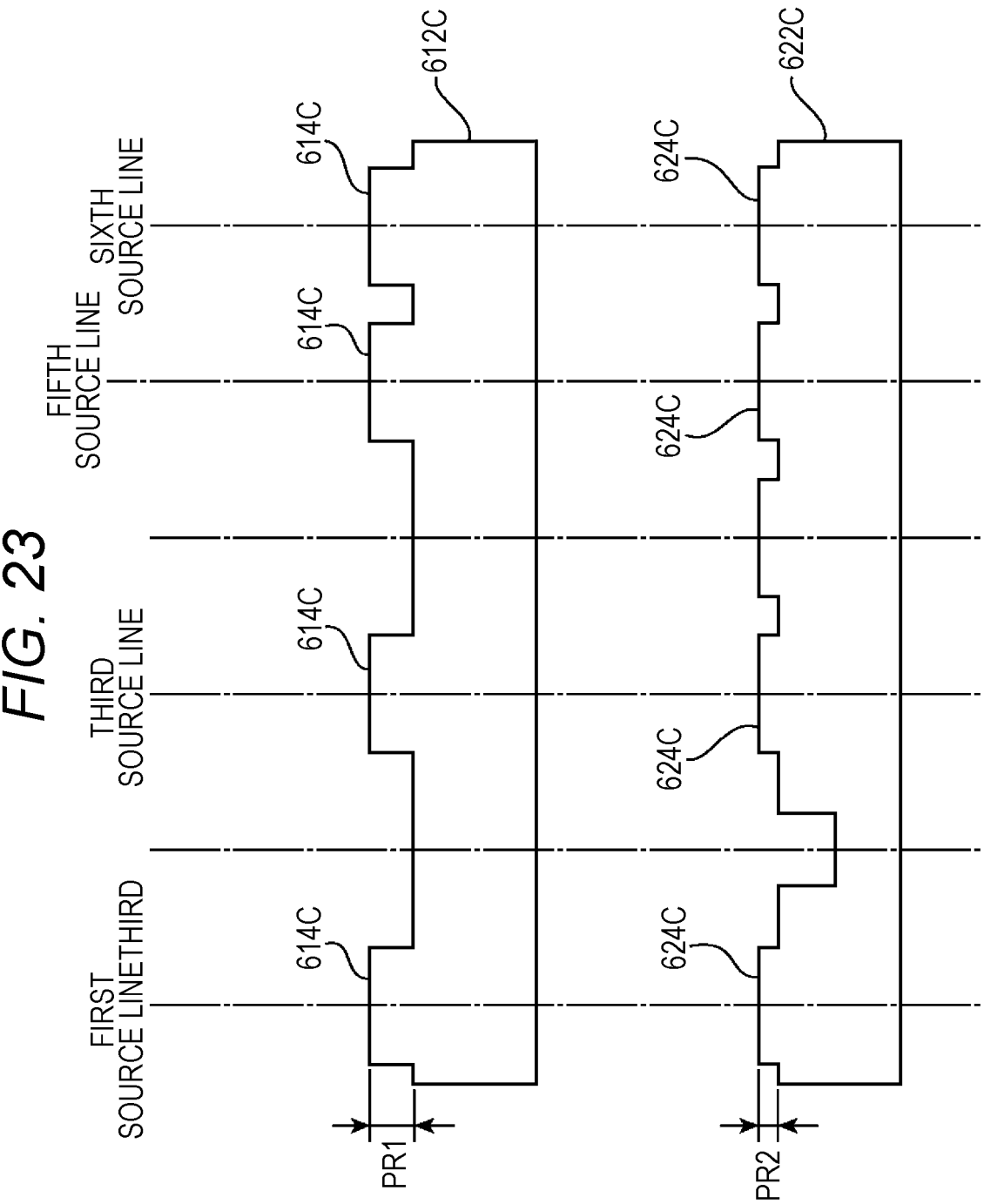
FIG. 23 is a schematic plan view of the right inspection line.

FIG. 23 is a schematic plan view of the right inspection lines 612C, 622C. Referring to FIGS. 22A to 23, the right inspection lines 612C, 622C will be described.

The right inspection line 612C includes projected portions 614 C at respective positions corresponding to the first source line 501, the third source line 503, and the fifth source line 505. These projected portions 614C are projected toward the first source line 501, the third source line 503, and the fifth source line 505, respectively. The first source line 501, the third source line 503, and the fifth source line 505 go beyond the right insulating ridge 642 to connect the left wiring portion (the left inspection lines 611C, 621C, 231) inside the left insulating ridge 641.

Similarly, the right inspection line 622C includes projected portions 624C at the respective positions corresponding to the first source line 501, the third source line 503, and the fifth source line 505. These projected portions 624C are also projected toward the first source line 501, the third source line 503, and the fifth source line 505, respectively.

In FIG. 23, a sign "PR1" representing a projection amount of the projected portion 614C and a sign "PR2" representing a projection amount of the projected portion 624C are shown. The projection amount "PR1" is set to a larger value than that of the projection amount "PR2". Since the projected portions 614C, 624C overlap each other in a staircase pattern, the insulating layer around the projected portions 614C, 624C can produce a gentle inclination.

The right inspection line 612C includes the projected portion 614C at a position corresponding to the sixth source line 506 as well. Similarly, the right inspection line 622C includes the projected portion 624C at a position corresponding to the sixth source line 506 as well. The sixth source line 506 is connected to the right inspection line 232. Although the right inspection line 232 exists at a farthest position in a direction of a thickness dimension from the sixth source line 506 among the right inspection lines 612C, 622C, 232, the gentle inclination produced by the projected portions 614C, 624C can properly prevent the disconnection of the connection layer 510 corresponding to the sixth source line 506.

At a position corresponding to the fourth source line 504, the right inspection line 612C does not have the projected portion, while the right inspection line 622C has the projected portion 624C. The fourth source line 504 is connected to the right inspection line 622C. Although the right inspection line 622C exists at a second farthest position from the fourth source line 504 behind the right inspection line 232, the gentle inclination produced by the projected portion 624C can properly prevent the disconnection of the connection layer 510 corresponding to the fourth source line 504.

Figure 24:
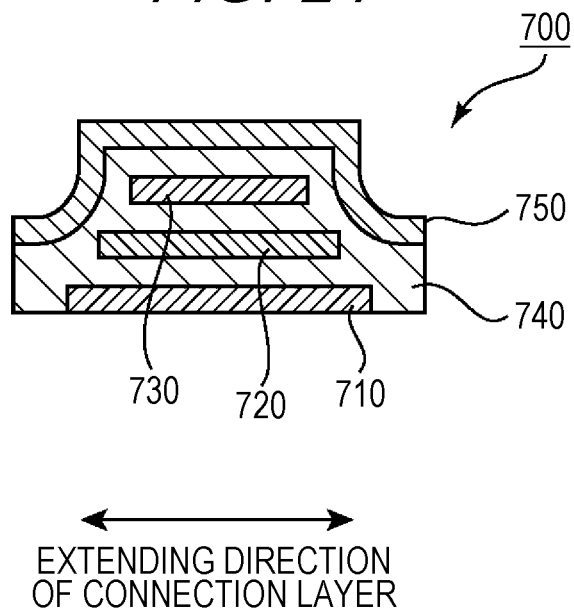
FIG. 24 is a schematic cross-sectional view of an insulating ridge.

FIG. 24 is a schematic cross-sectional view of an insulating ridge 700. Referring to FIG. 24, another technique for reducing an inclination angle of the insulating ridge 700 will be described.

The insulating ridge 700 is formed of an inspection line 710 used as a first conductive layer, an inspection line 720 used as a second conductive layer, an inspection line 730 used as a third conductive layer, an insulating layer 740 surrounding so as to insulate the inspection line 710, the inspection line 720, and the inspection line 730 from one another, and a connection layer 750 laminated on the insulating layer 740. A cross-sectional length of the inspection line 720 in an extending direction of the connection layer 750 is designed to be smaller than that of the inspection line 710. A cross-sectional length of the inspection line 730 in the extending direction of the connection layer 750 is designed to be smaller than that of the inspection line 720. As compared with a design in which the cross-sectional length of the conductive layer in the extending direction of the connection layer 750 is equal, the design shown in FIG. 24 can make a gradient of an inclined plane of the insulating ridge 700 gentler.

Figure 25:
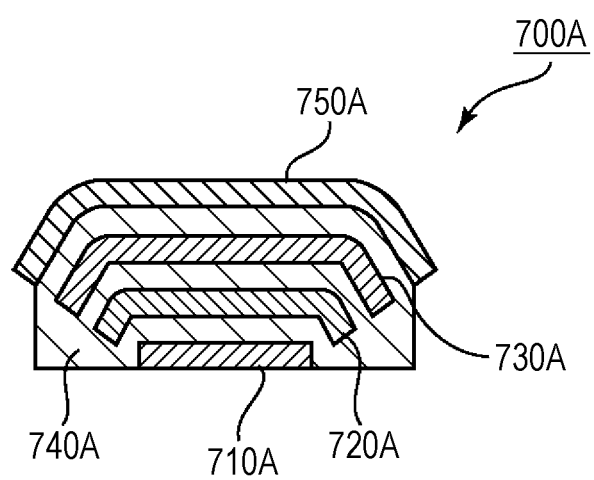
FIG. 25 is a schematic cross-sectional view of another insulating ridge.

FIG. 25 is a schematic cross-sectional view of an insulating ridge 700A. Referring to FIG. 25, another technique for reducing an inclination angle of the insulating ridge 700A will be described.

The insulating ridge 700A is formed of an inspection line 710A used as a first conductive layer, an inspection line 720A used as a second conductive layer, an inspection line 730A used as a third conductive layer, an insulating layer 740A surrounding so as to insulate the inspection line 710A, the inspection line 720A, and the inspection line 730A from one another, and a connection layer 750A laminated on the insulating layer 740A. A cross-sectional length of the inspection line 720A in an extending direction of the connection layer 750A is designed to be smaller than that of the inspection line 710A. A cross-sectional length of the inspection line 730A in the extending direction of the connection layer 750A is designed to be smaller than that of the inspection line 720A. As compared with a design in which the cross-sectional length of the conductive layer in the extending direction of the connection layer 750A is equal, the design shown in FIG. 25 can make a gradient of an inclined plane of the insulating ridge 700A gentler.

Eighth Embodiment

As described with reference to the fourth embodiment, the inspection wiring portion is formed by sequentially laminating the conductive layers. The conductive layer formed precedently is easily affected by a formation process of the subsequent conductive layer(s). A technique of the eighth embodiment contributes to reduction of the influence of the formation process of the subsequent conductive layer(s) on the conductive layer precedently formed.

Figure 26:
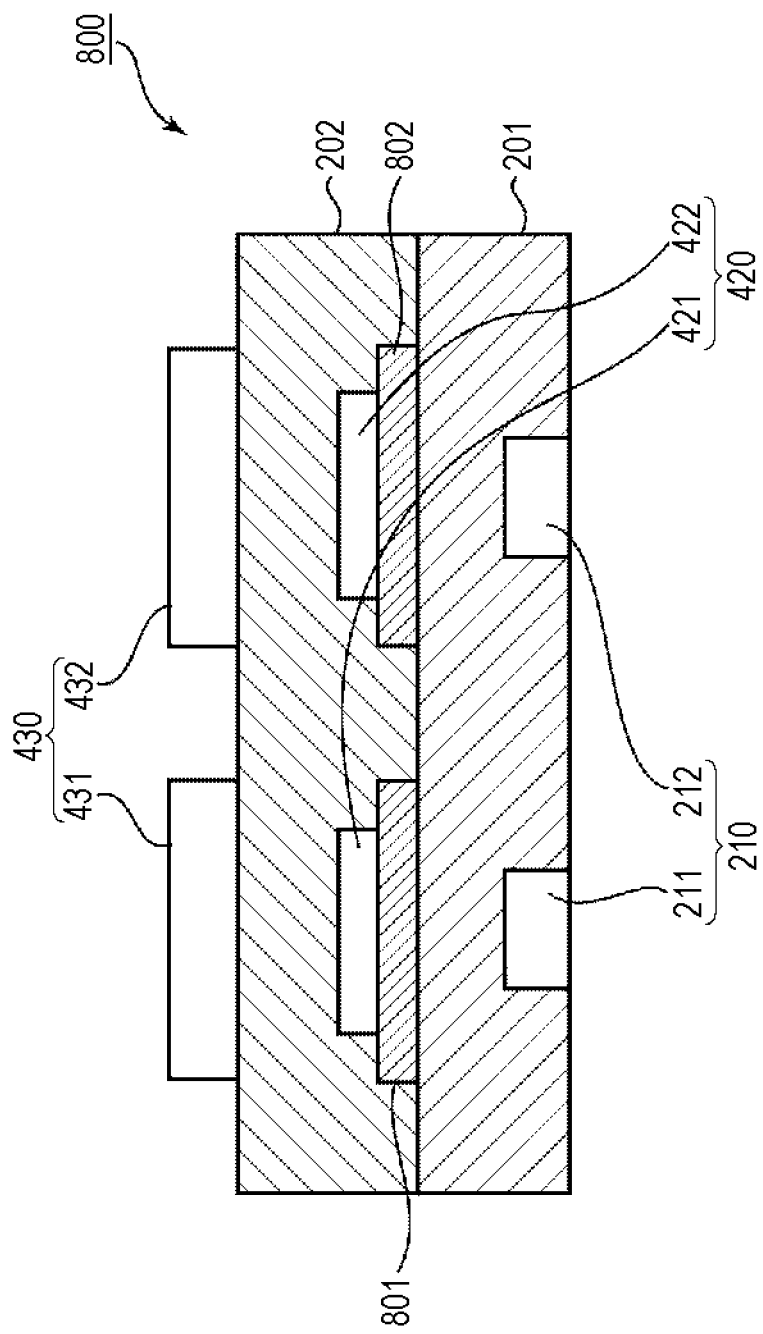
FIG. 26 is a schematic cross-sectional view of an inspection wiring portion.

FIG. 26 is a schematic plan view of a connection structure 800. Referring to FIG. 26, the connection structure 800 will be described. The same reference numerals are attached to the same elements as those in the third embodiment. The description of the first embodiment is cited for elements with the same reference numerals attached.

As in the third embodiment, the inspection wiring portion 800 includes a first conductive layer 210, a first insulating layer 201, a second insulating layer 202, a second conductive layer 420, and a third conductive layer 430. Since a left inspection line 421 of the second conductive layer 420 is wider than a left inspection line 211 of the first conductive layer 210, the left inspection line 211 of the first conductive layer 210 is difficult to be affected by edge working of the left inspection line 421 of the second conductive layer 420. Since a left inspection line 431 of the third conductive layer 430 is wider than the left inspection line 421 of the second conductive layer 420, the left inspection line 421 of the second conductive layer 420 is difficult to be affected by the edge working of the left inspection line 431 of the third conductive layer 430. Since a right inspection line 422 of the second conductive layer 420 is wider than a right inspection line 212 of the first conductive layer 210, the right inspection line 212 of the first conductive layer 210 is difficult to be affected by edge working of the right inspection line 422 of the second conductive layer 420. Since a right inspection line 432 of the third conductive layer 430 is wider than the right inspection line 422 of the second conductive layer 420, the right inspection line 422 of the second conductive layer 420 is difficult to be affected by the edge working of the right inspection line 432 of the third conductive layer 430.

The inspection wiring portion 800 further includes a left semiconductor layer 801 and a right semiconductor layer 802. The left semiconductor layer 801 is formed between the first insulating layer 201 covering the first conductive layer 210, and the left inspection line 421. The right semiconductor layer 802 is formed between the first insulating layer 201 and the right inspection line 422. The left semiconductor layer 801 is wider than the left inspection line 421. The right semiconductor layer 802 is wider than the right inspection line 422. The left semiconductor layer 801 and the right semiconductor layer 802 may be formed, using amorphous silicon. In many cases, semiconductor layers within the pixels are formed, using amorphous silicon. When the left semiconductor layer 801 and the right semiconductor layer 802 are laminated on the first insulating layer 201, using amorphous silicon, the left semiconductor layer 801 and the right semiconductor layer 802 are formed without requiring an additional layer formation process. That is, the influence of the edge working is reduced without requiring the additional layer formation process.

Since the left semiconductor layer 801 and the right semiconductor layer 802 reduce the influence by the edge working of the second conductive layer 420 and the third conductive layer 430, a dielectric voltage of the first conductive layer 210 can be maintained at a proper level. In the present embodiment, the left semiconductor layer 801 and the right semiconductor layer 802 each may be exemplified as a semiconductor layer.

The aforementioned embodiments mainly include the display devices having the following features.

In one general aspect, the instant application describes a display device includes a display surface where a plurality of source lines are arrayed thereon and each receives a video signal; and an inspection wiring portion that transmits an inspection signal to the source lines. The inspection wiring portion includes a first conductive layer connected to a part of the source lines, a second conductive layer connected to another part of the source lines, and an insulating portion that insulates the first conductive layer and the second conductive layer, and the second conductive layer is laminated on the first conductive layer.

According to the above-described configuration, since the inspection wiring portion transmits the inspection signal to the source lines, it is properly detected whether or not the source lines to which the video signal is input are normal. Since the first conductive layer connected to the part of the source lines, and the second conductive layer connected to the above-mentioned other part of the source lines have a lamination structure insulated by the insulating portion, the display device can achieve a high inspection accuracy under a design of a narrow frame portion.

The above general aspect may include one or more of the following features. The source lines may include a first source line, a second source line arranged next to the first source line, a third source line arranged next to the second source line, and a fourth source line arranged next to the third source line. The second source line is arranged between the first source line and the third source line, the third source line is arranged between the second source line and the fourth source line. The first conductive layer may include a first inspection line connected to one odd source line of the first source line and the third source line, and a second inspection line connected to one even source line of the second source line and the fourth source line. The second conductive layer may include a third inspection line connected to the other odd source line of the first source line and the third source line, and a fourth inspection line connected to the other even source line of the second source line and the fourth source line. The third inspection line may be laminated closer to the first inspection line than the second inspection line. The fourth inspection line may be laminated closer to the second inspection line than the first inspection line.

According to the above-described configuration, the third inspection line connected to the odd source line is laminated close to the first inspection line connected to the odd source line. The fourth inspection line connected to the even source line is laminated close to the second inspection line connected to the even source line. Since interference between the inspection signals sent out to the odd source line and the inspection signal sent out to the even source lines becomes difficult to occur, the display device can achieve high inspection accuracy under the design of the narrow fame portion.

The source lines may include a fifth source line arranged next to the fourth source line, and a sixth source line arranged next to the fifth source line. The fifth source line is arranged between the fourth source line and the sixth source line. The inspection wiring portion may include a third conductive layer laminated on the second conductive layer. The insulating portion may insulate the second conductive layer and the third conductive layer. The third conductive layer includes a fifth inspection line connected to the fifth source line, and a sixth inspection line connected to the sixth source line. The fifth inspection line may be laminated closer to the third inspection line than the fourth inspection line. And the sixth inspection line may be laminated closer to the fourth inspection line than the third inspection line.

According to the above-described configuration, the fifth inspection line connected to the fifth source line is laminated close to the third inspection line connected to the odd source line. The sixth inspection line connected to the sixth source line is laminated close to the fourth inspection line connected to the even source line. Since interference becomes difficult to occur between the inspection signal sent out to the first source line, the third source line, and the fifth source line, and the inspection signal sent out to the second source line, the fourth source line, and the sixth source line, the display device can achieve high inspection accuracy under the design of the narrow fame portion.

The source lines may include a fifth source line arranged next to the fourth source line, and a sixth source line arranged next to the fifth source line. The fifth source line may be arranged between the fourth source line and the sixth source line. A fifth inspection line connected to the fifth source line may be included in one of the first conductive layer and the second conductive layer. A sixth inspection line connected to the sixth source line may be included in one of the first conductive layer and the second conductive layer.

According to the above-described configuration, since the fifth inspection line connected to the fifth source line is included in one of the first conductive layer and the second conductive layer, and the sixth inspection line connected to the sixth source line is included in one of the first conductive layer and the second conductive layer, the display device can achieve high inspection accuracy under the design of the narrow fame portion.

The third inspection line may mutually overlap the first inspection line and the fifth inspection line. The fourth inspection line may mutually overlap the second inspection line and the sixth inspection line.

According to the above-described configuration, since the third inspection line mutually overlaps the first inspection line and the fifth inspection line, and the fourth inspection line mutually overlaps the second inspection line and the sixth inspection line, interference between the inspection signal sent out to the first source line, the third source line, and the fifth source line, and the inspection signal sent out to the second source line, the fourth source line, and the sixth source line becomes difficult to occur. Accordingly, the display device can achieve high inspection accuracy under the design of the narrow fame portion.

The fifth inspection line may overlap one of the first inspection line and the third inspection line with the insulating portion interposed. The sixth inspection line may overlap one of the second inspection line and the fourth inspection line with the insulating portion interposed.

According to the above-described configuration, since the fifth inspection line overlaps one of the first inspection line and the third inspection line with the insulating portion interposed, and the sixth inspection line overlaps one of the second inspection line and the fourth inspection line with the insulating portion interposed, interference between the inspection signal sent out to the first source line, the third source line, and the fifth source line, and the inspection signal sent out to the second source line, the fourth source line, and the sixth source line becomes difficult to occur. Accordingly, the display device can achieve high inspection accuracy under the design of the narrow fame portion.

The display surface may include a first pixel group made up of a plurality of first pixels that emit light in a first hue, a second pixel group made up of a plurality of second pixels that emit light in a second hue different from the first hue, and a third pixel group made up of a plurality of third pixels that emit light in a third hue different from the first hue and the second hue. The first pixels may be arrayed along the first source line and the fourth source line. The second pixels may be arrayed along the second source line and the fifth source line. The third pixels may be arrayed along the third source line and the sixth source line.

According to the above-described configuration, since the first pixels are arrayed along the first source line and the fourth source line, luminescence operation of the first pixels is properly inspected, using the inspection signal sent to the first source line and the fourth source. Since the second pixels are arrayed along the second source line and the fifth source line, luminescence operation of the second pixels is properly inspected, using the inspection signal sent to the second source line and the fifth source line. Since the third pixels are arrayed along the third source line and the sixth source line, luminescence operation of the third pixels is properly inspected, using the inspection signal sent to the third source line and the sixth source line.

The display surface may include a first pixel group made up of a plurality of first pixels that emit light in a first hue, a second pixel group made up of a plurality of second pixels that emit light in a second hue different from the first hue, a third pixel group made up of a plurality of third pixels that emit light in a third hue different from the first hue and the second hue, and a fourth pixel group made up of a plurality of fourth pixels that emit light in a fourth hue different from the first to third hues. The first pixels may be arrayed along the first source line. The second pixels may be arrayed along the second source line. The third pixels may be arrayed along the third source line. The fourth pixels may be arrayed along the fourth source line.

According to the above-described configuration, since the first pixels are arrayed along the first source line, luminescence operation of the first pixels is properly inspected, using the inspection signal sent to the first source line. Since the second pixels are arrayed along the second source line, luminescence operation of the second pixels is properly inspected, using the inspection signal sent to the second source line. Since the third pixels are arrayed along the third source line, luminescence operation of the third pixels is properly inspected, using the inspection signal sent to the third source line. Since the fourth pixels are arrayed along the fourth source line, luminescence operation of the fourth pixels is properly inspected, using the inspection signal sent to the fourth source line.

The source lines may include a seventh source line arranged next to the sixth source line, and an eighth source line arranged next to the seventh source line. The fifth source line may be arranged between the fourth source line and the sixth source line. The sixth source line may be arranged between the fifth source line and the seventh source line. The seventh source line may be arranged between the sixth source line and the eighth source line. A seventh inspection line connected to the seventh source line may be included in the conductive layer different from the conductive layer including the fifth inspection line. An eight inspection line connected to the eighth source line may be included in the conductive layer different from the conductive layer including the sixth inspection line.

According to the above-described configuration, since the seventh inspection line connected to the seventh source line is included in the conductive layer different from the conductive layer including the fifth inspection line, and the eighth inspection line connected to the eighth source line is included in the conductive layer different from the conductive layer including the sixth inspection line, interference between the inspection signal sent out to the first source line, the third source line, the fifth source line, and the seventh source line, and the inspection signal sent out to the second source line, the fourth source line, the sixth source line, and the eighth source line is difficult to occur.

The first inspection line may overlap at least one of the third inspection line, the fifth inspection line, and the seventh inspection line with the insulating portion interposed. The second inspection line may overlap at least one of the fourth inspection line, the sixth inspection line, and the eighth inspection line with the insulating portion interposed.

According to the above-described configuration, since the first inspection line overlaps at least one of the third inspection line, the fifth inspection line, and the seventh inspection line with the insulating portion interposed, and the second inspection line overlaps at least one of the fourth inspection line, the sixth inspection line, and the eighth inspection line with the insulating portion interposed, interference is difficult to occur between the inspection signal sent out to the first source line, the third source line, the fifth source line, and the seventh source line, and the inspection signal sent out to the second source line, the fourth source line, the sixth source line, and the eighth source line.

The display surface may include a first pixel group made up of a plurality of first pixels that emit light in a first hue, a second pixel group made up of a plurality of second pixels that emit light in a second hue different from the first hue, a third pixel group made up of a plurality of third pixels that emit light in a third hue different from the first hue and the second hue, and a fourth pixel group made up of a plurality of fourth pixels that emit light in a fourth hue different from the first to third hues. The first pixels may be arrayed along the first source line and the fifth source line. The second pixels may be arrayed along the second source line and the sixth source line. The third pixels may be arrayed along the third source line and the seventh source line. The fourth pixels may be arrayed along the fourth source line and the eighth source line.

According to the above-described configuration, since the first pixels are arrayed along the first source line and the fifth source line, luminescence operation of the first pixels is properly inspected, using the inspection signal sent to the first source line and the fifth source line. Since the second pixels are arrayed along the second source line and the sixth source line, luminescence operation of the second pixels is properly inspected, using the inspection signal sent to the second source line and the sixth source line. Since the third pixels are arrayed along the third source line and the seventh source line, luminescence operation of the third pixels is properly inspected, using the inspection signal sent to the third source line and the seventh source line. Since the fourth pixels are arrayed along the fourth source line and the eighth source line, luminescence operation of the fourth pixels is properly inspected, using the inspection signal sent to the fourth source line and the eighth source line.

The inspection wiring portion may include a first inspection line having a first cross-sectional area, and a second inspection line having a second cross-sectional area larger than the first cross-sectional area. The first inspection line may be used as one of the first conductive layer and the second conductive layer. The second inspection line may be used as the other of the first conductive layer and the second conductive layer. The first inspection line may have a sheet resistance value smaller than the second inspection line.

According to the above-described configuration, the first inspection line having the first cross-sectional area is used as one of the first conductive layer and the second conductive layer. The second inspection line having the second cross-sectional area larger than the first cross-sectional area is used as the other of the first conductive layer and the second conductive layer. Since the first inspection line has the sheet resistance value smaller than the second inspection line, a difference in the resistance value between the first conductive layer and the second conductive is reduced even under the presence of difference in resistance characteristics between the conductive layers. Accordingly, the display device can be inspected with a high accuracy.

The second inspection line may be used as the second conductive layer. The first inspection line may be used as the first conductive layer.

According to the above-described configuration, as a result of the lamination of the second conductive layer on the first conductive layer, even if the sheet resistance value of the first conductive layer is reduced, the difference in the resistance value between the first conductive layer and the second conductive layer is reduced. Accordingly, the display device is inspected with a high accuracy.

The display device may further include a plurality of connection portions that electrically connect the source lines and the inspection wiring portion. The connection portions may include a first connection portion connected to the first conductive layer, and a second connection portion connected to the second conductive layer.

According to the above-described configuration, since the first connection portion is connected to the first conductive layer, and the second connection portion is connected to the second conductive layer, the inspection signal is transmitted to the source lines through the connection portions. As a result, the display device is inspected with a high accuracy.

The insulating portion may cover the first conductive layer and the second conductive layer. The first connection portion may be connected to the first conductive layer through a through-hole that passes through a missing portion formed in the second conductive layer, and reaches the first conductive layer.

According to the above-described configuration, since the first connection portion is connected to the first conductive layer through the through-hole that passes through the missing portion formed in the second conductive layer, and reaches the first conductive layer, the inspection signal is properly transmitted to the source lines from the first conductive layer.

The first conductive layer may include a first projected portion that is projected toward one of the source lines. The second conductive layer may include a second projected portion that is projected toward one of the source lines. The first connection portion may be connected to the first projected portion. The second connection portion may be connected to the second projected portion.

According to the above-described configuration, the first connection portion is connected to the first projected portion that is projected toward one of the source lines, and the second connection portion is connected to the second projected portion that is projected toward one of the source lines. Accordingly, the inspection signal is properly transmitted to the source lines from the first conductive layer and the second conductive layer.

The insulating portion may form a first insulating ridge that rises so as to cover the first inspection line and the third inspection line, and a second insulating ridge that rises so as to cover the second inspection line and the fourth inspection line. The connection portions may be each connected to one of the first conductive layer and the second conductive layer between the first insulating ridge and the second insulating ridge.

According to the above-described configuration, since the plurality of connection positions are connected to the first conductive layer and the second conductive layer between the first insulating ridge covering the first inspection line and the third inspection line, and the second insulating ridge covering the second inspection line and the fourth inspection line, the inspection signal is properly transmitted to the source lines from the first conductive layer and the second conductive layer.

The display device may further include a substrate where the display surface and the inspection wiring portion are formed. The first conductive layer may include the first projected portion that may be projected between the second connection portion and the substrate.

According to the above-described configuration, since the first conductive layer includes the first projected portion that is projected between the second connection portion and the substrate, an inclination of the second connection portion connected to the second conductive layer becomes gentle.

The inspection wiring portion may include a semiconductor layer formed between the second conductive layer and the first conductive layer. The semiconductor layer may be adjacent to the second conductive layer. The second conductive layer may be wider than the first conductive layer.

According to the above-described configuration, since the second conductive layer adjacent to the semiconductor layer is wider than the first conductive layer, a dielectric voltage in edge portions of the first conductive layer can be maintained at a proper level.

The principles of the first to eighth embodiments can be preferably used for a display device that displays pictures.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A display device, comprising:
a display surface where a plurality of source lines to which a video signal is input are arrayed; and
an inspection wiring portion that transmits an inspection signal to the source lines, wherein
the inspection wiring portion includes a first conductive layer connected to a part of the source lines, a second conductive layer connected to another part of the source lines, and an insulating portion that insulates the first conductive layer and the second conductive layer,
the second conductive layer is laminated on the first conductive layer, and
the first conductive layer and the second conductive layer are electrically independent to each other.

2. The display device according to claim 1, wherein
the source lines include a first source line, a second source line arranged next to the first source line, a third source line arranged next to the second source line, and a fourth source line arranged next to the third source line,
the second source line is arranged between the first source line and the third source line,
the third source line is arranged between the second source line and the fourth source line,
the first conductive layer includes a first inspection line connected to one odd source line of the first source line and the third source line, and a second inspection line connected to one even source line of the second source line and the fourth source line,
the second conductive layer includes a third inspection line connected to the other odd source line of the first source line and the third source line, and a fourth inspection line connected to the other even source line of the second source line and the fourth source line, the third inspection line is laminated closer to the first inspection line than the second inspection line, and the fourth inspection line is laminated closer to the second inspection line than the first inspection line.

3. The display device according to claim 2, wherein the source lines include a fifth source line arranged next to the fourth source line, and a sixth source line arranged next to the fifth source line, the fifth source line is arranged between the fourth source line and the sixth source line, the inspection wiring portion includes a third conductive layer laminated on the second conductive layer, the insulating portion insulates the second conductive layer and the third conductive layer, the third conductive layer includes a fifth inspection line connected to the fifth source line, and a sixth inspection line connected to the sixth source line, the fifth inspection line is laminated closer to the third inspection line than the fourth inspection line, and the sixth inspection line is laminated closer to the fourth inspection line than the third inspection line.

4. The display device according to claim 2, wherein the source lines include a fifth source line arranged next to the fourth source line, and a sixth source line arranged next to the fifth source line, the fifth source line is arranged between the fourth source line and the sixth source line, a fifth inspection line connected to the fifth source line is included in one of the first conductive layer and the second conductive layer, and a sixth inspection line connected to the sixth source line is included in one of the first conductive layer and the second conductive layer.

5. The display device according to claim 4, wherein the third inspection line mutually overlaps the first inspection line and the fifth inspection line, and the fourth inspection line mutually overlaps the second inspection line and the sixth inspection line.

6. The display device according to claim 4, wherein the fifth inspection line overlaps one of the first inspection line and the third inspection line with the insulating portion interposed, and the sixth inspection line overlaps one of the second inspection line and the fourth inspection line with the insulating portion interposed.

7. The display device according to claim 3, wherein the display surface includes a first pixel group made up of a plurality of first pixels that emit light in a first hue, a second pixel group made up of a plurality of second pixels that emit light in a second hue different from the first hue, and a third pixel group made up of a plurality of third pixels that emit light in a third hue different from the first hue and the second hue, the first pixels are arrayed along the first source line and the fourth source line, the second pixels are arrayed along the second source line and the fifth source line, and the third pixels are arrayed along the third source line and the sixth source line.

8. The display device according to claim 2, wherein the display surface includes a first pixel group made up of a plurality of first pixels that emit light in a first hue, a second pixel group made up of a plurality of second pixels that emit light in a second hue different from the first hue, a third pixel group made up of a plurality of third pixels that emit light in a third hue different from the first hue and the second hue, and a fourth pixel group made up of a plurality of fourth pixels that emit light in a fourth hue different from the first to third hues, the first pixels are arrayed along the first source line, the second pixels are arrayed along the second source line, the third pixels are arrayed along the third source line, and the fourth pixels are arrayed along the fourth source line.

9. The display device according to claim 4, wherein the source lines include a seventh source line arranged next to the sixth source line, and an eighth source line arranged next to the seventh source line, the fifth source line is arranged between the fourth source line and the sixth source line, the sixth source line is arranged between the fifth source line and the seventh source line, the seventh source line is arranged between the sixth source line and the eighth source line, a seventh inspection line connected to the seventh source line is included in the conductive layer different from the conductive layer including the fifth inspection line, and an eighth inspection line connected to the eighth source line is included in the conductive layer different from the conductive layer including the sixth inspection line.

10. The display device according to claim 9, wherein the first inspection line overlaps at least one of the third inspection line, the fifth inspection line, and the seventh inspection line with the insulating portion interposed, and the second inspection line overlaps at least one of the fourth inspection line, the sixth inspection line, and the eighth inspection line with the insulating portion interposed.

11. The display device according to claim 9, wherein the display surface includes a first pixel group made up of a plurality of first pixels that emit light in a first hue, a second pixel group made up of a plurality of second pixels that emit light in a second hue different from the first hue, a third pixel group made up of a plurality of third pixels that emit light in a third hue different from the first hue and the second hue, and a fourth pixel group made up of a plurality of fourth pixels that emit light in a fourth hue different from the first to third hues, the first pixels are arrayed along the first source line and the fifth source line, the second pixels are arrayed along the second source line and the sixth source line, the third pixels are arrayed along the third source line and the seventh source line, and the fourth pixels are arrayed along the fourth source line and the eighth source line.

12. The display device according to claim 1, wherein the inspection wiring portion includes a thin inspection line having a first cross-sectional area, and a thick inspection line having a second cross-sectional area larger than the first cross-sectional area, the thin inspection line is used as one of the first conductive layer and the second conductive layer, the thick inspection line is used as the other of the first conductive layer and the second conductive layer, and the thin inspection line has a sheet resistance value smaller than the thick inspection line.

13. The display device according to claim 12, wherein the thick inspection line is used as the second conductive layer, and the thin inspection line is used as the first conductive layer.

14. The display device according to claim 2, further comprising a plurality of connection portions that electrically connect the source lines and the inspection wiring portion, wherein
the connection portions include a first connection portion selectively connected to the first conductive layer, and a second connection portion selectively connected to the second conductive layer.

15. The display device according to claim 14, wherein
the insulating portion covers the first conductive layer and the second conductive layer, and
the first connection portion is connected to the first conductive layer through a through-hole that passes through a missing portion formed in the second conductive layer, and reaches the first conductive layer.

16. The display device according to claim 14, wherein
the first conductive layer includes a first projected portion that is projected toward one of the source lines,
the second conductive layer includes a second projected portion that is projected toward one of the source lines,
the first connection portion is connected to the first projected portion, and
the second connection portion is connected to the second projected portion.

17. The display device according to claim 14, wherein
the insulating portion forms a first insulating ridge that rises so as to cover the first inspection line and the third inspection line, and a second insulating ridge that rises so as to cover the second inspection line and the fourth inspection line, and
the connection portions are each connected to one of the first conductive layer and the second conductive layer between the first insulating ridge and the second insulating ridge.

18. The display device according to claim 1, wherein
the inspection wiring portion includes a semiconductor layer formed between the second conductive layer and the first conductive layer,
the semiconductor layer is adjacent to the second conductive layer, and
the second conductive layer is wider than the first conductive layer.

* * * * *